US010883823B2

(12) United States Patent
Haugen et al.

(10) Patent No.: US 10,883,823 B2
(45) Date of Patent: Jan. 5, 2021

(54) THREE-DIMENSIONAL SENSOR WITH COUNTERPOSED CHANNELS

(71) Applicant: CyberOptics Corporation, Golden Valley, MN (US)

(72) Inventors: Paul R. Haugen, Bloomington, MN (US); Evan J. Ribnick, St. Louis Park, MN (US); Carl E. Haugan, St. Paul, MN (US); Eric P. Rudd, Hopkins, MN (US)

(73) Assignee: CyberOptics Corporation, Golden Valley, MN (US)

( * ) Notice: Subject to any disclaimer, the term of this patent is extended or adjusted under 35 U.S.C. 154(b) by 0 days.

(21) Appl. No.: 16/655,674

(22) Filed: Oct. 17, 2019

(65) Prior Publication Data

US 2020/0124410 A1    Apr. 23, 2020

Related U.S. Application Data

(60) Provisional application No. 62/747,350, filed on Oct. 18, 2018, provisional application No. 62/747,353, filed on Oct. 18, 2018.

(51) Int. Cl.
  *G01B 11/30* (2006.01)
  *G01B 11/25* (2006.01)
  *H04N 5/372* (2011.01)

(52) U.S. Cl.
  CPC .......... *G01B 11/2527* (2013.01); *G01B 11/25* (2013.01); *G01B 11/30* (2013.01); *H04N 5/372* (2013.01)

(58) Field of Classification Search
  CPC .............. G01B 11/25; G01B 11/30; G06T 2207/10028; G06T 2207/30141;
  (Continued)

(56) References Cited

U.S. PATENT DOCUMENTS 3,972,584 A    8/1976  Lobb
5,166,751 A   11/1992  Massig
(Continued)

FOREIGN PATENT DOCUMENTS

EP      3282223 A1    2/2018
JP   2012141758 A    6/2012
(Continued)

OTHER PUBLICATIONS

Non-Final Office Action for U.S. Appl. No. 16/655,687 dated Jun. 10, 2020, 16 pages.
(Continued)

*Primary Examiner* — Hoa Q Pham
(74) *Attorney, Agent, or Firm* — Christopher R. Christenson; Kelly, Holt & Christenson PLLC

(57) ABSTRACT

A method of determining dimensional information of a target surface includes generating a first point cloud corresponding to a first plurality of reconstructed surface points of the target surface generated by a first imaging system-illumination source pair of a phase profilometry system; generating a second point cloud corresponding to a second plurality of reconstructed surface points of the target surface generated by a second imaging system-illumination source pair of the phase profilometry system; generating an initial estimate of the target surface based on the first and second point clouds; and refining the initial surface estimate using positions of the first and second point clouds and geometry of the first and second imaging system-illumination source pairs to generate a final point cloud.

20 Claims, 37 Drawing Sheets

(58) Field of Classification Search
CPC ......... G06T 2207/30152; G06T 7/0004; G06T 7/521; G06T 7/586; G01N 21/956; G01N 2021/95646; H04N 5/2354; H04N 5/247; H04N 5/372
USPC .................................. 356/601–623; 348/87
See application file for complete search history.

(56) References Cited

U.S. PATENT DOCUMENTS

| | | | |
|---|---|---|---|
| 5,832,107 | A | 11/1998 | Choate |
| 7,573,569 | B2 | 8/2009 | Puah et al. |
| 7,692,144 | B2 | 4/2010 | Watanabe et al. |
| 8,004,559 | B2 | 8/2011 | Jeon et al. |
| 8,064,068 | B2 * | 11/2011 | Fisher ................ G01B 11/2531 356/603 |
| 8,854,610 | B2 | 10/2014 | Lee et al. |
| 9,019,351 | B2 | 4/2015 | Yu et al. |
| 9,182,583 | B2 | 11/2015 | De Nooij et al. |
| 9,243,900 | B2 | 1/2016 | Lee et al. |
| 9,488,472 | B2 | 11/2016 | Lee et al. |
| 9,759,554 | B2 | 9/2017 | Ng et al. |
| 9,816,287 | B2 * | 11/2017 | Zhou .................. H04N 9/3185 |
| 10,126,252 | B2 * | 11/2018 | Haugen ................ G01N 21/956 |
| 10,346,963 | B2 * | 7/2019 | Rudd ...................... G06T 7/521 |
| 10,346,998 | B1 * | 7/2019 | Anderberg ............... G06T 5/50 |
| 2003/0067461 | A1 * | 4/2003 | Fletcher .................. G06T 17/20 345/420 |
| 2004/0252312 | A1 | 12/2004 | Chen |
| 2007/0211259 | A1 | 9/2007 | Jeon et al. |
| 2008/0297780 | A1 | 12/2008 | Clasen |
| 2010/0007896 | A1 | 1/2010 | Fishbaine |
| 2014/0232850 | A1 | 8/2014 | Park et al. |
| 2016/0180511 | A1 * | 6/2016 | Zhou ..................... B29C 66/304 348/187 |
| 2018/0128603 | A1 | 5/2018 | Jeon et al. |
| 2018/0218510 | A1 | 8/2018 | Taguchi et al. |
| 2018/0225829 | A1 * | 8/2018 | Evertt ...................... G06T 7/12 |
| 2020/0124407 | A1 * | 4/2020 | Haugen .................. G01B 11/30 |
| 2020/0124410 | A1 | 4/2020 | Haugen et al. |
| 2020/0273193 | A1 * | 8/2020 | Anderberg ............ G06T 7/0002 |

FOREIGN PATENT DOCUMENTS

| | | |
|---|---|---|
| WO | 9617258 A1 | 6/1986 |
| WO | 2018088827 A1 | 5/2018 |

OTHER PUBLICATIONS

Application and Drawings for U.S. Appl. No. 16/655,687, filed Oct. 17, 2019, 86 pages.
International Search Report and Written Opinion for International Patent Application No. PCT/US2019/056921, dated Feb. 7, 2020, date of filing: Oct. 18, 2019, 12 pages.
International Search Report and Written Opinion for International Patent Application No. PCT/US2019/056917, dated Feb. 7, 2020, date of filing: Oct. 18, 2019, 11 pages.

* cited by examiner

THREE-DIMENSIONAL SENSOR WITH COUNTERPOSED CHANNELS

CROSS-REFERENCE TO RELATED APPLICATION

The present application is based on and claims the benefit of U.S. provisional patent application Ser. No. 62/747,353, filed Oct. 18, 2018, and Ser. No. 62/747,350 filed Oct. 18, 2018, the content of which is hereby incorporated by reference in its entirety.

BACKGROUND

Obtaining precision dimensional information relative to a surface or an object is vital to many industries and processes. For example, in the electronics assembly industry, precision dimensional information relative to an electrical component on a circuit board can be used to determine whether the component is placed properly. Further, dimensional information is also useful in the inspection of solder paste deposits on a circuit board prior to component mounting in order to ensure that a proper amount of solder paste is deposited in the proper location on the circuit board. Further still, dimensional information is also useful in the inspection of semi-conductor wafers and flat panel display.

Optical phase profilometry systems have been employed to accurately measure and obtain precision dimensional information relative to a surface object. However, some new electronic assemblies include components with reflective specular surfaces. Traditional systems, which are generally configured to measure diffuse, non-reflective surfaces, have trouble obtaining precise dimensional information for such components. Additionally, certain technologies are reducing in size (e.g. circuit boards and components and/or device thereupon) and requiring higher magnification and higher resolution optics in order to obtain accurate dimensional information. Traditional optical metrology systems experience a variety of measurement errors from a variety of factors as the size and surface reflectivity of applications advance and change.

As the precision of dimensional information for such components becomes more and more vital to various industries and processes it becomes more and more important to accurately measure and obtain such information and to correct for the various causes of measurement error in the measured surface profile.

The discussion above is merely provided for general background information and is not intended to be used as an aid in determining the scope of the claimed subject matter. The claimed subject matter is not limited to implementations that solve any or all disadvantages noted in the background.

The discussion above is merely provided for general background information and is not intended to be used as an aid in determining the scope of the claimed subject matter.

SUMMARY

An optical phase profilometry system includes a first operative coaxial camera-projector pair aligned at a first angle relative to a target surface that projects a first illumination on the target surface and a second operative coaxial camera-projector pair aligned at a second angle relative to the target surface that projects a second illumination on the target surface. Wherein the first and second angles are equal and opposite to one another relative to the target surface such that the second operative coaxial camera-projector pair is configured to capture a first reflection from the first illumination and the first operative coaxial camera-projector pair is configured to capture a second reflection from the second illumination. The optical phase profilometry system further includes a controller configured to, based on the captured first and second reflections, generate a first and second estimation of the target surface and combine them to generate a dimensional profile of the target surface.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Optical phase profilometry systems are often employed in various industries and processes to obtain precision dimensional information relative to a surface or an object. For instance, these systems can be used to measure the height and position of various components on an objects surface. In the electronics industry, for example, many electronic assemblies include a variety of components and/or devices mounted on circuit boards. To ensure correct dimensions and placement of such components and/or devices, illumination sources (e.g. a projector) project a patterned illumination onto a target surface or object. The patterned illumination, which is reflected from the target surface or object, is captured by an imaging system (e.g. a camera) viewing the target surface at a known angle relative to the illumination angle (e.g. triangulation angle). The optical phase profilometry system calculates the dimensions of the target surface or object by measuring the phase or position of the projected illumination at a particular point of the image (e.g. pixel) captured by the imaging system and the geometry of the sensor.

In a typical optical phase profilometry system, it is common to have a single projector illuminating the surface with a structured pattern, and multiple oblique cameras (i.e. cameras placed at an angle oblique to the projector relative to the surface) observing the surface. Or, the opposite, but equivalent structure, a single camera is used that observes the surface that is illuminated by multiple oblique projectors (i.e. projectors placed at an angle oblique to the camera relative to the surface).

An estimate of the surface to be measured (e.g. a point cloud) is typically generated independently from each camera-projector pair, and then these estimates are averaged together to form an approximate reconstruction of the surface. Commonly the estimates may be formed by projecting sinusoidal fringes onto the surface and estimating the phases of the sinusoid at each pixel in the image.

Figure 1:
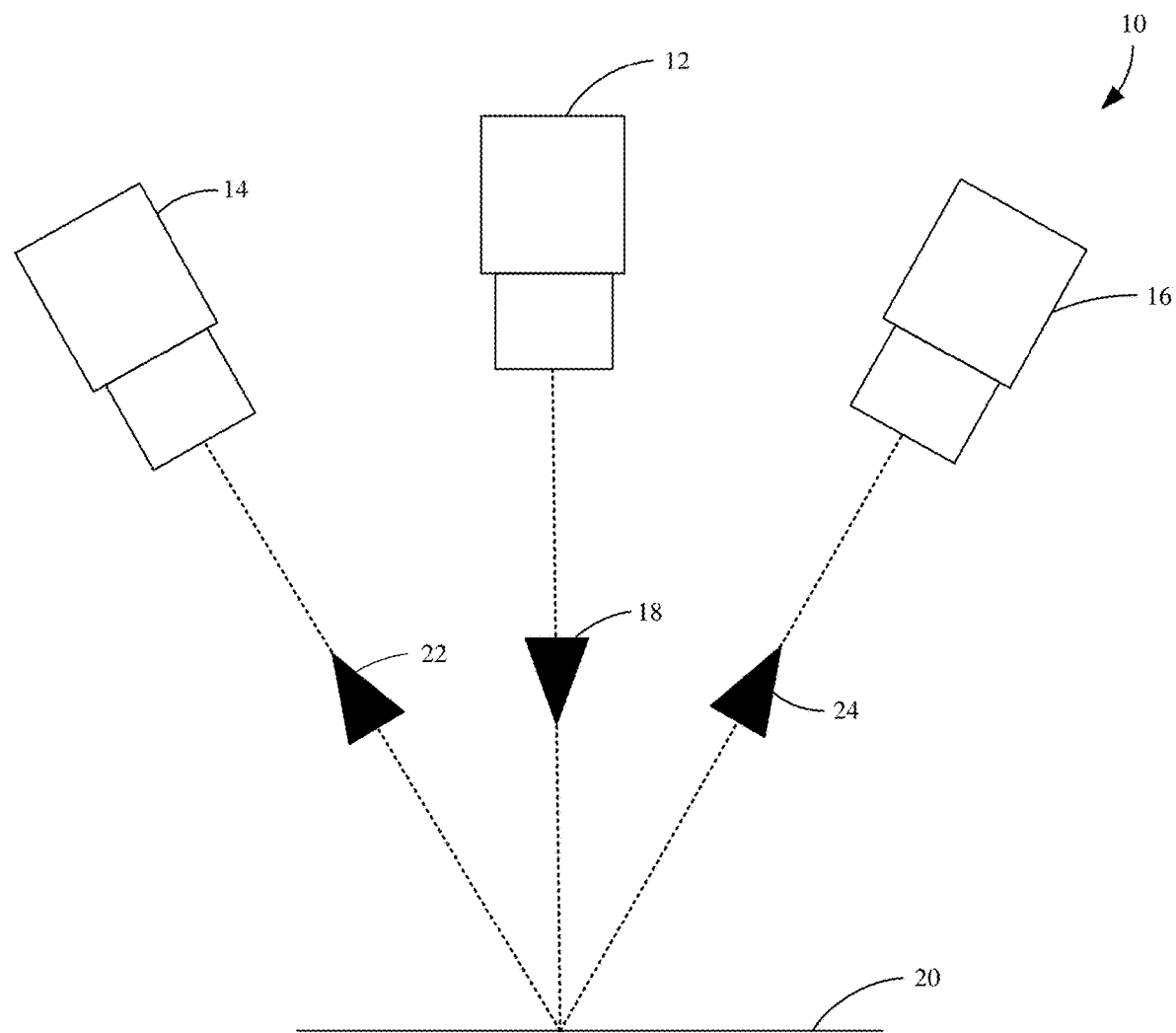
FIG. 1 is a diagrammatic view showing one example of a typical optical phase profilometry system.

FIG. 1 is a diagrammatic view showing one example of a typical optical phase profilometry system 10. System 10 includes projector 12, oblique camera 14, oblique camera 16, illumination 18, surface 20, reflection 22 and reflection 24. As described above, system 10 has a single projector 12 and multiple oblique cameras 14 and 16. Projector 12 projects illumination 18 onto surface 20 which is reflected as reflections 22 and 24 which are captured by multiple oblique cameras 14 and 16. While FIG. 1 shows a single projector/multiple oblique camera configuration, the equivalent, but opposite configuration, as described above, could also be used in a typical phase profilometry system wherein a single camera observes a surface onto which multiple oblique projectors project an illumination.

These typical systems have a number of limitations, particularly when observing an object having specular surfaces and/or challenging surface profiles (e.g. "rounded" and/or "curved" reflective surfaces, tilted target surface, variations in reflectance, etc.).

One challenge relates to measurement inaccuracies due to specular reflections. During optical inspection it is common to encounter a situation in which there is a glint (i.e. a bright specular reflection) at some location on the target surface from one imaging system's point of view. Glints occur when the surface normal of a highly reflective surface bisects the angle defined by the camera-projector pair. Because of the non-zero width of the imaging system's point spread function, which is a practical reality in imaging optics, used by optical phase profilometry, the phase estimate at neighboring pixels may be distorted by the phase observed at the glint since the reflection at the glint is much stronger than that of neighboring points on the surface. This can result in inaccurate points being added to that phase profilometry system's point cloud representation of the test surface.

Figure 2A:
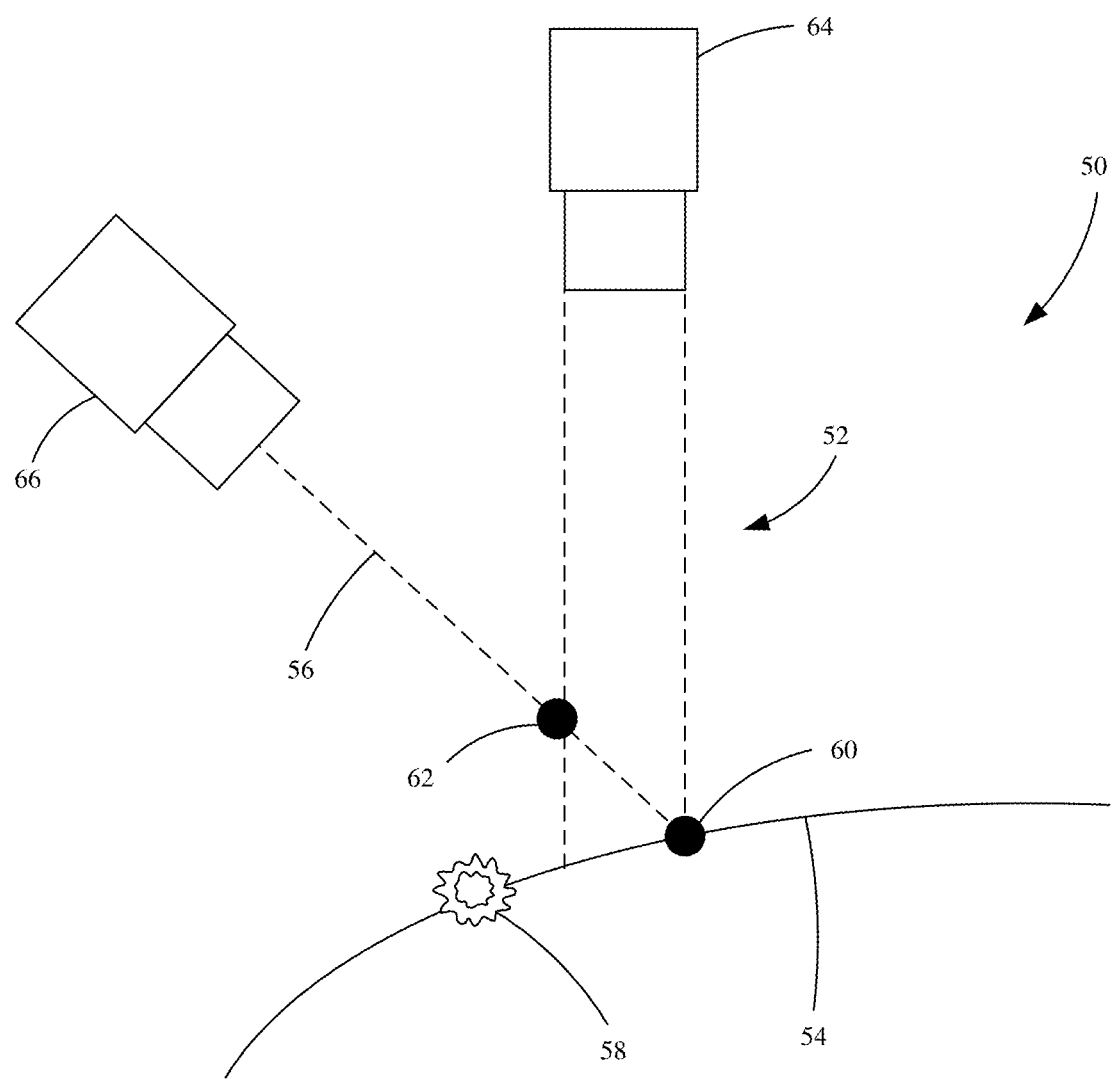
FIGS. 2A-2B are diagrammatic views showing example optical phase profilometry systems.

FIG. 2A is a diagrammatic view showing one example of an optical phase profilometry system 50. FIG. 2A depicts only one oblique camera's point of view. System 50 includes illumination 52, target surface 54, reflection 56, glint 58, actual surface point 60, erroneous surface point 62, projector 64 and first oblique camera 66. As can be seen in FIG. 2A, projector 64 projects illumination 52 onto target surface 54 which is reflected as reflection 56 towards and captured by first oblique camera 66. However, target surface 54 contains at least some specular portion which causes glint 58 to occur as illumination 52 reaches target surface 54. Due to the point spread function of camera 66 image properties and the strength of the reflection glint 58, phase information of illumination 52 appears in camera 66's image of surface point 60. Since the information that camera 66 receives from surface point 60 via reflection 56 is a combination of phase information of surface point 60 and glint 58, the reconstructed point of surface point 60 will be inaccurately measured. As shown in FIG. 2A, measure position surface point of camera 66 is moved along the ray of reflection 56 in the direction of glint 58, causing, for example, an erroneous surface point 62.

Figure 2B:
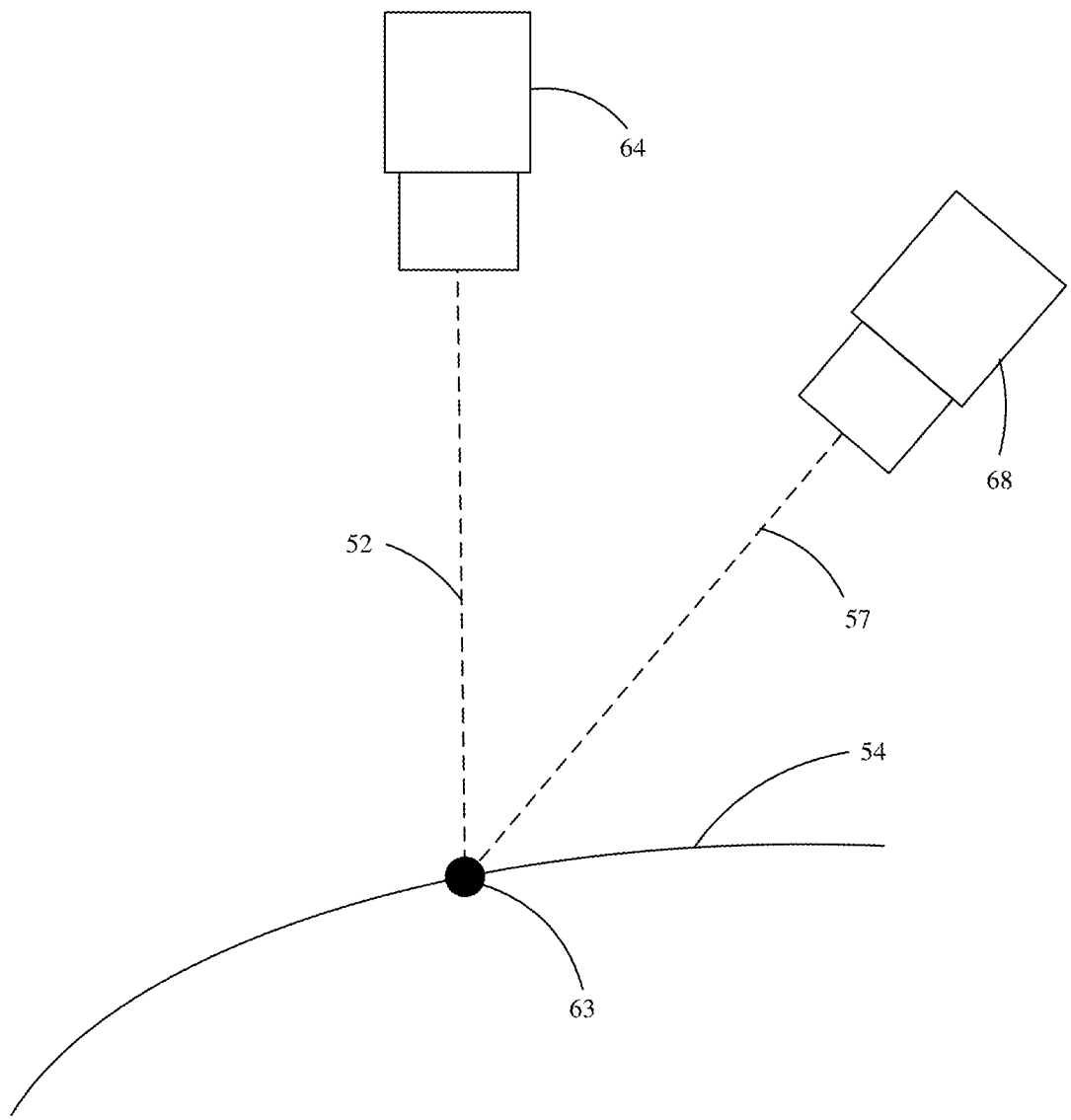

FIG. 2B is a diagrammatic view showing one example of an optical phase profilometry system 50. FIG. 2B depicts the point of view of the other oblique camera of system 50 (opposite to FIG. 2A). System 50 includes illumination 52, target surface 54, reflection 57, reconstructed surface point 63, projector 64 and second oblique camera 68. As can be seen in FIG. 2B, projector 64 projects illumination 52 onto target surface 54 which is reflected as reflection 57 towards and captured by second oblique camera 68. However, unlike in FIG. 2A, no glint occurs near surface point 63 from second oblique camera 68's point of view. Thus reconstructed surface point 63 of camera 68 is an accurate representation of the actual surface point.

However, while second oblique camera 68 accurately reconstructs the surface point, because, as described above, the estimates (e.g. point clouds) generated by both cameras 66 and 68 are combined during reconstruction of the final surface estimate of target surface 54, there will be an error due to the inaccurate point (62) measured by first oblique camera 66. The final surface estimate, therefore, will be biased by the error in first oblique camera 66's point cloud.

A similar effect as that described in FIGS. 2A-B can occur when there is any intensity gradient and/or reflectance gradient (e.g. variation in brightness) on the target surface. Due to the point spread function of the imaging optics (e.g. cameras 66 and 68), the phase at a darker point will be affected by the phase at a nearby brighter point. This can lead to inaccuracies in the final reconstruction (e.g. the final reconstruction will be biased towards the brighter point along the respective reflection (imaging system) ray).

Figure 2C:
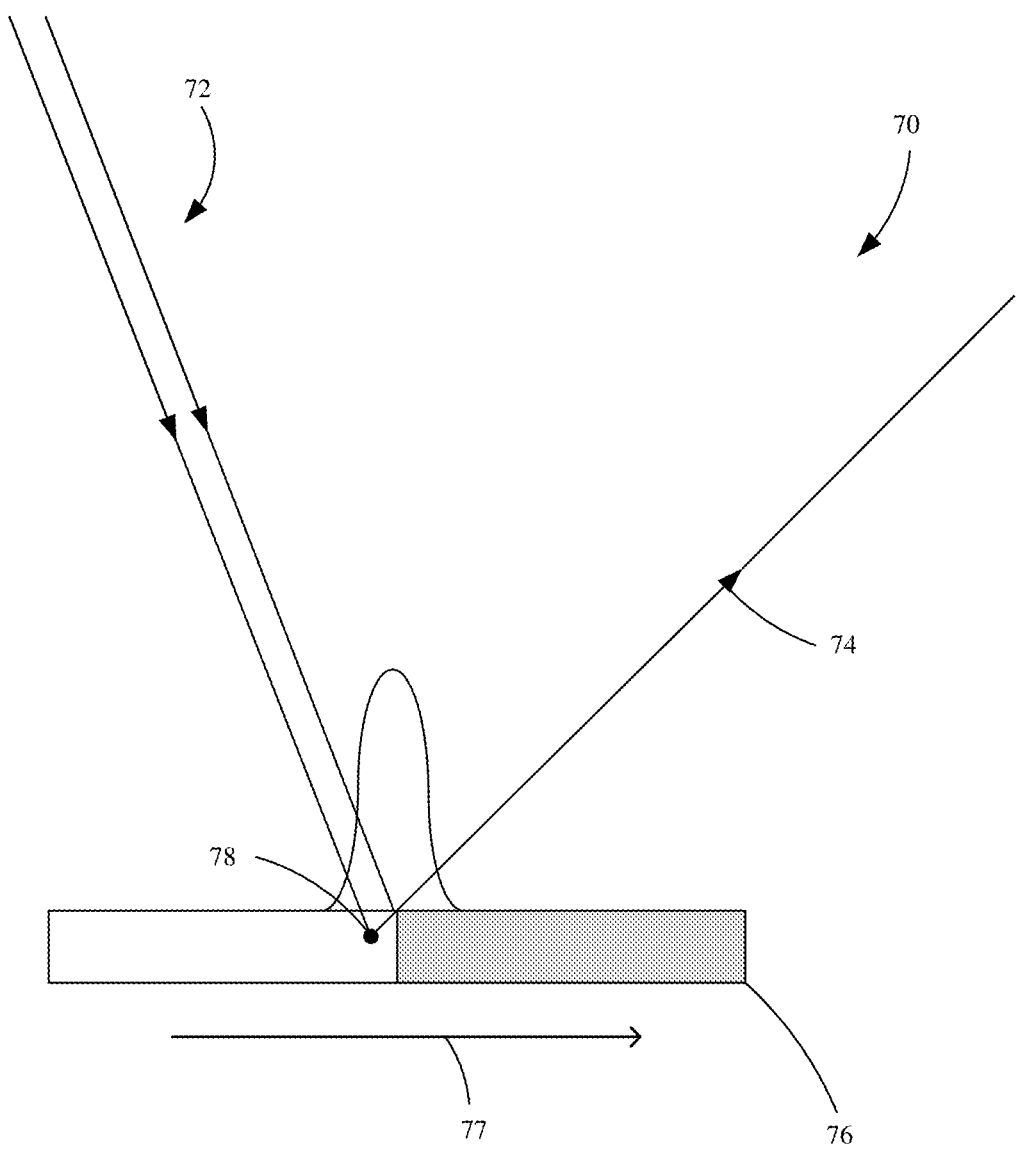
FIGS. 2C-2D are diagrammatic views showing example optical inspection environments.

FIG. 2C is a diagrammatic view showing one example of an optical inspection environment 70. Environment 70 includes projection 72, reflection 74, target surface 76, arrow 77 and measured surface point 78. Target surface 76 has an intensity and/or reflectance gradient, from "brighter" to "less-bright," left to right, as indicated by arrow 77. Generally, this means that target surface 76 is more to less reflective and/or more to less specular from left to right. Projection 72 is projected, by a projector or other illumination source, onto target surface 76 and reflected as reflection 74 which is captured by a camera or other imaging system. However, because of the gradient, the camera will decode the height as lower than the actual surface height, as indicated by measured surface point 78, as the increased brightness on the left of target 76 biases measured surface point 78 towards the brighter portion of target 76, along the reflection (imaging system) ray. Thus, the measurement output of the camera will be erroneous. This error tends to occur when the normal (e.g. perpendicular) of surface 76 bisects the angle between projection 72 and reflection 74.

Figure 2D:
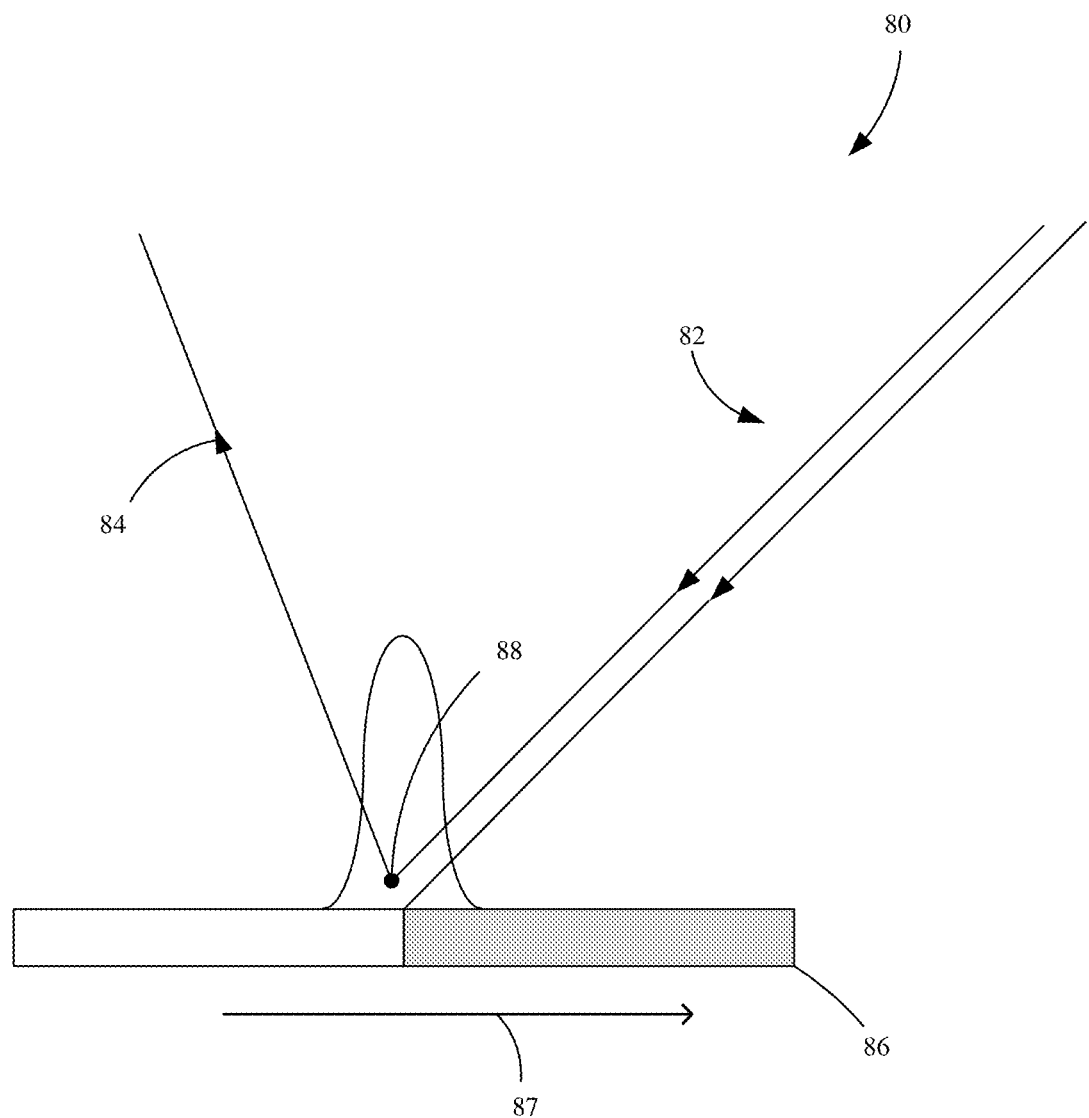

FIG. 2D is a diagrammatic view showing one example of an optical inspection environment 80. Environment 80 includes projection 82, reflection 84, target surface 86, arrow 87 and measured surface point 88. Environment 80 is similar to environment 70 except that projection 84 is coming from the right side ("less-bright side"/less specular side) of target surface 86 whereas projection 72 was coming from the left side ("brighter side"/more specular side) of target surface 76. Target surface 86 has an intensity and/or reflectance gradient, from "brighter" to "less-bright," left to right, as indicated by arrow 87. Generally, this means that target surface 86 is more to less reflective and/or more to less specular from left to right. Projection 82 is projected, by a projector or other illumination source, onto target surface 86 and reflected as reflection 84 which is captured by a camera or other imaging system. However, because of the gradient, the camera will decode the height as higher than the actual surface height, as indicated by measured surface point 88, as the increased brightness on the left of target 86 biases measured surface point 88 towards the brighter portion of target 86, along the reflection (imaging system) ray. Thus, the measurement output of the camera will be erroneous. This error tends to occur when the normal (e.g. perpendicular) of surface 86 bisects the angle between projection 82 and reflection 84.

To overcome the problems described above, a system using multiple coaxial illumination source/imaging system (e.g. projector/camera) pairs with a counterposed channel configuration is used.

For purposes of clarity, it is to be understood that the term "channel" refers to a specific illumination source-imaging system pair and the term "counterposed channels" refers to a pair of channels that are identical except that the illumination source and imaging system locations are interchanged. It is also to be understood that the term "channel" can comprise an illumination source from one operative pair (e.g. operative coaxial imaging system-illumination source pair) and an imaging system from another operative pair. It also to be understood that the term "channel" can comprise a camera from a first camera-projector pair and a projector from a second camera-projector pair.

Figure 3A:
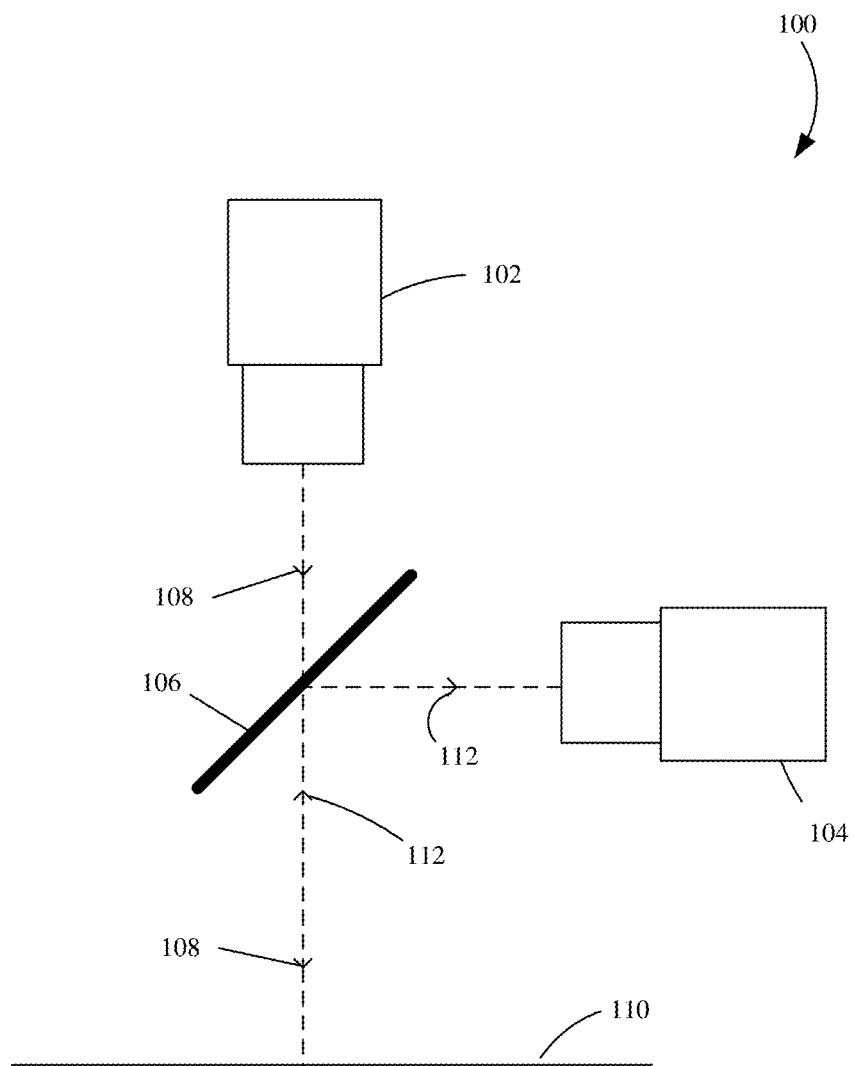
FIGS. 3A-3B are diagrammatic views showing example operative coaxial imaging system-illumination source pairs.

FIG. 3A is a diagrammatic view showing one example of an operative coaxial imaging system-illumination source pair. System 100 includes illumination source 102, imaging system 104, beam splitter 106, illumination 108, target surface 110 and reflection 112. Illumination source 102 (e.g. projector) projects illumination towards target surface 110 and hits beam splitter 106. A portion of illumination 108 continues towards target surface 110 and is reflected back towards beam splitter 106 and is reflected towards imaging system 104 as reflection 112. By utilizing beam splitter 106, system 100 is configured with illumination source 102 and imaging system 104 that share a common optical path. That is, illumination source 102 and imaging system 104 are approximately coaxial and effectively view target surface 110 from the same perspective/point of view.

Beam splitter 106, which is shown as a plate beam splitter, placed at 45° angle, consisting of a thin, flat glass plate that has been coated (e.g. half-silvered) on the surface facing towards illumination source 102. Beam splitter 106 "splits" illumination 108 in half, with a portion continuing (e.g. transmitted) towards target surface 110 (as shown) while another portion is reflected (not shown in FIG. 3A for purposes of clarity), usually towards a reference surface (e.g. a mirror) in the field of view of imaging system 104 which will reflect a reference beam (back through beam splitter 106) towards imaging system 104 (usually for purposes of recombining the split beam before it enters imaging system 104). While also not shown in FIG. 3A for purposes of clarity, system 100 can also include a number of lenses (e.g. collimating lens, object lens, a compound lens assembly, a telecentric lens assembly etc.), apertures, sensors, additional beam splitters, mirrors, and any other suitable components and/or devices. Additionally, while a plate beam splitter is shown, other types of beam splitters could be used, for example, but not limited to, a cube beam splitter.

While shown separated from each other in FIG. 3A for purposes of illustration, illumination source 102 and imaging system 104 are an operative pair that can be contained within a single housing. For purposes of illustration, certain future descriptions will show each operative illumination source/imaging system pair as a single assembly, as depicted in FIG. 3B.

Figure 3B:
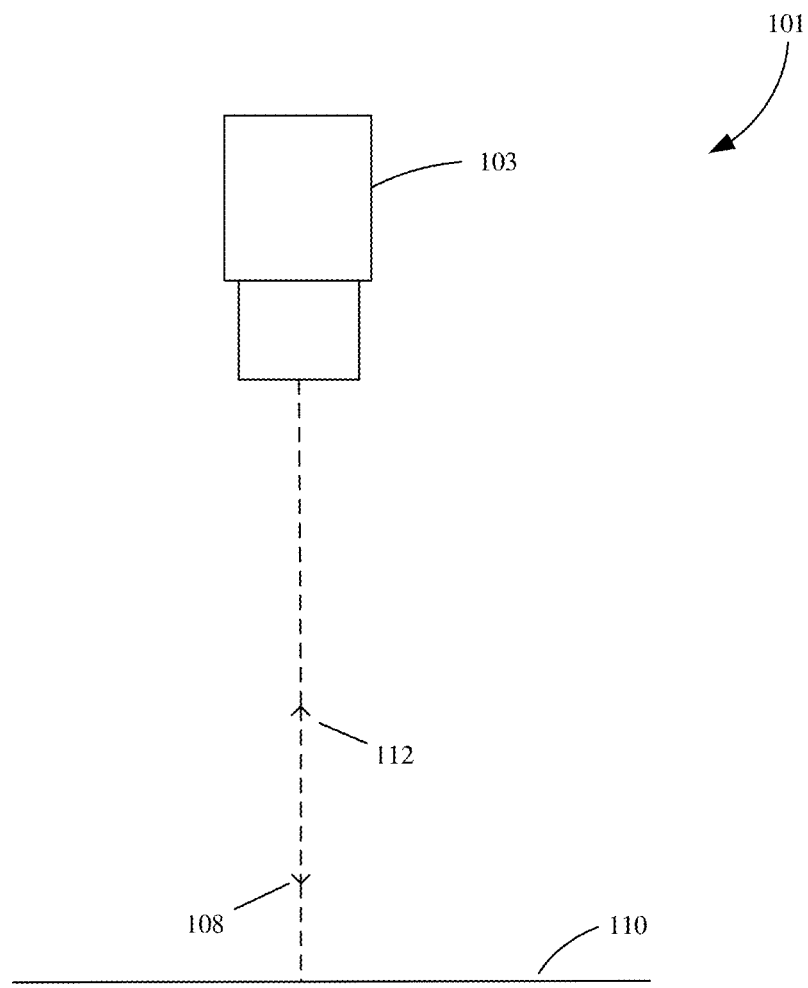

FIG. 3B. is a diagrammatic view showing one example of an operative coaxial illumination source/imaging system pair. FIG. 3B is a shorthand version of system 100 as shown in FIG. 3A and is similar to FIG. 3A and as such similar elements are numbered the same. System 101 includes operative illumination source/imaging system pair 103, which includes, but is not shown by numeral, illumination source 102, imaging system 104 and beam splitter 106. System 100 further includes illumination 108, target 110 and reflection 112. While illumination 108 and reflection 112 share a line in FIGS. 3A and 3B it is to be understood that it equally represents illumination 108 and reflection 112 as depicted by the arrows. Illumination source 102, in one example, comprises a projector. Imaging system 104, in one example, comprises a camera.

Figure 4A:
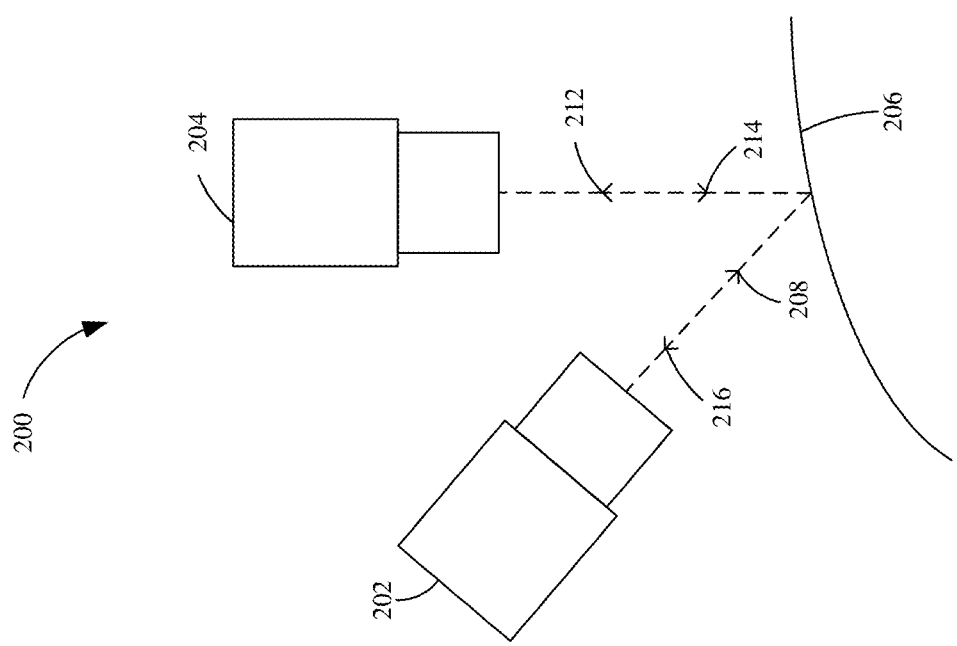
FIGS. 4A-4B are diagrammatic views showing example optical phase profilometry systems.

FIG. 4A is a diagrammatic view showing one example of an optical phase profilometry system 200. System 200 includes first illumination source/imaging system operative pair 202 and second illumination source/imaging system operative pair 204. Operative pairs 202 and 204 are coaxial pairs, as described above with reference to FIGS. 3A-3B. System 200 further includes target surface 206, illuminations 208 and 214 and reflections 212 and 216. The configuration (e.g. alignment geometry) shown in FIG. 4A utilizes two operative pairs 202 and 204, each viewing target surface 206 from a different angle and forms two counterposed channels (as will be further described below).

Figure 4B:
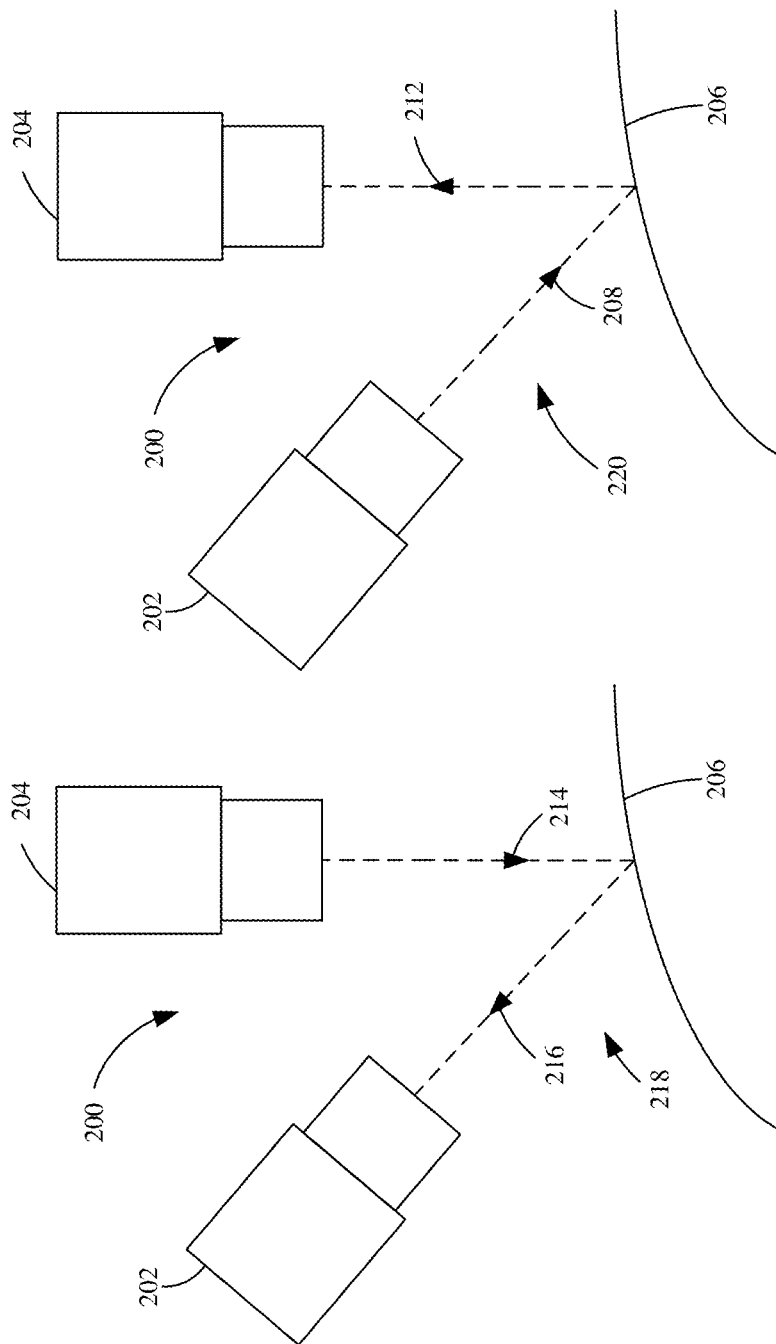

FIG. 4B is a diagrammatic view showing one example of an optical phase profilometry system 200. FIG. 4B is similar to FIG. 4A and thus similar elements will be numbered similarly. FIG. 4B illustratively splits system 200 into their respective illumination and imaging components for purposes of illustrating the two counterposed channels formed by the configuration of system 200. On the left, the illumination source in operative pair 204 projects illumination 214 onto target surface 206 which is reflected therefrom as reflection 216 and captured by the imaging system of operative pair 202. This optical pathway (e.g. channel) (214 and 216) forms a first counterposed channel 218.

On the right, the illumination source in operative pair 202 projects illumination 208 onto target surface 206 which is reflected therefrom as reflection 212 and captured by the imaging system of operative pair 204. This optical pathway (e.g. channel) (208 and 214) forms a second counterposed channel 220.

Using counterposed channels is advantageous. Both channels 218 and 220 observe/expose the same field of view and share the same relative angle between illumination and reflection, so there is no difference in optical coverage. More importantly, they are more robust in that they eliminate and/or reduce the measurement errors described earlier (FIGS. 2A-2B) in reference to the effects of the imaging systems' point spread functions in the presence of glints or intensity gradients. Specifically, when these errors occur in system 200, the corresponding points from the two channels 218 and 220s' estimations (e.g. point clouds) move in nearly equal and opposite directions. By using an appropriate algorithm, channels 218 and 220s' estimations can be combined in such a way that the errors mostly and/or substantially cancel one another out. In this sense, the counterposed channels 218 and 220 are complementary to one another and are self-compensating. This is more fully illustrated in the Figures below.

Figure 5A:
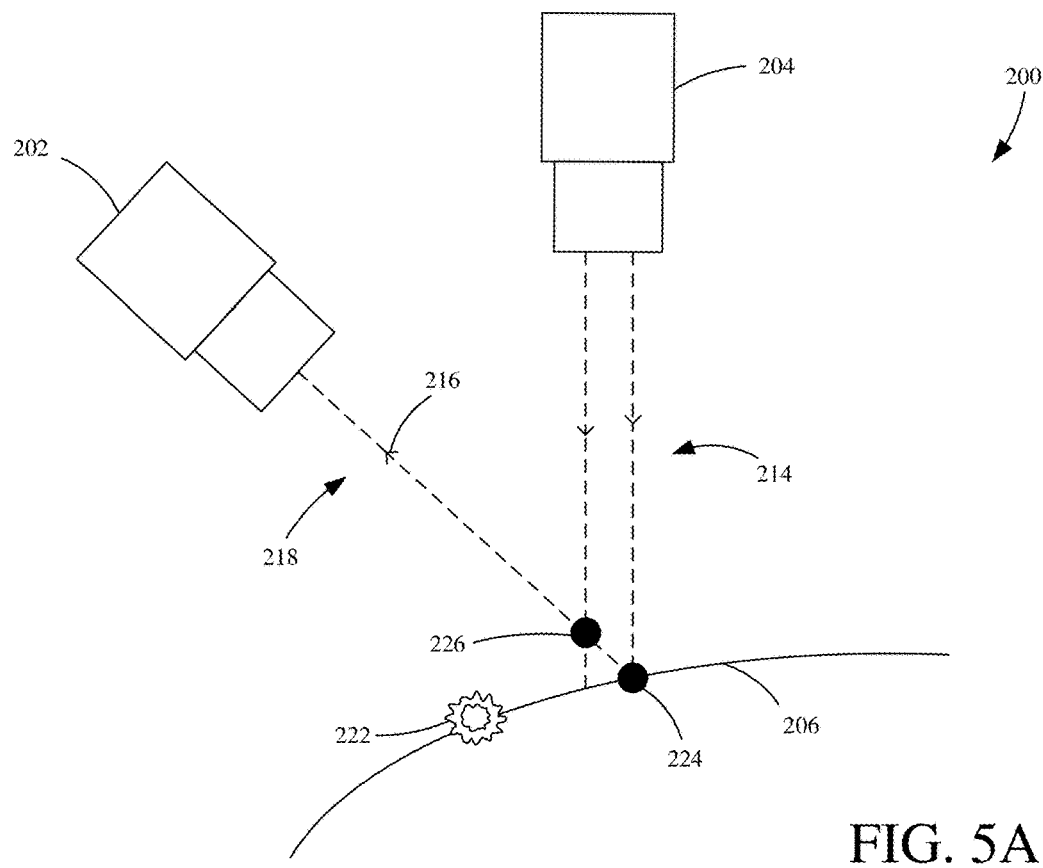
FIGS. 5A-5B are diagrammatic views showing example optical phase profilometry systems.

FIG. 5A is a diagrammatic view showing one example of an optical phase profilometry system. FIG. 5A is similar to FIG. 4A and thus similar features are numbered the same. System 200 includes operative illumination source/imaging system pair 202, operative illumination source/imaging system pair 204, surface target 206, illumination 214 and reflection 216, which form first counterposed channel 218. System 200 further includes glint 222, actual surface point 224 and erroneous surface point 226. Similar to the phenomenon in FIG. 2A, glint 222 causes the imaging system of operative pair 202 to generate an erroneous surface point 226. The actual surface point 224 is moved along the ray of reflection 216 in the direction of glint 222.

Figure 5B:
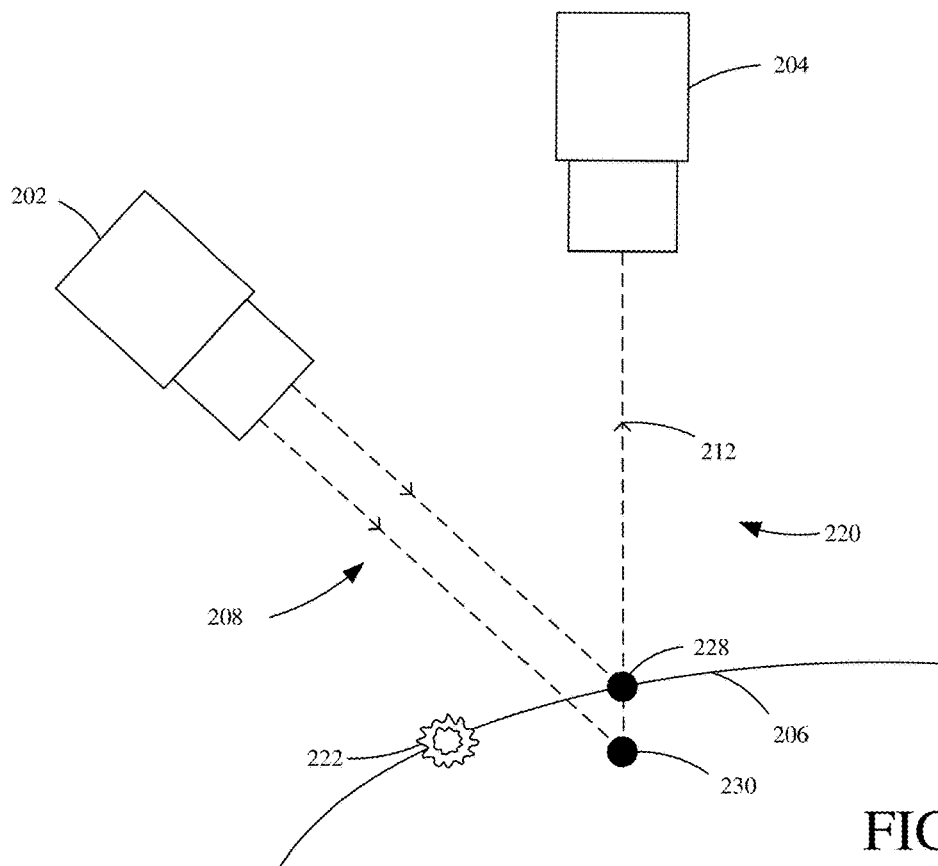

FIG. 5B is a diagrammatic view showing one example of an optical phase profilometry system. FIG. 5B is similar to FIG. 4A and thus similar features are numbered the same. System 200 includes operative illumination source/imaging system pair 202, operative illumination source/imaging system pair 204, surface target 206, illumination 208 and reflection 212, which form second counterposed channel 220. System 200 further includes glint 222, actual surface point 228 and reconstructed surface point 230. Again here, glint 222 causes a measurement error. The imaging system of operative pair 204 generates an erroneous reconstructed surface point 230. The actual surface point 228 is pulled along reflection 212 ray (just as the erroneous reconstructed surface points in FIGS. 5A and 2A). However, because operative pairs 202 and 204 are coaxial, and because they are configured to form two counterposed channels, the error is oppositely equal and thus can be compensated for.

As discussed above, each of the counterposed channels 218 and 220 generates an estimation (point cloud) of target surface 206. These estimations will contain errors resulting from the effect of the imaging systems' point spread functions in the presence of glints (e.g. 222) or intensity gradients. However, because of counterposed channels 218 and 220 the errors in the reconstructed surface points 226 and 230 are equal and opposite along their respective rays of reflections 216 and 212 and thus can compensate for one another.

Figure 6:
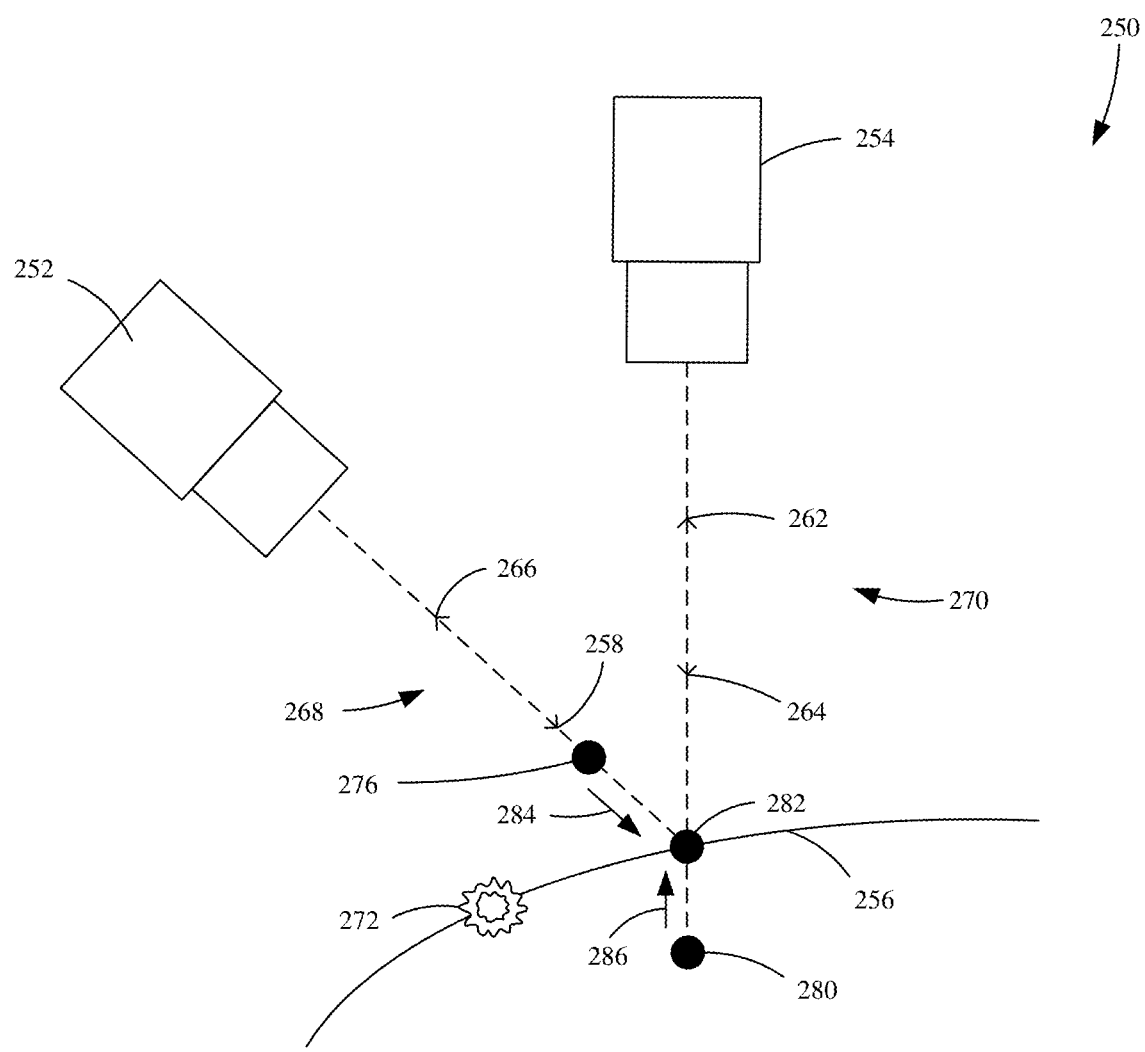
FIG. 6 is a diagrammatic view showing one example of an optical phase profilometry system.

FIG. 6 is a diagrammatic view showing one example of an optical phase profilometry system 250. System 250 includes operative pairs 252 and 254, target surface 256, illuminations 258 and 254, reflections 262 and 266, counterposed channels 268 and 270, glint 272, erroneous reconstructed surface points 276 and 280, correctly reconstructed surface point 282 and arrows 284 and 286. The error in reconstructed surface points 276 and 280 can be corrected to create reconstruction point 282 by moving the erroneous points 276 and 280 along their respective reflection rays 266 and 262, as indicated by arrows 284 and 286, until they intersect and define a new, more accurate representation of the surface target position. The direction of the reflection rays is derived, in one example, by mapping the imaging systems' pixel location within a field of view to the angle of reception using imaging system calibration techniques.

In another embodiment, it is possible to approximate the intersection of the erroneous reconstruction points of the counterposed channels with use of an algorithm. Speaking generally, the algorithm iteratively refines each respective estimation (point cloud) from the counterposed channels, successively moving each point in small steps along its reflection ray (imaging system ray) towards the other point cloud.

Figure 7:
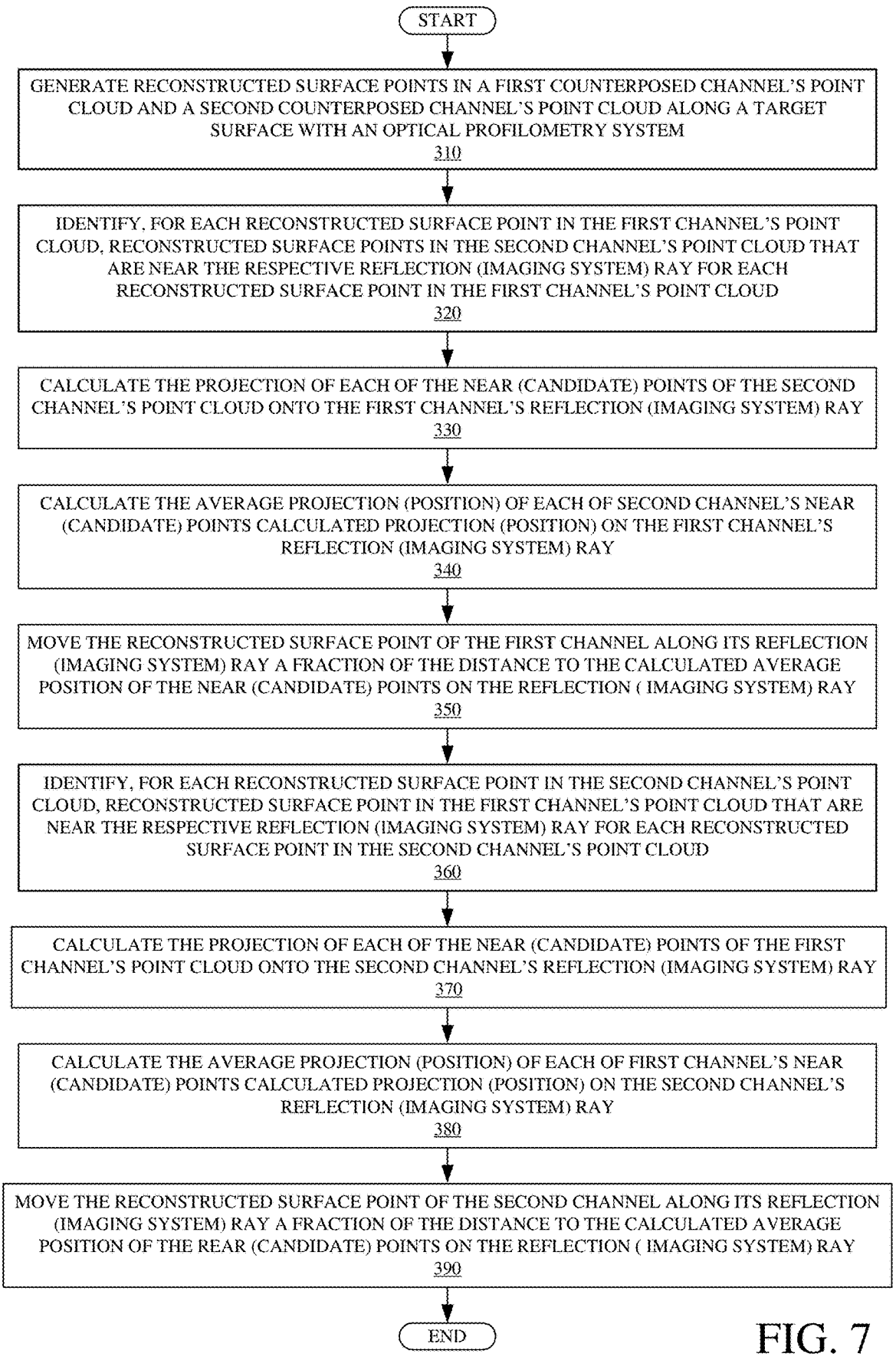
FIG. 7 is a flowchart showing one example method of iterative joint point cloud refinement.

FIG. 7 is a flowchart showing one example method of iterative joint point cloud refinement. Method 300 begins at block 310 where reconstructed surface points are generated in a first counterposed channel's point cloud and a second counterposed channel's point cloud along a target surface using an optical profilometry system. Surface points are reconstructed (estimated) for both the first and second counterposed channels' point clouds. In one example, an optical profilometry system such as system 250 is used.

The method continues at block 320 where, for each reconstructed surface point in the first channel's point cloud, reconstructed surface points in the second channel's point cloud near the respective reflection (imaging system) ray for each reconstructed surface point in the first channel's point cloud are identified. This identification step identifies a set of "candidate" points on the second channel's point cloud that are near to the chosen first channel's reconstructed surface point's reflection (imaging system) ray.

The method continues at block 330 where the projection of each of the near (candidate) points of the second channel's point cloud are calculated onto the first channel's reflection (imaging system) ray. In other words, the distance that each of the near (candidate) points of the second channel would be along the first channel's reflection (imaging system) ray is calculated. Or to put it another way, calculate where along the first channel's reflection (imaging system) ray where each of the near (candidate) points should be positioned.

The method continues at block 340 where the average projection (position) of each of the second channel's near (candidate) points calculated projections (positions) on the first channel's reflection (imaging system) ray is calculated. In other words, calculate the average position of the near points on the reflection ray.

The method continues at block 350 where the reconstructed surface point of the first channel is moved along its reflection (imaging system) ray a fraction of the distance to the calculated average position of the near (candidate) points on the reflection (imaging system) ray.

Method 300 continues at block 360 where, for each reconstructed surface point in the second channel's point cloud, reconstructed surface points in the first channel's point cloud near the respective reflection (imaging system) ray for each reconstructed surface point in the second channel's point cloud are identified. This identification step identifies a set of "candidate" points on the first channel's point cloud that are near the chosen second channel's reconstructed surface point's reflection (imaging system) ray.

Method 300 continue at block 370 where the projection of each of the near (candidate) points of the first channel's point cloud are calculated onto the second channel's reflection (imaging system) ray. In other words, the distance that each of the near (candidate) points of the first channel would be along the second channel's reflection (imaging system) ray would each of the near (candidate) points be.

The method continues at block 380 where the average projection (position) of each of the first channel's near (candidate) points calculated projections (positions) on the second channel's reflection (imaging system) ray is calculated. In other words, calculate the average position of the near points on the reflection ray.

The method continues at block 390 where the reconstructed surface point of the second channel is moved along its reflection (imaging system) ray a fraction of the distance to the calculated average position of the near (candidate) points on the reflection (imaging system) ray.

Figure 8:
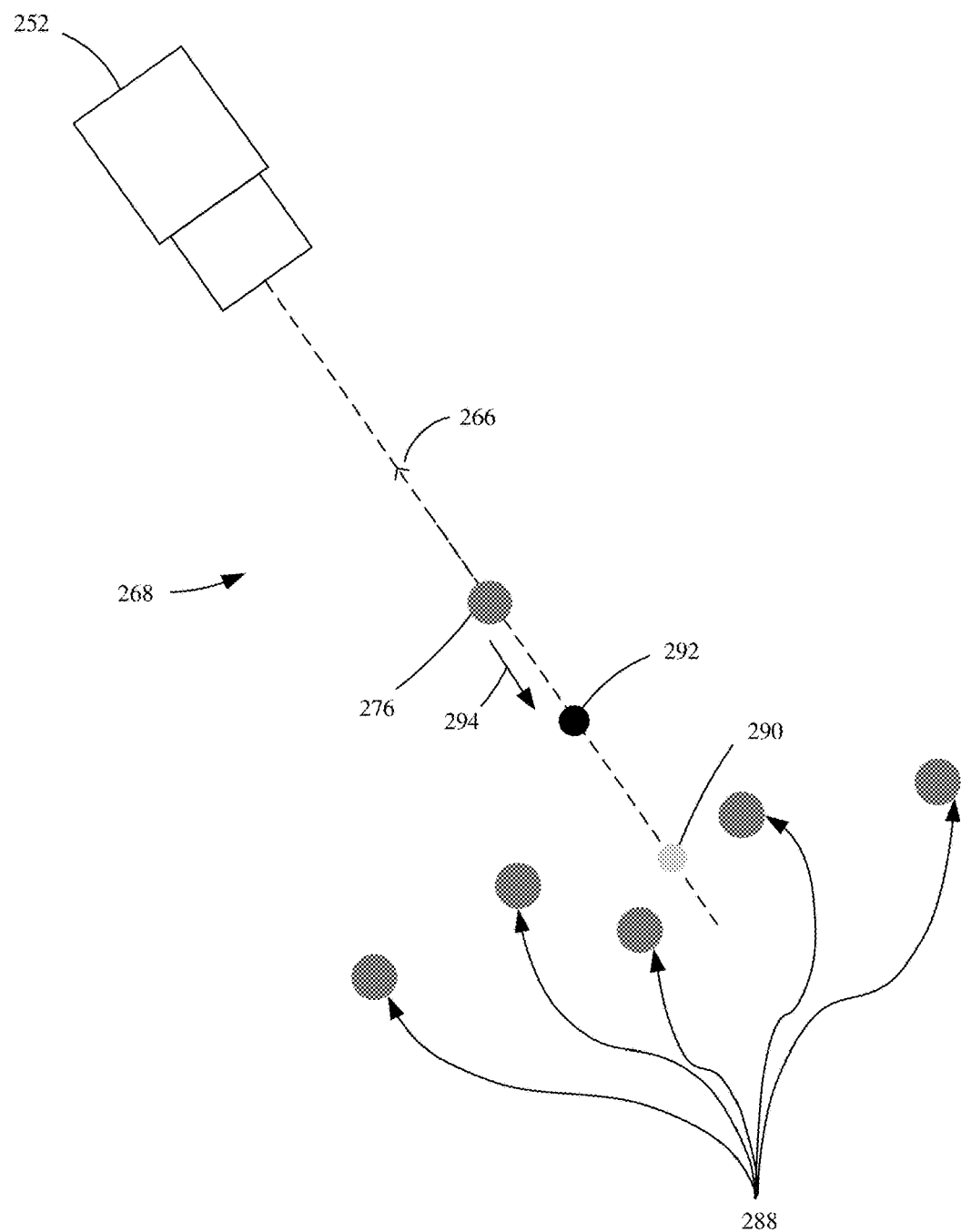
FIG. 8 is a diagrammatic view showing one iteration of iterative joint point cloud refinement.

FIG. 8 is a diagrammatic view showing one iteration of method 300. In particular, FIG. 8 depicts blocks 310-350. Iteration 301 includes operative illumination source/imaging system 252, reflection 266 (or reflection/imaging system ray) which forms a portion of first counterposed channel 268, first channel surface point 276, near (candidate) points 288, average projection point 290, relocated (refined) point 292 and arrow 294. Near (candidate) points 288 that are near to reflection 266 are identified. Near points 288 average projection (position) point along reflection 266 is calculated as represented by 290. Once average projection point 290 is calculated, relocated (refined) reconstruction point 292 is identified by moving recalculated surface point 276 along reflection 266 a fraction of the way towards average projection point 290 as indicated by arrow 294.

Figure 9:
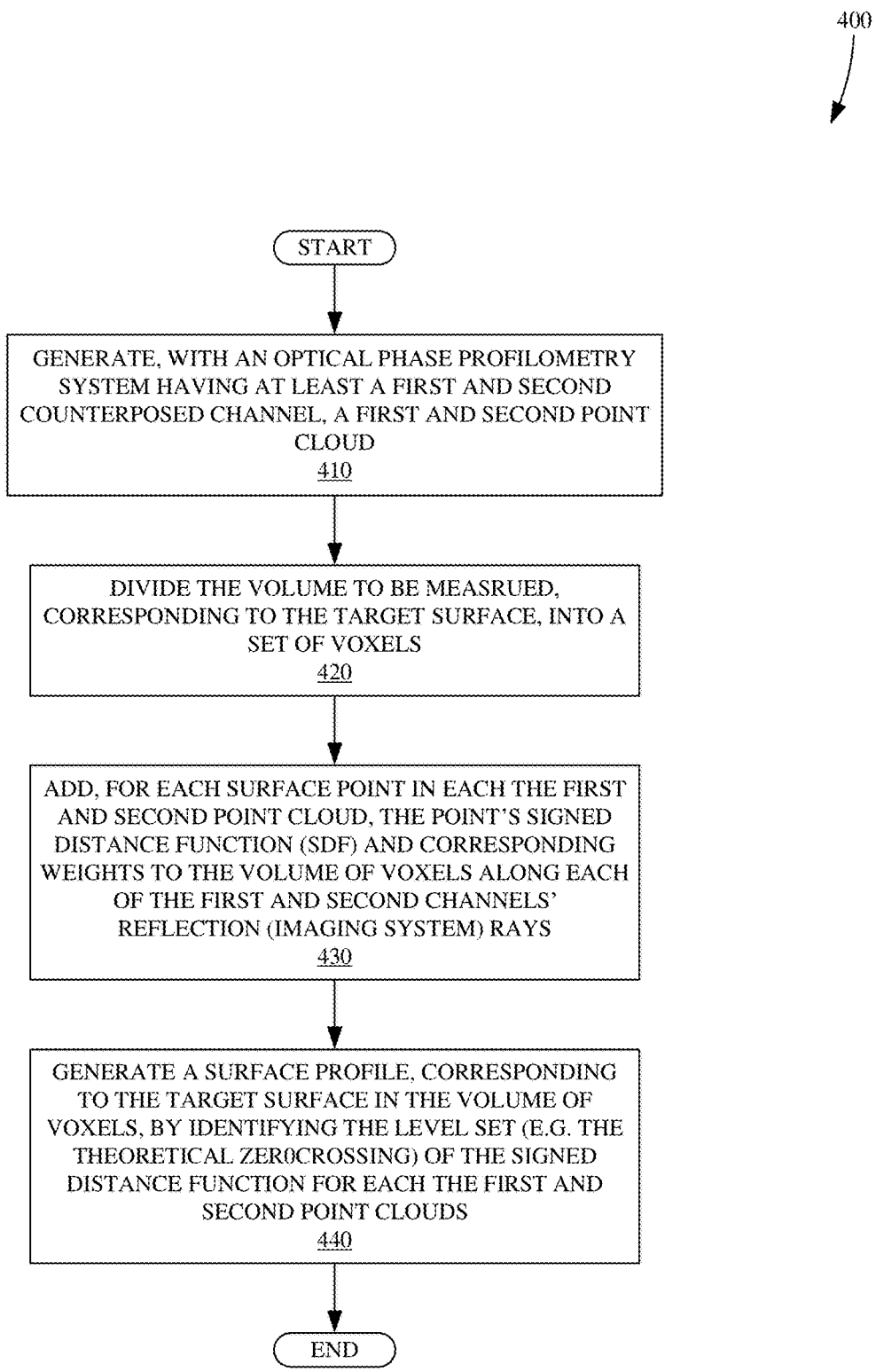
FIG. 9 is a flowchart showing one example method of merging point clouds from counterposed channels.

FIG. 9 is a flowchart showing one example method of merging point clouds from counterposed channels. Method 400 begins at block 410 by generating, with an optical phase profilometry system having at least a first and second counterposed channel, a first and second point cloud. Wherein each the first and second counterposed channels generate the respective first and second point clouds. And, wherein, each the first and second point clouds have a plurality of surface points corresponding to a measured surface point along a target surface.

Method 400 continues at block 420 where the volume to be measured, corresponding to the target surface, is divided into a set of voxels. Method 400 continues at block 430 where for each surface point in each the first and second point cloud, the point's Signed Distance Function (SDF) and corresponding weights are added to the volume of voxels along each of the first and second counterposed channels' reflection (imaging system) rays. The signed distance is the distance from a point to a reference surface measured in a specified direction. For instance, elevation is the signed distance to sea level, with positive values for points above sea level and negative values for points below sea level. The Signed Distance Function (SDF) is the function that computes this distance for a specified point, in this case, the signed distance represents the distance from an individual voxel to a point in the point cloud.

Method 400 continues at block 440 where a surface profile map, corresponding to the target surface in the volume of voxels, is generated by identifying the level set (e.g. the theoretical zero-crossing) of the SDF for each the first and second point clouds.

Figure 10A:
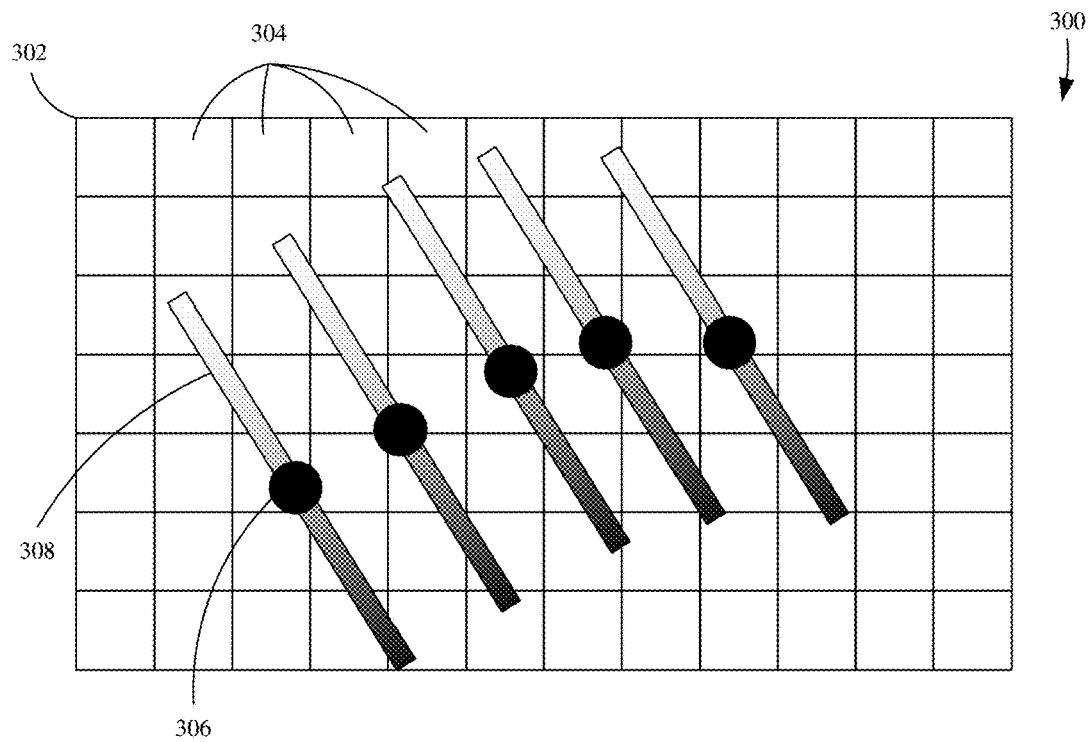
FIG. 10A-10C are diagrammatic views showing one example of merging point clouds from counterposed channels.
Figure 10B:
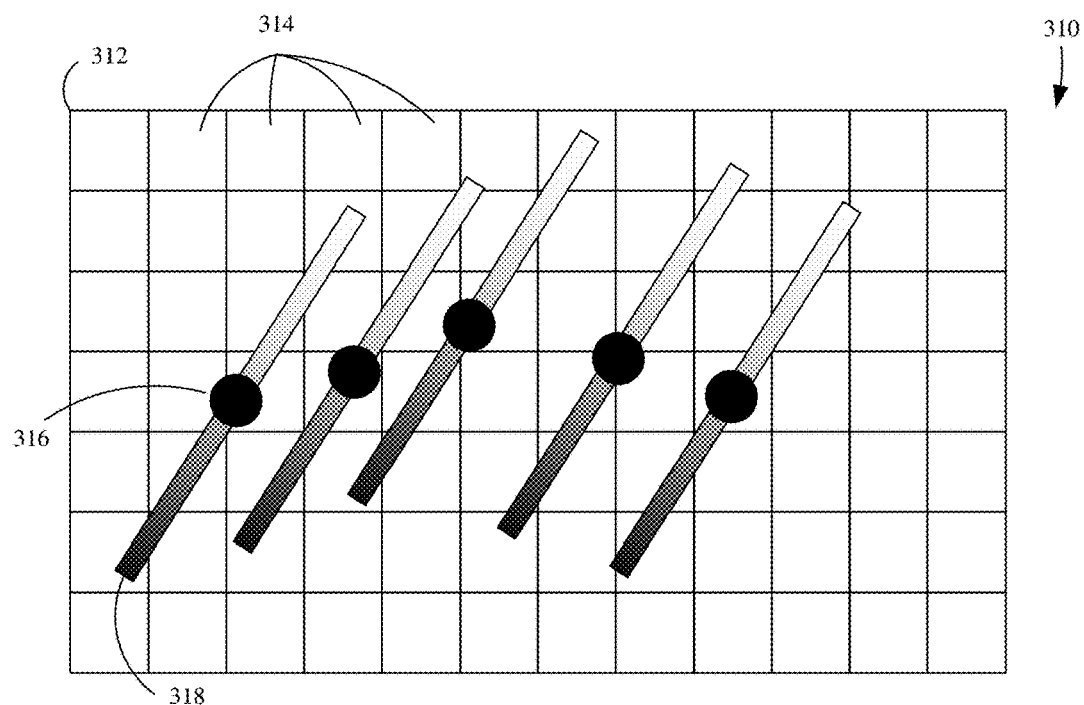
Figure 10C:
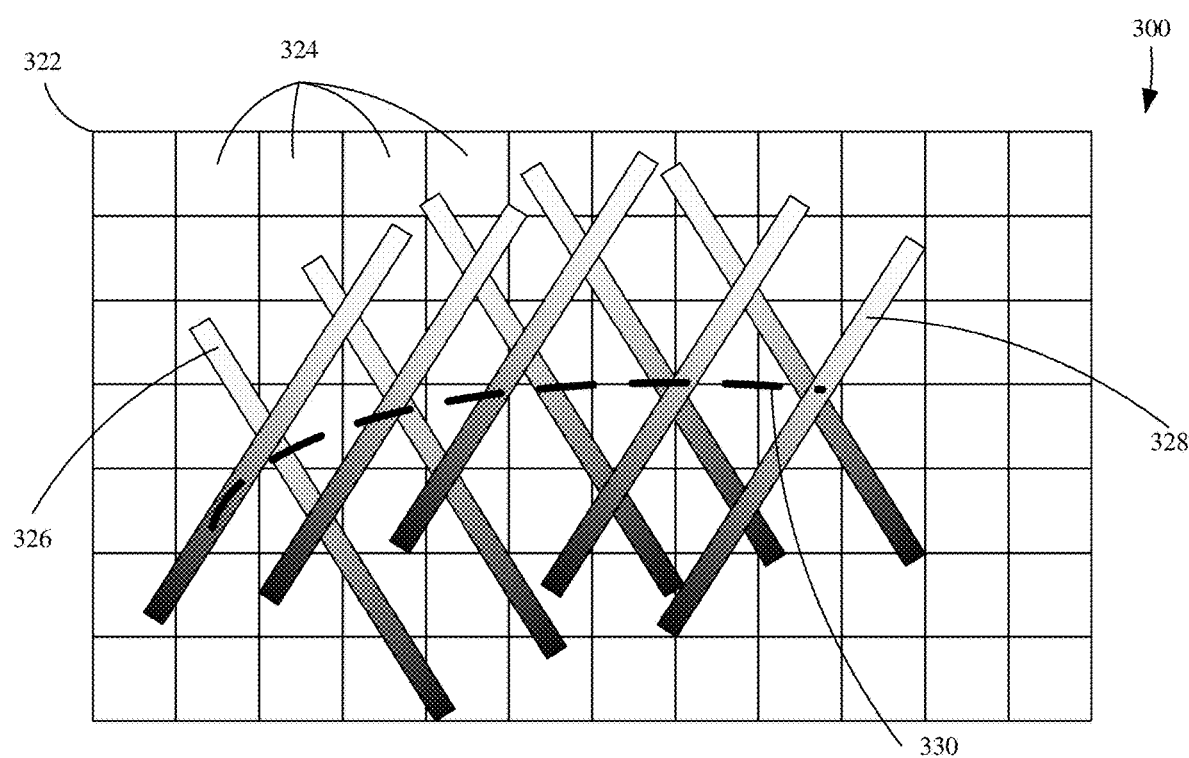

FIGS. 10A-10C are diagrammatic views showing one example of merging point clouds from counterposed channels. More particularly, FIGS. 10A-10C illustrate one example of performing method 400. It is to be understood that the volumes and voxels shown in FIGS. 10A-10C are 3D objects that define the whole measurement space of the optical phase profilometry system. For purposes of illustrative clarity, the volumes and voxels are shown in 2D.

FIG. 10A is a diagrammatic view showing one example of a point cloud corresponding to a first counterposed channel in a volume of voxels. Voxel volume 300 includes volume to be measured 302, voxel(s) 304, surface point(s) 306, and reflection (imaging system) ray(s) 308. Generally, voxel volume 300 shows volume to be measured 302, having a plurality of voxels 304, wherein a plurality of surface points 306, with each respective point's SDF and corresponding weight along its respective reflection (imaging system) ray 308, added to the volume to be measured 302.

FIG. 10B is a diagrammatic view showing one example of a point cloud corresponding to a second counterposed channel in a volume of voxels. Voxel volume 310 includes volume to be measured 312, voxel(s) 314, surface point(s) 316, and reflection (imaging system) ray(s) 318. Generally, voxel volume 310 shows volume to be measured 302, having a plurality of voxels 304, wherein a plurality of surface points 316, with each respective point's SDF and corresponding weight along its respective reflection (imaging system) ray 318 added to the volume to be measured 312.

FIG. 10C is a diagrammatic view showing one example of merging point clouds from a first and second counterposed channel. Voxel volume 320 includes volume to be measured 322, voxel(s) 324, first counterposed channel reflection (imaging system) ray(s) 326, second counterposed channel reflection (imaging system) ray(s) 328, and target surface approximation 330. Generally, voxel volume 320 shows a target surface profile map that is generated by identifying the level set (e.g. the theoretical zero-crossing) of the SDF for each the first and second point clouds, as is represented by target surface approximation 330, which corresponds to a target surface in volume to be measured 322.

Another particular challenge for typical optical phase profilometry systems is the accurate measurement of target surfaces and/or objects having rounded/spherical profiles (e.g. a ball). Particularly when these target surfaces and/or objects have specular surface portions which can cause glints.

As mentioned above, the typical optical phase profilometry system it is a common to have a single projector illuminating the surface with a structured pattern and multiple oblique cameras observing the surface. Or, the opposite, but equivalent configuration is used, with a single camera and two oblique projectors.

Figure 11A:
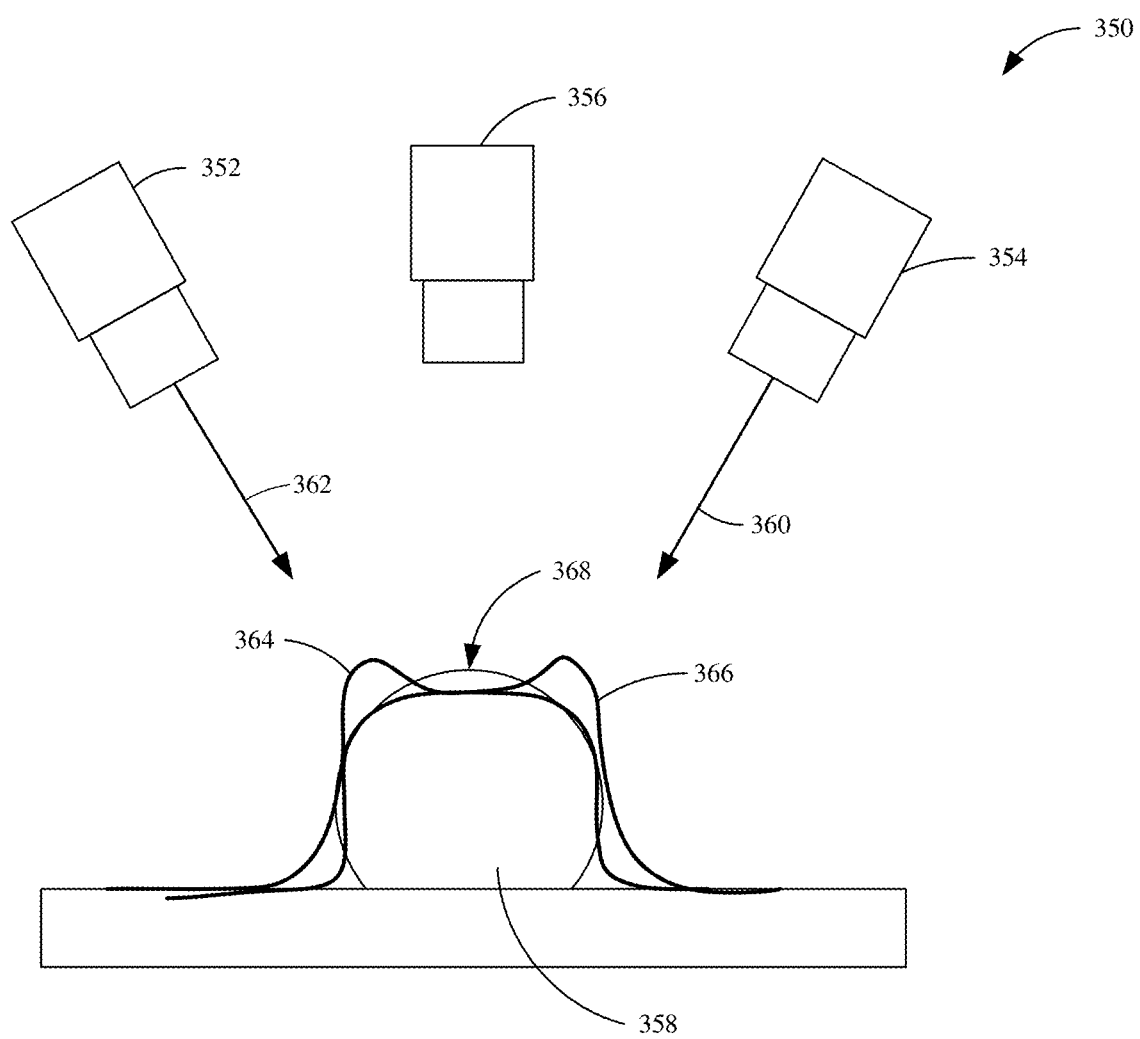
FIG. 11A is a diagrammatic view showing one example of an optical phase profilometry system.

FIG. 11A is a diagrammatic view showing one example of an optical phase profilometry system. System 350 includes first oblique projector 352, second oblique projector 354, camera 356, spherical target 358, projections 360 and 362, first oblique projector measurement 364, second oblique projector measurement 366 and height error 368. System 350 suffers from the effects of the phenomenon described in reference to FIGS. 2A and 2B, namely, measurement errors due to glints. As can be seen in FIG. 11A, first oblique projector 352 generates, in combination with camera 356, measurement 364 which shows height error 368 on the top of spherical target 358 (e.g. a height divot error). Similarly, second oblique projector 354 generates, in combination with camera 356, measurement 366 which shows height error 368 on the top of spherical target 358 (e.g. a height divot error). This error is caused by the occurrence of glints due to the combination of the oblique angle of each of the respective projectors and the point of view of the camera in combination with its point spread function, as described previously. Each respective projector is affected by glint from a different location on spherical target 358. In triangulation systems, such as embodiments of the present invention, the measured location of a feature is perturbed by a glint. The magnitude of the perturbation is modulated by the product of two factors: 1) the distance to the glint; and 2) the Point Spread Function (PSF) of the glint. Thus, a plot of the perturbation tends to have a tilt over the localized region corresponding to the width of the PSF. We call this a "divot" because of its resemblance to the divot produced by a wayward golf swing.

Figure 11B:
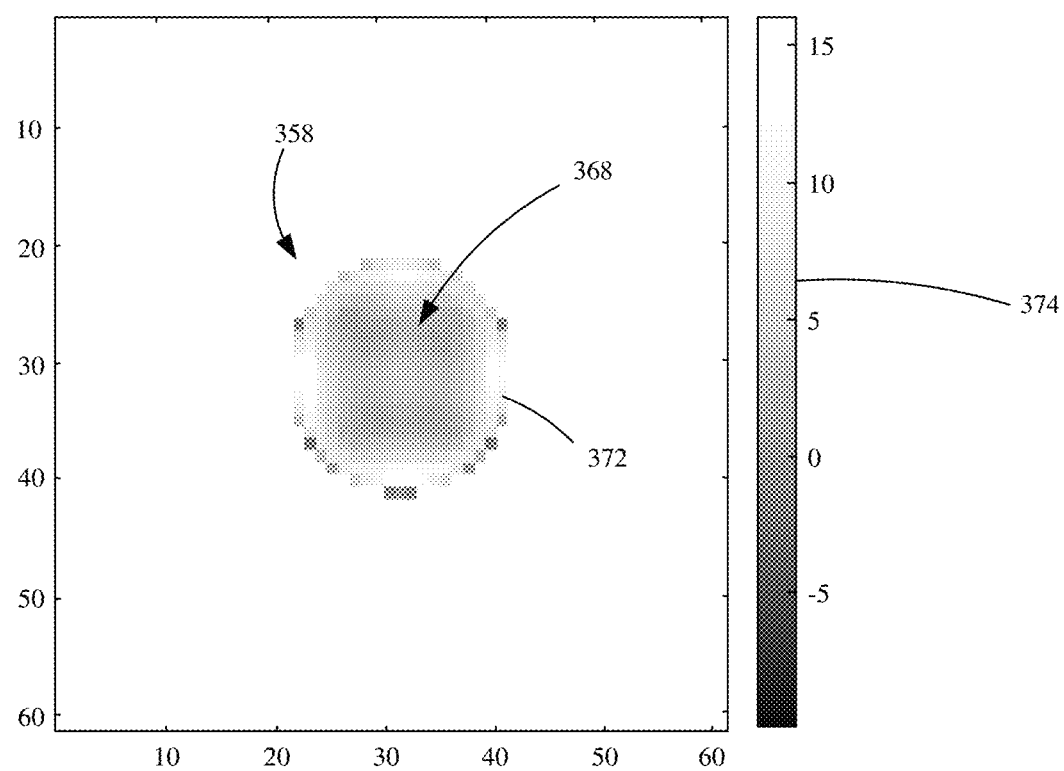
FIGS. 11B-11C are diagrammatic views showing example generated three-dimensional profiles of a spherical target.

FIG. 11B is a diagrammatic view showing one example of a generated three-dimensional profile of spherical target 358 using system 350. As can be seen in profile 370, height error 368 occurs, showing a "height divot error". As can be seen, there is a clear reduction in the height measurement, as reflected by height measurement units 374 at the top of spherical target 358 where it should be at the apex of its height. Compare, for example, the height readings at the outside 372 of target 358 as compared to the height readings at the area indicated as height error 368.

Figure 11C:
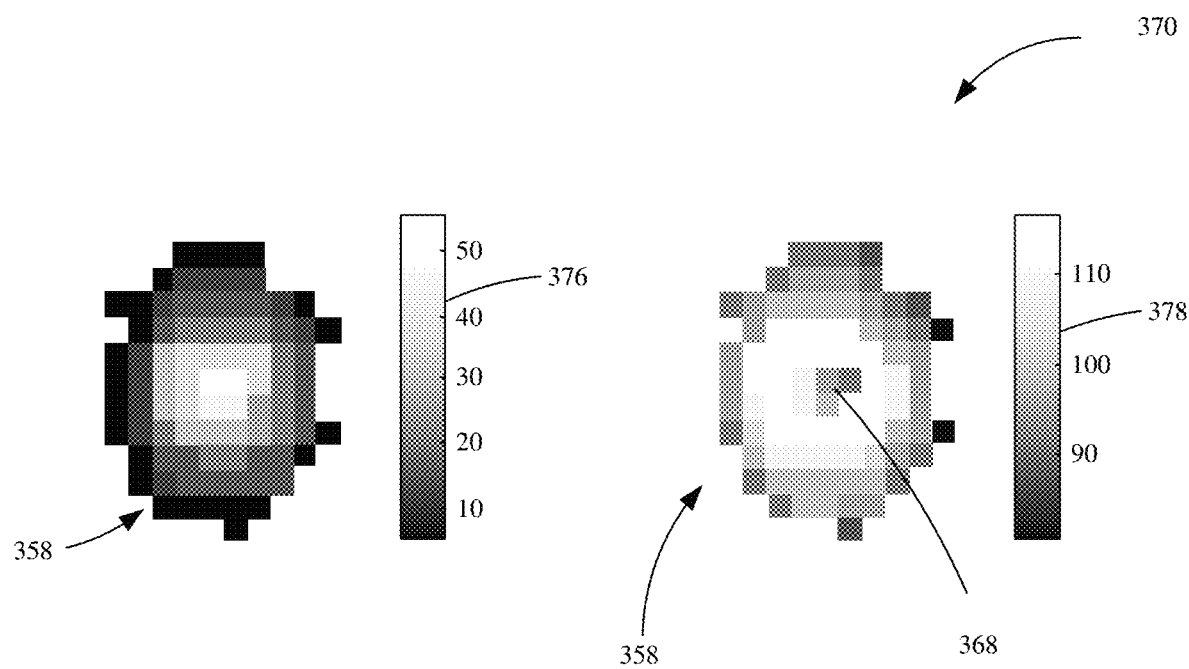

This height divot error is not solved by using a single projector multiple oblique camera system, as will be shown in FIG. 11C.

FIG. 11C is a diagrammatic view showing one example of a three-dimensional profile of spherical target 358. On the left is a measured Z height of target 358, which shows the actual height profile of target 358. As can be seen, target 358 is at the apex of its height at the center of the image (which corresponds to the top of target 358) as is reflected by height measurement units 376. On the right, however, is the three-dimensional profile of spherical target 358 generated by a single projector/two oblique camera system. As can be seen, height error 368 occurs at the center of the image (which corresponds to the top of target 358) as is reflected by height measurement units 378.

Figure 12:
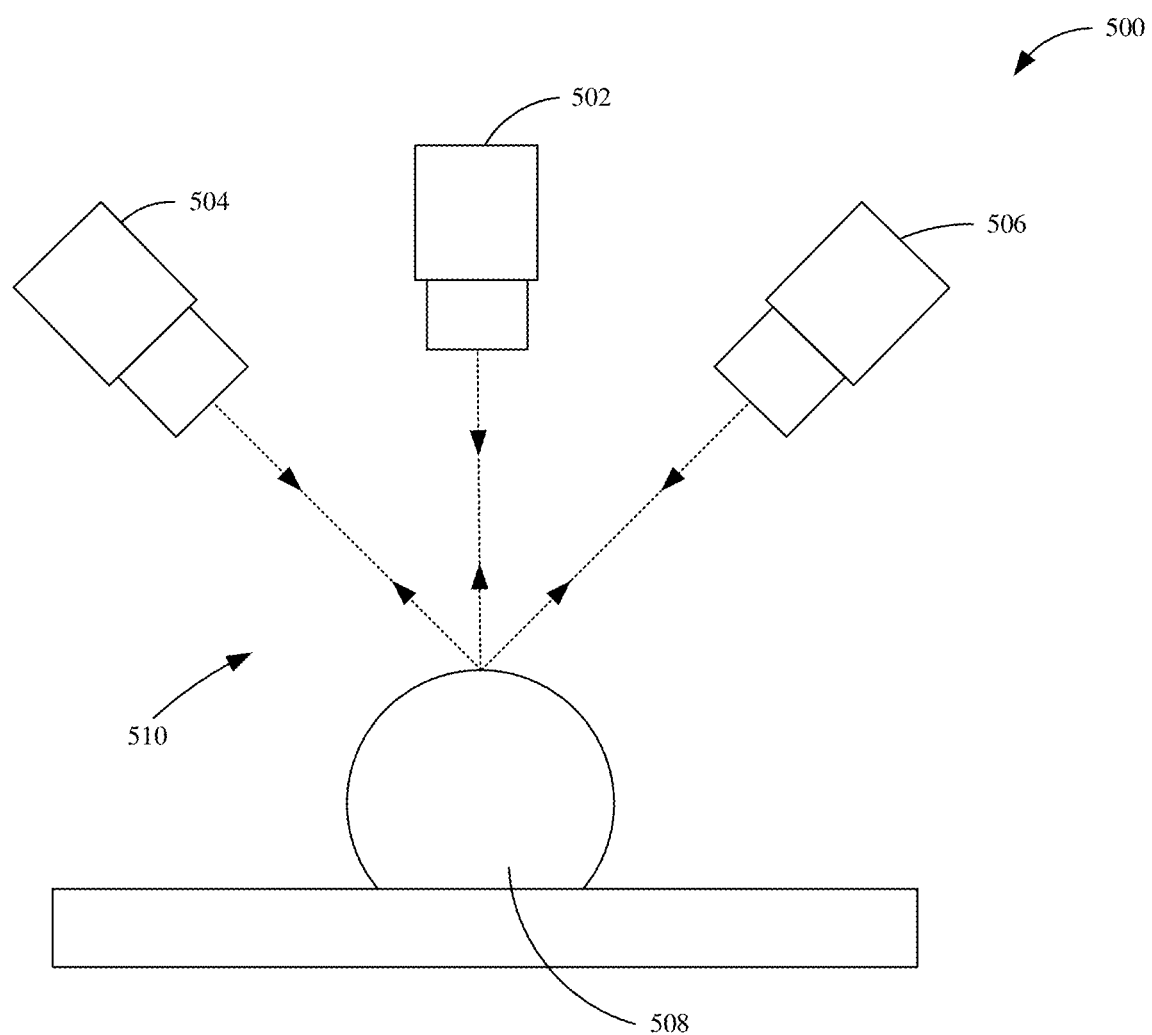
FIG. 12 is a diagrammatic view showing one example of an optical phase profilometry system.

FIG. 12 is a diagrammatic view showing one example of an optical phase profilometry system. System 500 includes operative coaxial illumination source/imaging system pair 502, oblique operative coaxial illumination source/imaging system pairs 504 and 506, spherical target 508 and channels 510. System 500 is configured to eliminate or reduce measurement errors, such as those described in reference to FIGS. 11A-11C. In one example, the measurement errors due to glints are compensated for by the alignment geometry of system 500, for example, the errors caused by glints tend to be nearly equal and opposite (and thus cancel each other out) when using the four channel alignment geometry (in which there are 2 pairs of counterposed channels). System 500 is configured, in one example, to have an alignment geometry that creates six channels (e.g. four diffuse channels [optical channels configured to capture diffuse reflections] and two specular channels [optical channels configured to capture specular reflections]). In one example, system 500 compensates for measurement errors caused by specular or partially specular targets and/or objects by creating an alignment geometry that is configured to capture both specular and diffuse reflections and thus compensate for the errors caused by either. This alignment geometry will be described in more detail in FIGS. 13A-13C.

Figure 13B:
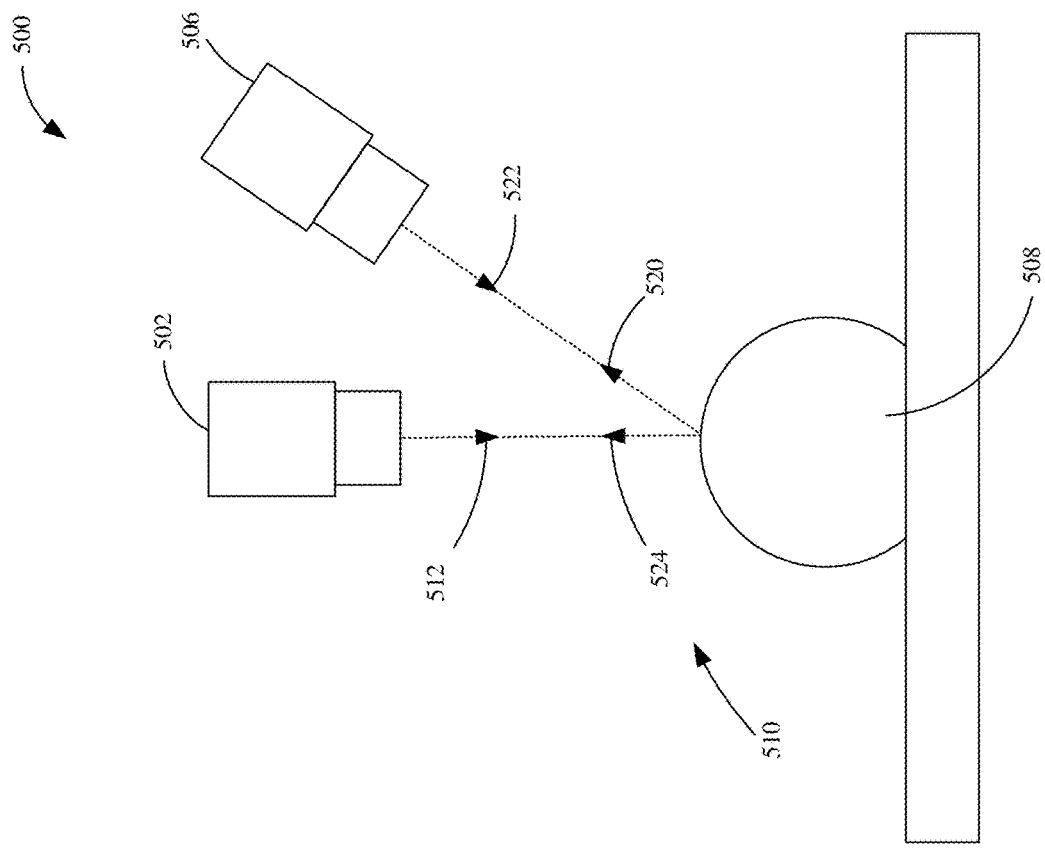
FIGS. 13A-C are diagrammatic views showing example optical phase profilometry systems.
Figure 13A:
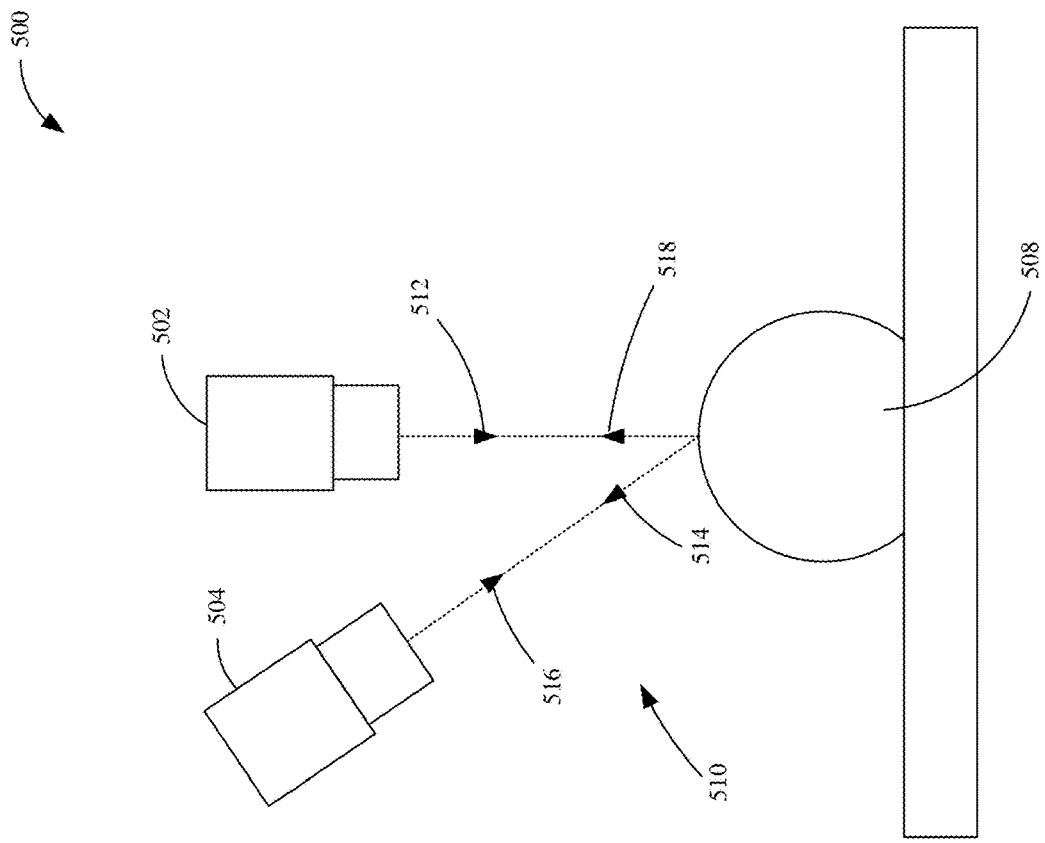

FIG. 13A is a diagrammatic view showing one example of an optical phase profilometry system. Specifically, FIG. 13A illustrates two of the six channels created by the alignment geometry of system 500. The first channel is formed by projection 512 and reflection 514. Projection 512 is projected by the illumination source of operative pair 502 which is reflected from target 508 as reflection 514 and captured by the imaging system of operative pair 504. The second channel is formed by projection 516 and reflection 518. Projection 516 is projected by the illumination source of operative pair 504 and reflected from target 508 as reflection 518 which is captured by the imaging system of operative pair 502. The first and second channel form a first pair of counterposed channels.

FIG. 13B is a diagrammatic view showing one example of an optical phase profilometry system. Specifically, FIG. 13B illustrates two of the six channels created by the alignment geometry of system 500. The third channel is formed is formed by projection 512 and reflection 520. Projection 512 is projected by the illumination source of operative pair 502 which is reflected from target 508 as reflection 520 and captured by the imaging system of operative pair 506. The fourth channel is formed by projection 522 and reflection 524. Projection 522 is projected by the illumination source of operative pair 506 and reflected from target 508 as reflection 524 which is captured by the imaging system of operative pair 502. The third and fourth channels create a second pair of counterposed channels.

Figure 13C:
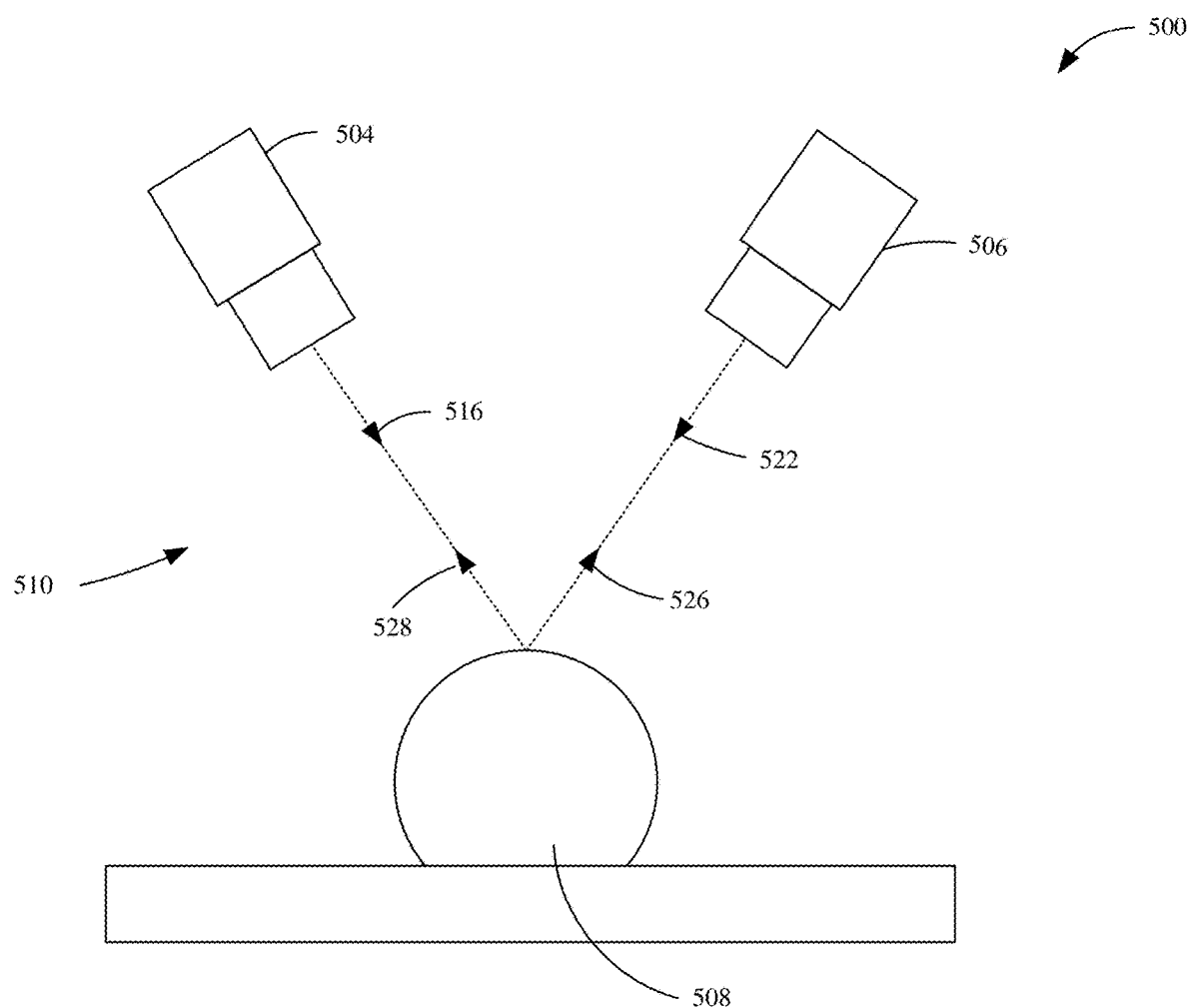

FIG. 13C is a diagrammatic view showing one example of an optical phase profilometry system. Specifically, FIG. 13C illustrates the two of the six channels created by the alignment geometry of system 500. The fifth channel is formed by projection 516 and reflection 526. Projection 516 is projected by the illumination source of operative pair 504 which is reflected from target 508 as reflection 526 and captured by the imaging system of operative pair 506. The sixth channel is formed by projection 522 and reflection 528. Projection 522 is projected by the illumination source of operative pair 506 and reflected from target 508 as reflection 528 and captured by the imaging system of operative pair 504.

In one example, the optical configurations of operative pairs 502, 504 and 506 are telecentric. In one example, the lens assembly of operative pairs 502, 504 and 506 comprise a multi-element/compound lens assembly with an entrance or exit pupil at infinity. A telecentric optical configuration ensure that the nominal projection directions (as represented by 512, 516 and 522) and reflection directions (as represented by 514, 518 and 520) are the same across the field of view of operative pairs 502, 504 and 506. With the projection and reflection angles equal across the field of view the advantage of counterposed channels is maintained in that the respective reflections for each channel is received by the respective imaging systems for each operative pair. In one example, illumination produced by the illumination sources enters the multi-element/compound telecentric lens assembly, becomes substantially parallel and thus highly concentrated as it exits the operative pair. Thus nearly all the light produced by the illumination source hits the target surface and the resulting reflection is captured by the imaging system.

Figure 14:
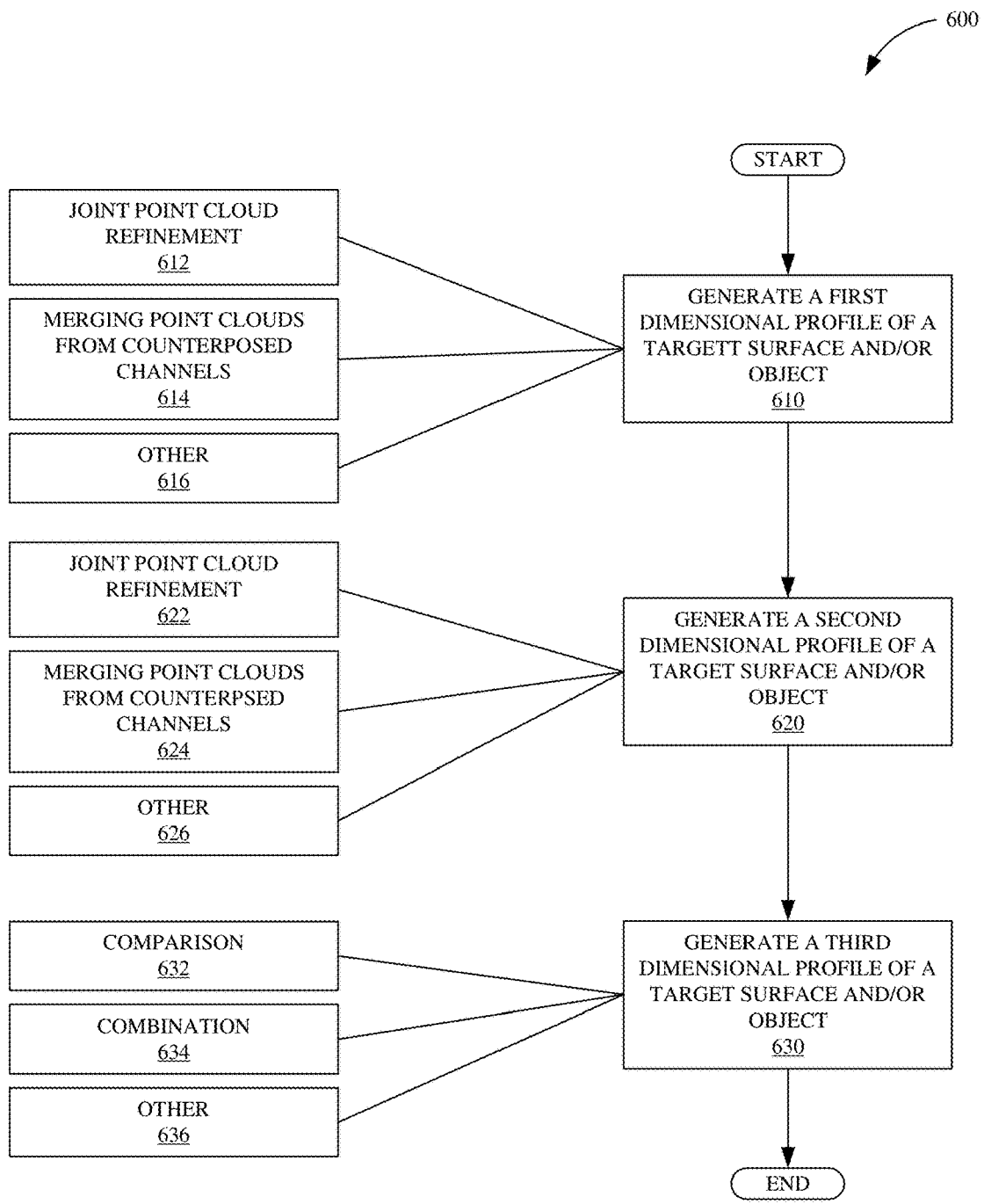
FIG. 14 is a flowchart showing one example method of generating a three-dimensional profile of a target surface and/or object.

FIG. 14 is a flowchart showing one example method of generating a dimensional profile of a target surface and/or object. Method 600 begins at block 610 where a first dimensional profile of a target surface and/or object is generated. This can be done by joint point cloud refinement as indicated by block 612, merging point clouds from counterposed channels as indicated by block 614, for example by using the SDF, and/or other 616. Other 616 could include Method 300 and/or Method 400. Other 616 could include a cross-section. Other 616 could include any other suitable technique for generating a dimensional profile of a target surface and/or object.

Method 600 continues at block 620 where a second dimensional profile of a target surface and/or object is generated. This can be done by joint point cloud refinement as indicated by block 622, merging point clouds from counterposed channels as indicated by block 624, for example by using the SDF, and/or other 626. Other 626 could include Method 300 and/or Method 400. Other 626 could include a cross-section. Other 626 could include any other suitable technique for generating a dimensional profile of a target surface and/or object.

Method 600 continues at block 630 where a third dimensional profile of a target surface and/or object is generated. This can be done by a comparison of the first and second dimensional profiles as indicated by block 632. This can be done by a combination of the first and second dimensional profile as indicated by block 634. This can be done by other techniques, as indicated by block 636. For example, other 636 could include taking an average (e.g. a weighted average) of the first and second dimensional profiles. Other 636 could include any other suitable techniques for generating a third dimensional profile based on a first a second dimensional profile.

While a particular order of steps has been shown for illustrative purposes in FIG. 14, it is to be understood that some or all of these steps can be performed in any number of orders including, but not limited to, simultaneously, concurrently, sequentially, non-concurrently, non-sequentially and any combinations thereof. No particular order of steps for Method 600 is to be implied by and/or construed from the illustration.

Figure 15A:
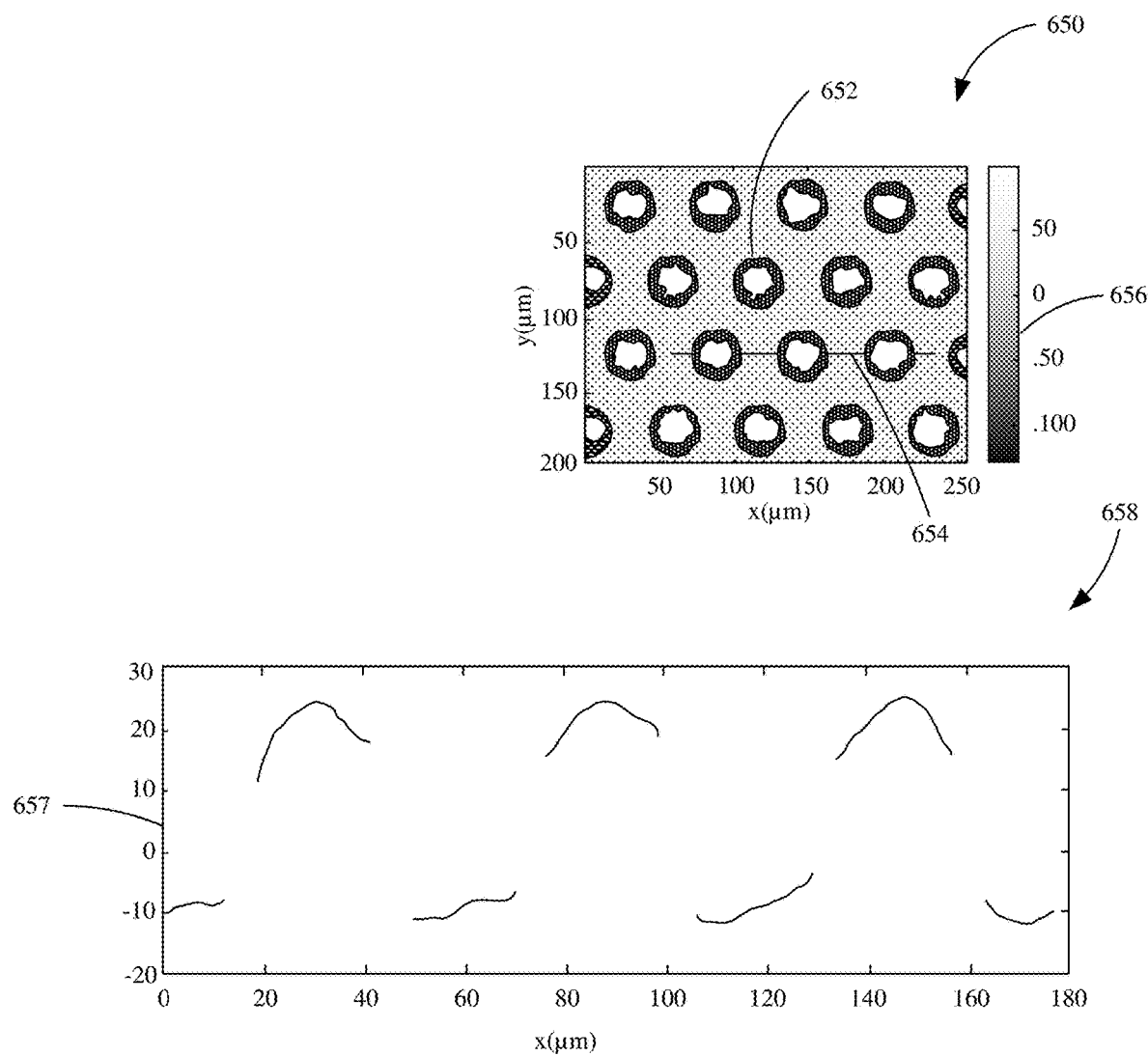
FIGS. 15A-15B are diagrammatic views showing one example of generating a dimensional profile of a target surface and/or object.
Figure 15B:
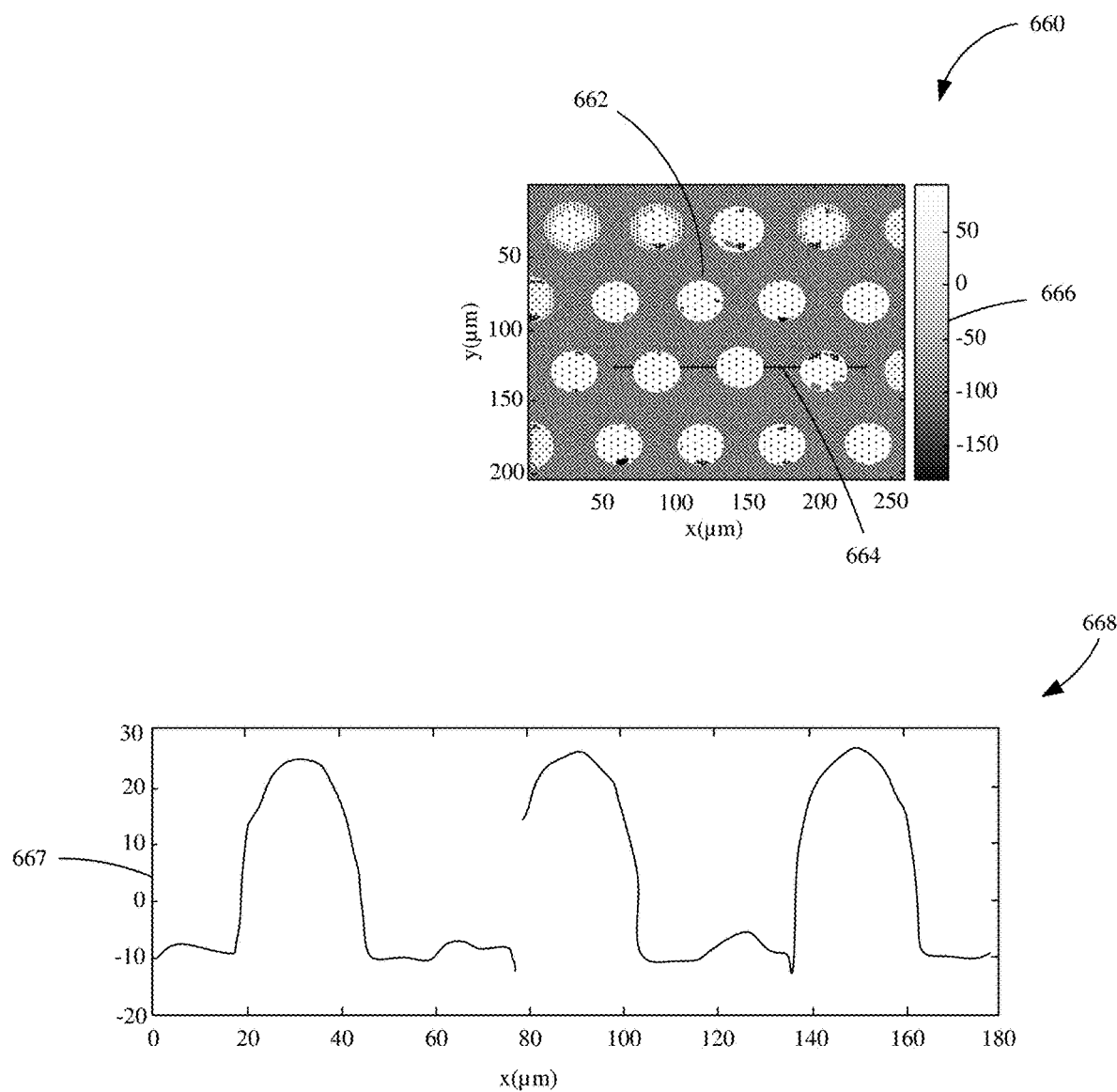

FIGS. 15A-15B are diagrammatic views showing one example of generating a dimensional profile of a target surface and/or object. More particularly, FIGS. 15A-15B illustrate some examples of performing steps of Method 600.

FIG. 15A is a diagrammatic view showing one example of generating a dimensional profile of a target surface and/or object using iterative joint point cloud refinement. Dimensional profile 650 is a representation of dimensional profiles for a plurality of target objects 652, here shown as spherical objects. Dimensional profile 650 displays the plurality of target objects' 652 dimensional information, including their y coordinate (e.g. length and/or width) measured in micrometers, their x coordinate (e.g. length and/or width) measured in micrometers and their height (e.g. z coordinate) as represented by 656. Dimensional profile 658 is a cross-section of selected target objects as indicated by line 654. Dimensional profile 658 displays selected target objects' 654 dimensional information, including their x coordinate (e.g. length and/or width) measured in micrometers and their height (e.g. z coordinate) as represented by 657. Dimensional profiles 650 and/or 658, in one example, could be generated by Method 300.

FIG. 15B is a diagrammatic view showing one example of generating a dimensional profile of a target surface and/or object using merging point clouds from counterposed channels with the SDF. Dimensional profile 660 is a representation of dimensional profiles for a plurality of target objects 662, here shown as spherical objects. Dimensional profile 660 displays the plurality of target objects' 662 dimensional information, including their y coordinate (e.g. length and/or width) measured in micrometers, their x coordinate (e.g. their length and/or width) measured in micrometers and their height (e.g. z coordinate) as represented by 666. Dimensional profile 668 is a cross-section of selected target object as indicated by line 664. Dimensional profile 668 displays selected target objects' 664 dimensional information, including their x coordinate (e.g. length and/or width) measured in micrometers and their height (e.g. z coordinate) as represented by 657. Dimensional profiles 660 and/or 668, in one example, could be generated by Method 400.

Figure 16:
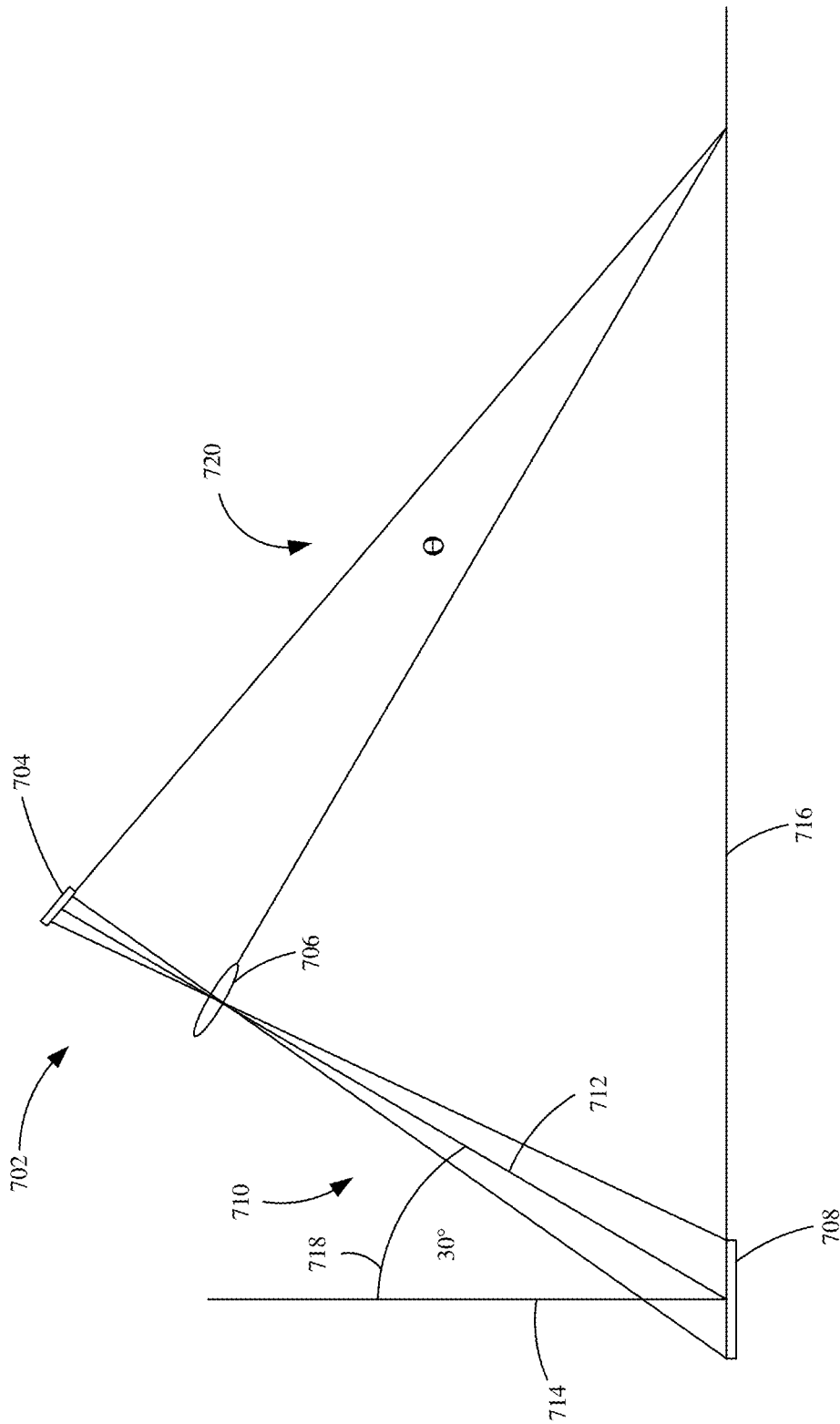
FIG. 16 is a diagrammatic view showing one example of an optical phase profilometry system.

According to the Scheimplug theorem, if an object plane is not normal to the optical axis, the image plane is also tilted. FIG. 16 is a diagrammatic view showing one example of the geometry of tiled object and image planes. Object 708 lying in plane 716 has normal 714 that is tilted at angle 718 to optical axis 712. Ray bundle 712 enters lens 706 and is brought to a focus at image sensor 704 lying at angle 720 to the optical axis, which is denoted by theta (θ). Lens 706 is normal to the optical axis. According to the Scheimpflug theorem:

$$\tan(\theta) = m \cdot \tan(30) \qquad \text{Equation 1}$$

where m is the magnification of the imaging system 702 and 30° is the angle 718 in FIG. 16.

If the magnification m is large, the tilt of the image plane required by the Scheimpflug theorem can be large. For instance, if m=1.5, we have theta 40.9°. This required angle is well outside the usable range for typical imaging systems, especially those using microlenses.

Image plane tilt 720 can be substantially reduced by the introduction of a prism in the optical path, as taught in U.S. Pat. No. 397,254A. Unfortunately, the reduction of image plane tilt is attended by the introduction of various aberrations, especially astigmatism and lateral chromatic aberration. To avoid this problem, additional prisms may be introduced into the optical path, and the performance optimized by a lens design program, as is well-known in the art. In the preferred embodiment, three prisms are used for adequate control of aberrations, and at least two types of glass are used for control of lateral chromatic aberration, analogous to the need for two types of glass in an achromatic lens, as is well-known in the art. The number of prisms depends on the magnification, field of view, and obliquity, and can be chosen without departing from the scope of the invention.

Figure 17:
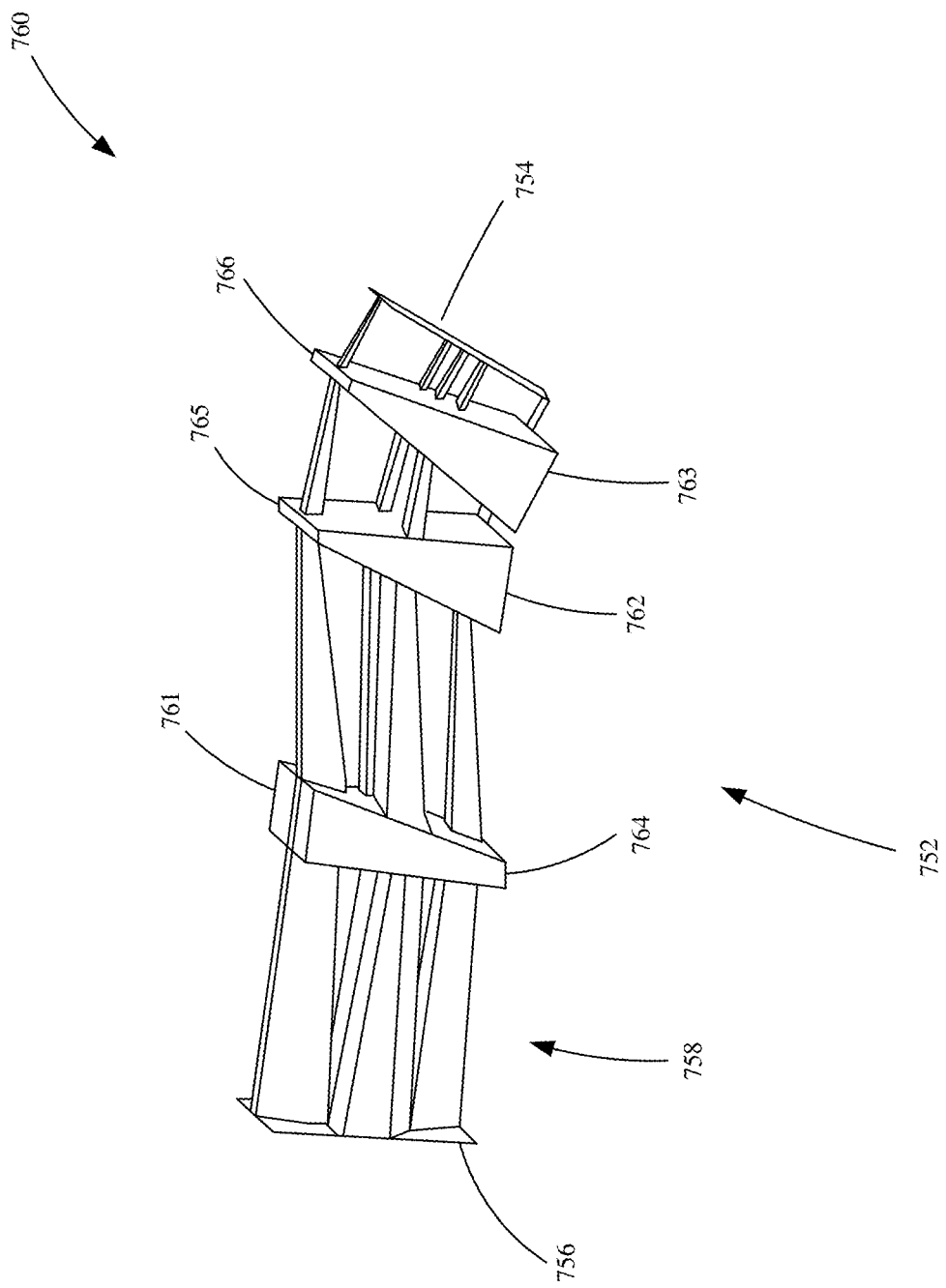
FIG. 17 is a diagrammatic view showing one example of an optical phase profilometry system.

FIG. 17 is a diagrammatic view showing one example of an optical phase profilometry system. System 760 includes lens 756, focal plane 754, emerging ray bundle 758, and prism assembly 752, which includes prisms 761, 762, 763 and wedge angles 764, 765 and 766. Light emerging from the rear surface of lens 756 is refracted by prism assembly 752, and converges to focal plane 754, which is almost normal to the optical axis.

In one example, system 750 allows for a high resolution and/or high magnification optical phase profilometer by reducing the required image sensor tilt angle (e.g. the Scheimpflug angle) with the use of multiple prisms (e.g. 761, 762 and/or 763) to compensate for, reduce and/or eliminate aberrations (e.g. chromatic aberration) as light passes through the imaging system and unto the focal plane. In one example, at least one of the prisms 761, 762 and/or 763 comprises a different glass types than at least one of the other prisms. In another example each of the prisms 761, 762 and 763 comprise a different glass type than each of the other prisms. In one example, prisms 761, 762 and/or 763 comprise a wedge prism. In one example at least one of the prisms 761, 762 and/or 763 comprise a different wedge angle than at least one of the other prisms. In one example, at least one of the prisms 761, 762 and/or 763 has a wedge angle (e.g. wedge apex angle) towards a different direction than at least one of the other prisms. In one example, prism assembly 760 comprises a first prism (e.g. 761) having a wedge angle (e.g. wedge apex angle 764) towards a first direction, a second prism (e.g. 762) having a wedge angle (e.g. wedge apex angle 765) towards a second direction and third prism (e.g. 763) having a wedge angle (e.g. wedge apex angle 766) towards the second direction. While three prisms are shown in FIG. 17, any number of prisms can be used, comprising any number of materials and having a wedge angle toward any number of directions.

Another challenge with typical optical phase profilometry systems are measurement errors due to changes to the sensor or the sensor's environment. For example, thermal scaling, mechanical drift, along with a variety of other factors, can cause measurement output errors. As mentioned above, typical optical phase profilometry systems have multiple imaging paths that view the target surface from different viewpoints (e.g. single camera/multiple projector, single projector/multiple camera, etc.). Each camera/projector pair forms a channel (imaging/optical path) and provides unique perspective of the surface to be measured. The surface is often reconstructed separately by each channel (e.g. in a point cloud) and these reconstructions are combined into a final dimensional profile (e.g. height map) of the target surface.

Figure 18A:
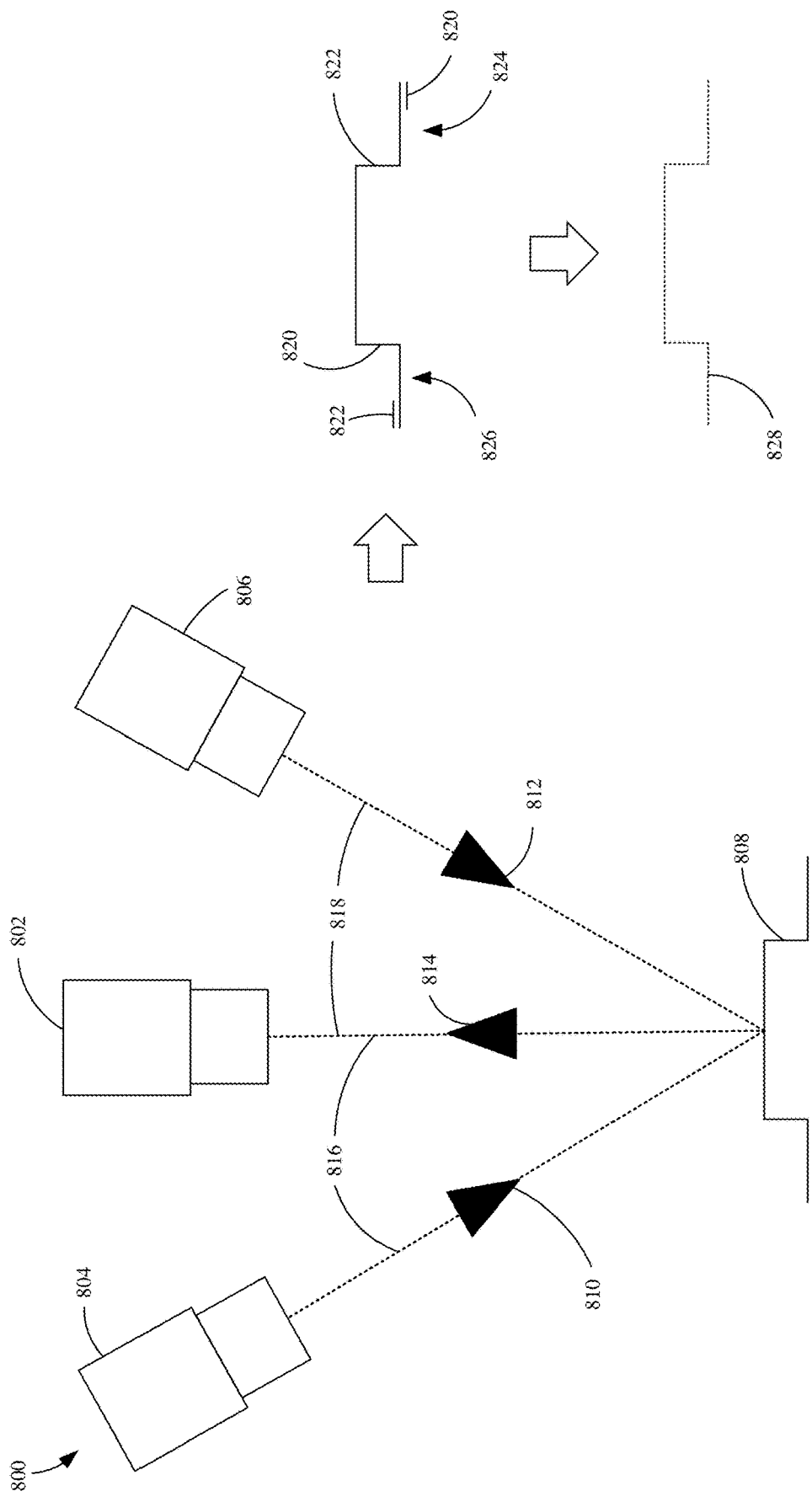
FIG. 18A is a diagrammatic view showing one example of an optical phase profilometry system.

FIG. 18A is a diagrammatic view showing one example of an optical phase profilometry system. System 800 includes camera 802, projectors 804 and 806, target surface 808, projections 810 and 812 and reflection 814. Projection 810 and reflection 814 form a first channel 816 and projection 812 and reflection 814 form a second channel 818. While reflection 814 is shown a single line for purposes of illustrative clarity in FIG. 18, it is to be understood that the projection projected by projector 804 creates a separate reflection than the projection projected by projector 806. From each the first and second channels a point cloud is generated that comprises a dimensional reconstruction of target surface 808. First channel 816 generates a first point cloud 820 and second channel 818 generates a second point cloud 822. Because of the alignment geometry of projectors 804 and 806 and the relative height of target surface 808, there are blind spots/shadows in each point cloud, as indicated by 824 and 826. Thus, the point clouds are combined to generate a complete dimensional profile of target surface 808 as indicated by 828.

Combining these separate point clouds requires that they be well aligned with one another, which typically is ensured through the imaging sensor's calibration procedure. However, over time, changes to the sensor (e.g. thermal scaling, mechanical drift, etc.), as mentioned above, can cause the individual point clouds to shift (e.g. become misaligned). In such cases, the final combined dimensional profile may end up being less accurate and repeatable than it would have been had the channels still been in precise alignment.

Figure 18B:
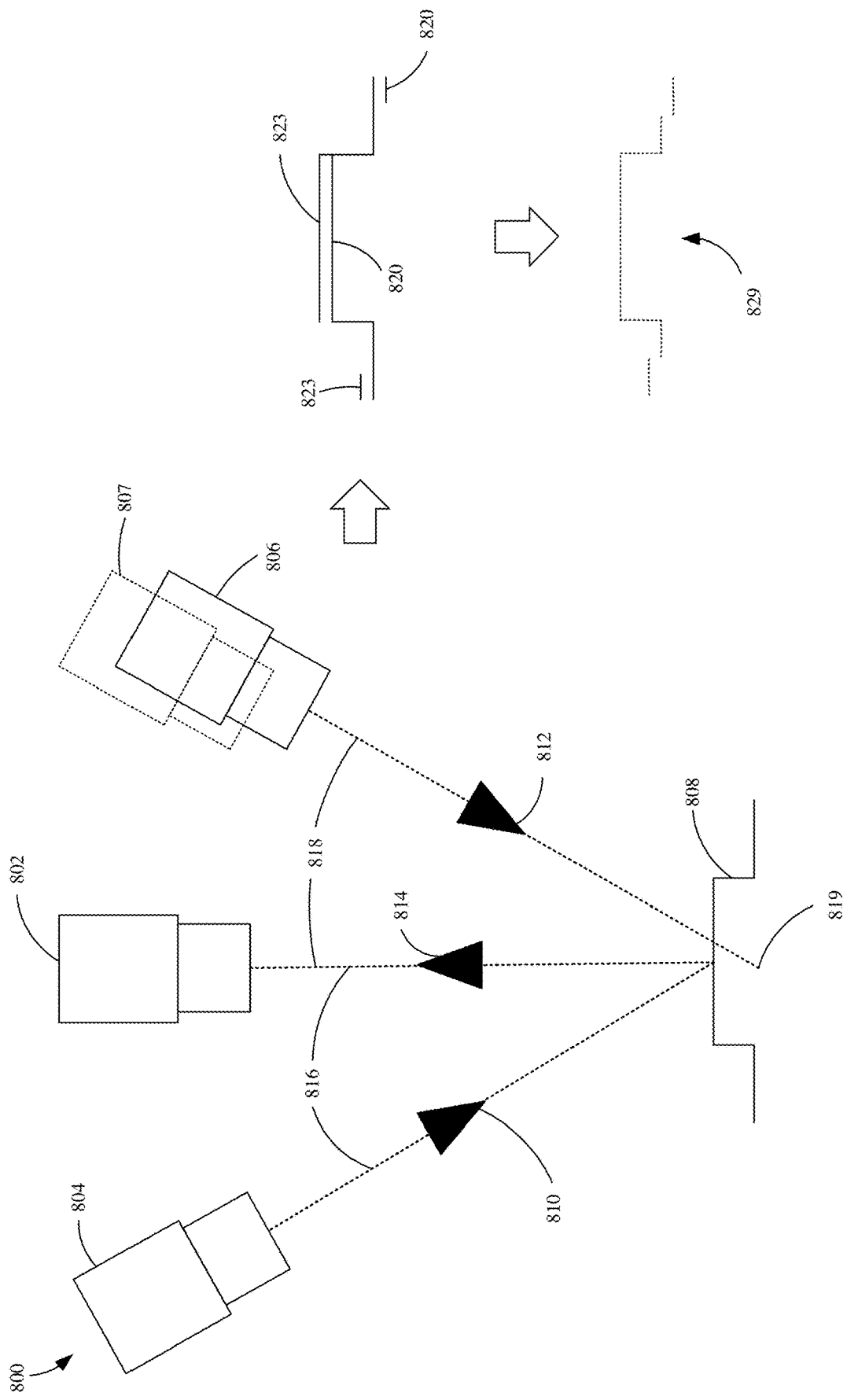
FIG. 18B is a diagrammatic view showing one example of an optical phase profilometry system.

FIG. 18B is a diagrammatic view showing one example of an optical phase profilometry system. FIG. 18B is similar to FIG. 18 and thus similar elements are numbered similarly. FIG. 18B shows projector 806 in a misaligned position (e.g. shifted) as represented by precise alignment 807 in comparison to the actual alignment of projector 806. This causes a measurement error as indicated by surface point 819. This misalignment causes second channel 818's point cloud 823 to shift with respect to first channel 816's point cloud 820. Combination of point cloud 820 and 823 results in an erroneous dimensional profile of target surface 808, as indicated by 829.

These types of errors could be resolved by recalibrating the sensor, for example by following a field calibration procedure. However, these field calibration procedures often require the optical phase profilometry system to stop making measurements in order for the system to be worked on by an operator. This can be very disruptive to production and lower the throughput of an online inspection operation. A less disruptive technique is needed. One example of such a technique is provided below.

By using a method of dynamic compensation, errors can often be resolved on the fly (e.g. as the system continues to operate). The relative errors between the individual point clouds can be estimated dynamically and then compensated for before combining them into a final dimensional profile of the target surface. The general method is to estimate the relative errors between the individual point clouds by computing a transformation that best aligns them in 3D. In general, that transformation may consist of a rotation, translation, scaling, or any other form of transformation that models the changes expected by changes to the imaging sensor (e.g. thermal scaling, mechanical drift, etc.). In one example, a translation in 3D will be sufficient to model small changes to the system's alignment geometry.

Figure 19:
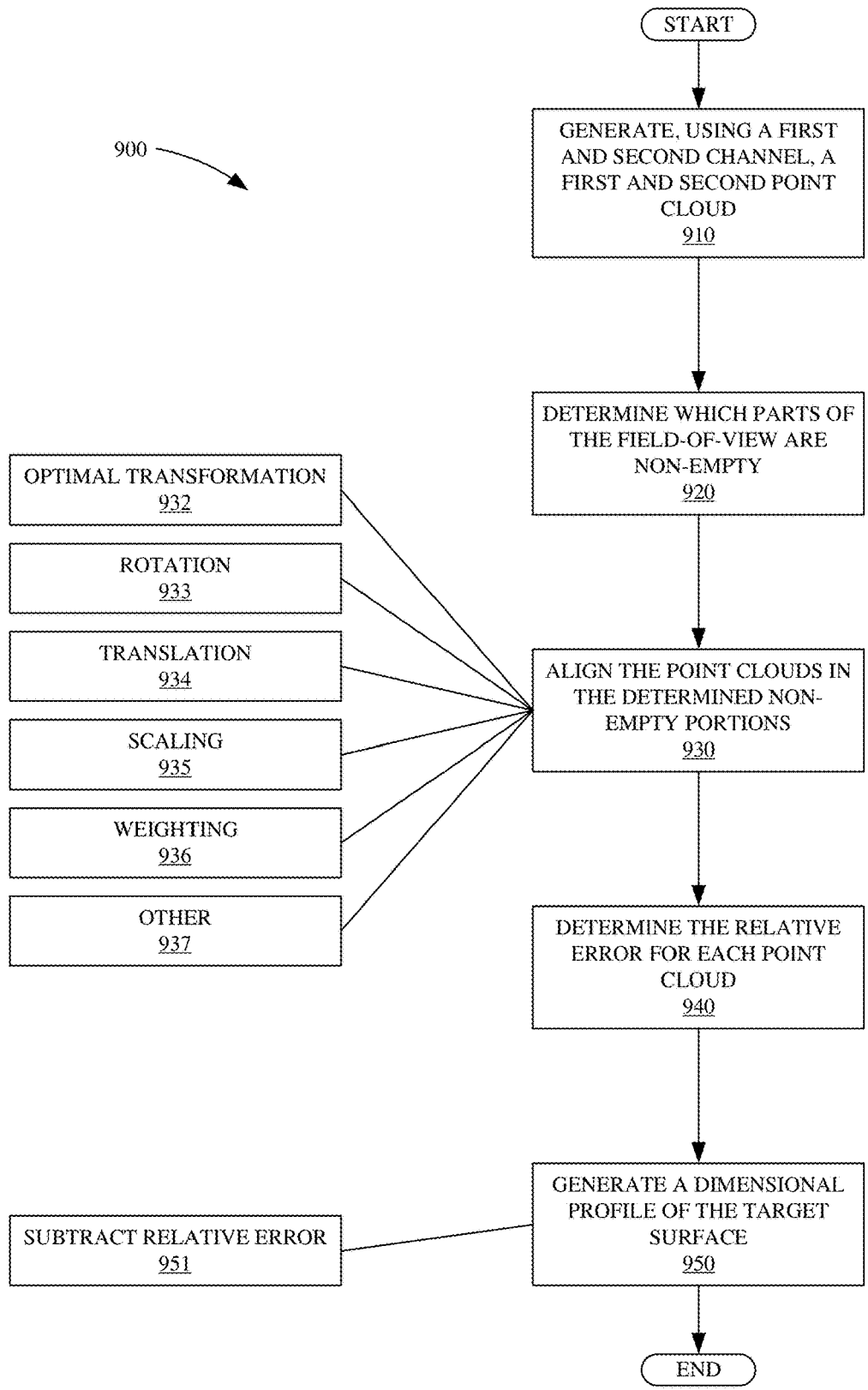
FIG. 19 is a flowchart showing one example method of dynamically compensating for error in an optical phase profilometry system.

FIG. 19 is a flowchart showing one example method of dynamically compensating for errors in an optical phase profilometry system. Method 900 begins at block 910 where, using a first and second channel (e.g. imaging/optical path), a first and second point cloud is generated. While two individual point clouds from two individual channels is described above, in other examples, any number of channels could be used and any number of point clouds could be generated. In other examples, each channel in a particular optical phase profilometry system could generate and individual point cloud relative to a target surface and/or object.

Method 900 continues at block 920 where it is determined which parts of the field-of-view are non-empty. In one example, this determination comprises determining which portions of the point cloud(s) have surface points and which do not. In one example, this determination is made by the optical phase profilometry system which can have a number of controllers and/or processors (e.g. microprocessors) configured to receive sensor signal(s) (e.g. from an image sensor) indicative of any number of characteristics (e.g. dimensional information relative to a target surface and/or object) and determine, based on the sensor signals, which portions of the field-of-view (e.g. the respective area, volume to be measured, environment the system is viewing, etc.) are non-empty (e.g. those portions that have a corresponding surface point).

Method 900 continues at block 930 where the first and second point clouds are aligned in the determined non-empty portions of the field-of-view (e.g. the non-empty portions of the point clouds). This alignment can be done in a variety of ways. In one example, the optimal transformation for each point cloud is computed, as indicated by block 932. In one example, a rotation is performed, as indicated by block 933. In one example, a translation is performed as indicated by block 934. In another example scaling is performed as indicated by block 935. In another example, weighting is performed as indicated by block 936. In one example, the weighting at block 936 comprises weighting the surface points of the point clouds by their confidence values (e.g. their signal-to-noise indices). In another example, the point clouds can be aligned by performing any other number of transformations, particularly those that model changes (e.g. thermal scaling, mechanical drift, etc.) to the imaging sensor, as indicated by block 937.

Method 900 continues at block 940 where the relative error for each point cloud is determined. In one example, determining the relative error for each point cloud comprises identifying the opposite of the optimal transformation for each point cloud. Method 900 continues at block 950 where a dimensional profile of the target surface and/or object is generated. In one example, generating a dimensional profile of the target surface and/or object comprises subtracting the relative error. In one example, generating a dimensional profile comprises computing the optimal transformation for each point cloud, identifying the relative error for each point cloud (e.g. the opposite of the optimal transformation) and subtracting from each point clouds its respective relative error and combining the compensated and/or corrected point clouds.

Figure 20:
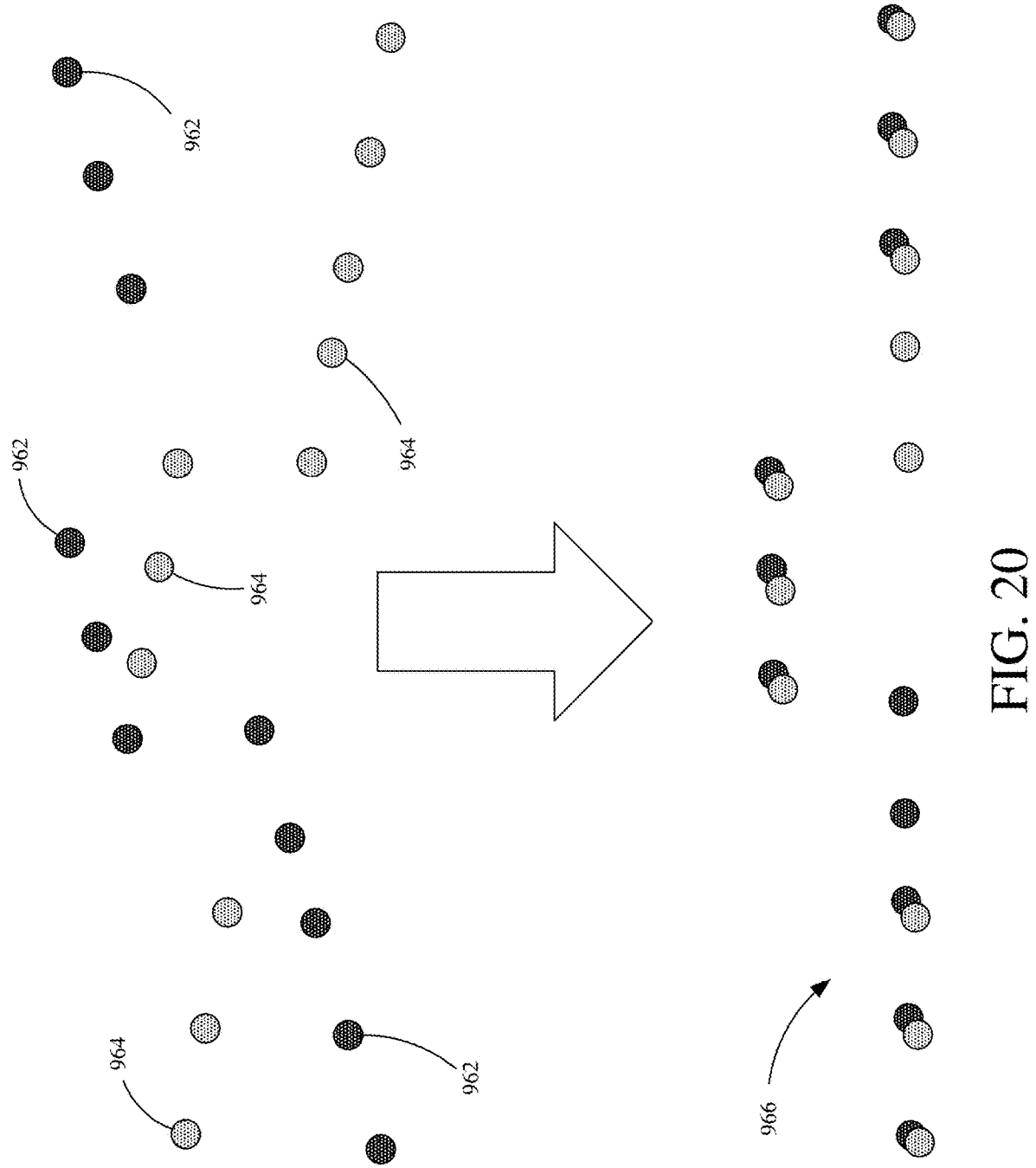
FIG. 20 is a diagrammatic view showing one example of dynamic compensation.

FIG. 20 is a diagrammatic view showing one example of dynamic compensation. At the top of FIG. 20, a first point cloud 962 and a second point cloud 964 are shown. In one example, point clouds 962 and 964 are generated by a first and second channel (e.g. 816 and 818). Each the first and second point clouds have a plurality of respective surface points as indicated by the dots. As shown in FIG. 20, both point clouds 962 and 964 have measurement errors due to a change to the image sensor (e.g. mechanical drift as shown in FIG. 18A). The generated point clouds are not accurately indicative of the target surface (e.g. 808) being measured. However, through dynamic compensation, as described above (e.g. Method 900), the measurement error of each point cloud can be compensated for and/or corrected and create a dimensional profile of the target surface that is correctly or substantially correctly indicative of an actual dimensional profile of the target surface, as indicated by aligned dimensional profile 966.

In one example, dynamic compensation comprises: generating a first and second point cloud from a respective first and second channel of an optical phase profilometry system observing a target surface, wherein the first and second point clouds are indicative of dimensional information relative to the optical phase profilometry system's field of view; determining which parts of the field of view are non-empty (e.g. which parts of the field of view have surface points); aligning, in the non-empty areas, the first and second point clouds by computing the optimal transformation for each point cloud and identifying (e.g. calculating) the relative error of each point cloud; subtracting the relative error from each point cloud; and generating a dimensional profile (e.g. height map) by subtracting the relative error from each the first and second point cloud and combining the corrected and/or compensated first and second point clouds. In one example, computing the optimal transformation comprises weighting the surface points of each the first and second point cloud by their confidence values (e.g. signal-to-noise indices). In one example, computing the optimal transformation comprises performing a rotation, a translation, scaling, or any other transformation or combination thereof.

In some cases, determining the relative error for each point cloud can be computationally intensive and can slow down the overall reconstruction of the target surface and/or object (e.g. the generation of a height map). Particularly in on-line inspection environments, where three-dimensional acquisitions are performed continuously (e.g. during automatic optical inspection of circuit boards in an electronic assembly process), it may not be necessary or desirable to determine the relative errors at each frame. In one example, the relative errors are determined periodically and then applied at each acquisition (e.g. dimensional profile, height map, etc.). Additionally, since each determination of the relative errors may contain a bit of noise, the determinations can be smoothed temporally by keeping a running average of the relative error determinations.

Figure 21:
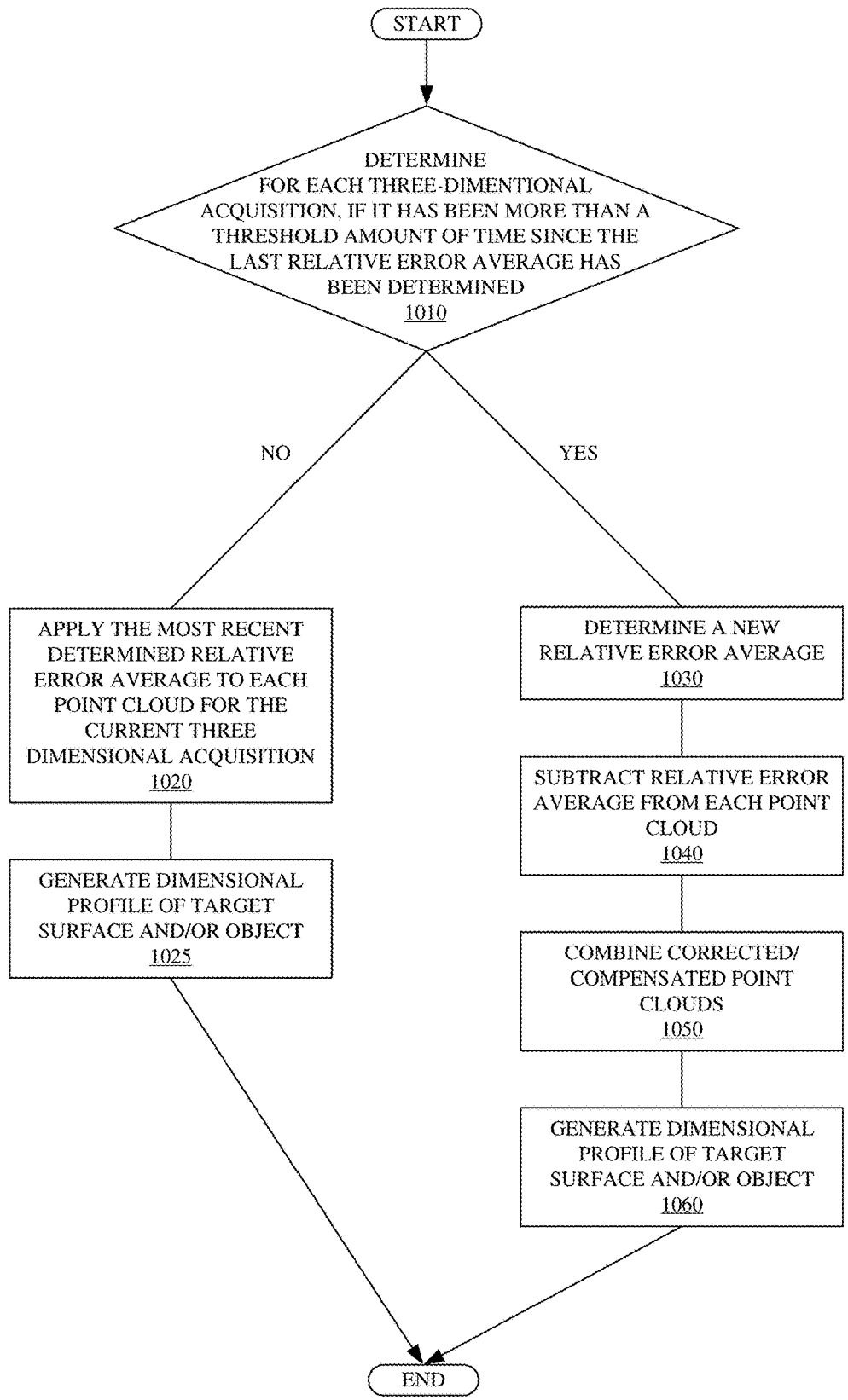
FIG. 21 is a flowchart showing one example method of dynamic compensation.

FIG. 21 is a flowchart showing one example method of dynamic compensation. Method 1000 starts at block 1010 where for each individual three-dimensional acquisition of a target surface and/or object, it is determined if the time since the last determination of the relative error average exceeds a threshold. If it is determined at block 1010 that the time since the last relative error average was determined does not exceed the threshold then the most recent relative error average is applied to each point cloud. Method 1000 continues at block 1025 where a dimensional profile (e.g. a height map) is generated for the target surface and/or object.

Returning to block 1010, if it is determined that the time since the last relative error average exceeds the threshold, method 1000 continues at block 1030 where the a new relative error average is determined. In one example, the new relative error average is determined by determining the average of the transformation (e.g. optimal transformation). In one example, the average of the transformation is determined according to:

$$T_{avg} = \alpha T_{new} + (1-\alpha) T_{old} \qquad \text{Equation 2}$$

where $\alpha$ is a constant between 0 and 1.

Method 1000 continues at block 1040 where the relative error average (e.g. $T_{avg}$) is subtracted from each point cloud. Method 1000 continues at block 1050 where the corrected and/or compensated (e.g. the relative error average has been subtracted) point clouds are combined. Method 1000 continues at block 1060 where a dimensional profile (e.g. height map) is generated based on the combination of the corrected and/or compensated point clouds. Method 1000 can continue for each three-dimensional acquisition until the optical inspection operation is complete.

In some cases, there may be a limit to how much error can be compensated for. When the relative error determinations begin to approach this limit, a full field or factory calibration may need to be performed. In one example, the optical phase profilometry system can determine if the relative error determinations have exceeded a threshold (e.g. amount of error, a number of iterations, etc.) and upon a determination that the threshold has been exceeded, the optical phase profilometry can generate a communication, an alert, an alarm, or some other indication (e.g. surface a display to a user interface) that calibration is needed.

Another challenge facing typical optical phase profilometry systems are caused by system limitations which limit the quality and accuracy of acquired images of target surfaces and/or objects.

Optical phase profilometry is limited by the quality of the projected sine wave. Digital Light Processing (DLP) systems are flexible but have a finite pixel size which creates a stair-step pattern in the phase of the projected sine waves. DLP systems also have limited dynamic range. For example, a typical DLP system uses 8-bit images which results in the sine waves being quantized to 256 levels. Unfortunately, this digital-to-analog (e.g. optical light level) conversion is not perfectly linear. Real applications can have significant integral and/or differential linearity errors, the latter of which is more difficult to deal with (e.g. correct, compensate, etc.). Integral error, on the other hand, along with offset and gain errors, can be removed by multi-phase reconstruction. For example, three-phase reconstruction is insensitive to offset gain errors, while four-phase reconstruction is insensitive to quadratic integral errors and higher order reconstructions will compensate for higher order integral errors. Whereas differential linearity errors add "random" (e.g. difficult to predict) phase noise across all parts of the sine wave.

DLP systems produce multiple gray levels by a time-slicing method. To produce a gray level, individual mirrors in the DLP system are flipped on and off, akin to pulse width modulation (PWM). As the mirrors are mechanical devices they are limited in their switching time, and therefore, increasing the number of gray levels projected (e.g. increasing the number of bits in an image) also increases the frame time for the image. A single-bit image, for example, may not look much like a sine wave but it can be projected very quickly, relative to higher bit images, and therefore system output time is improved.

Figure 22A:
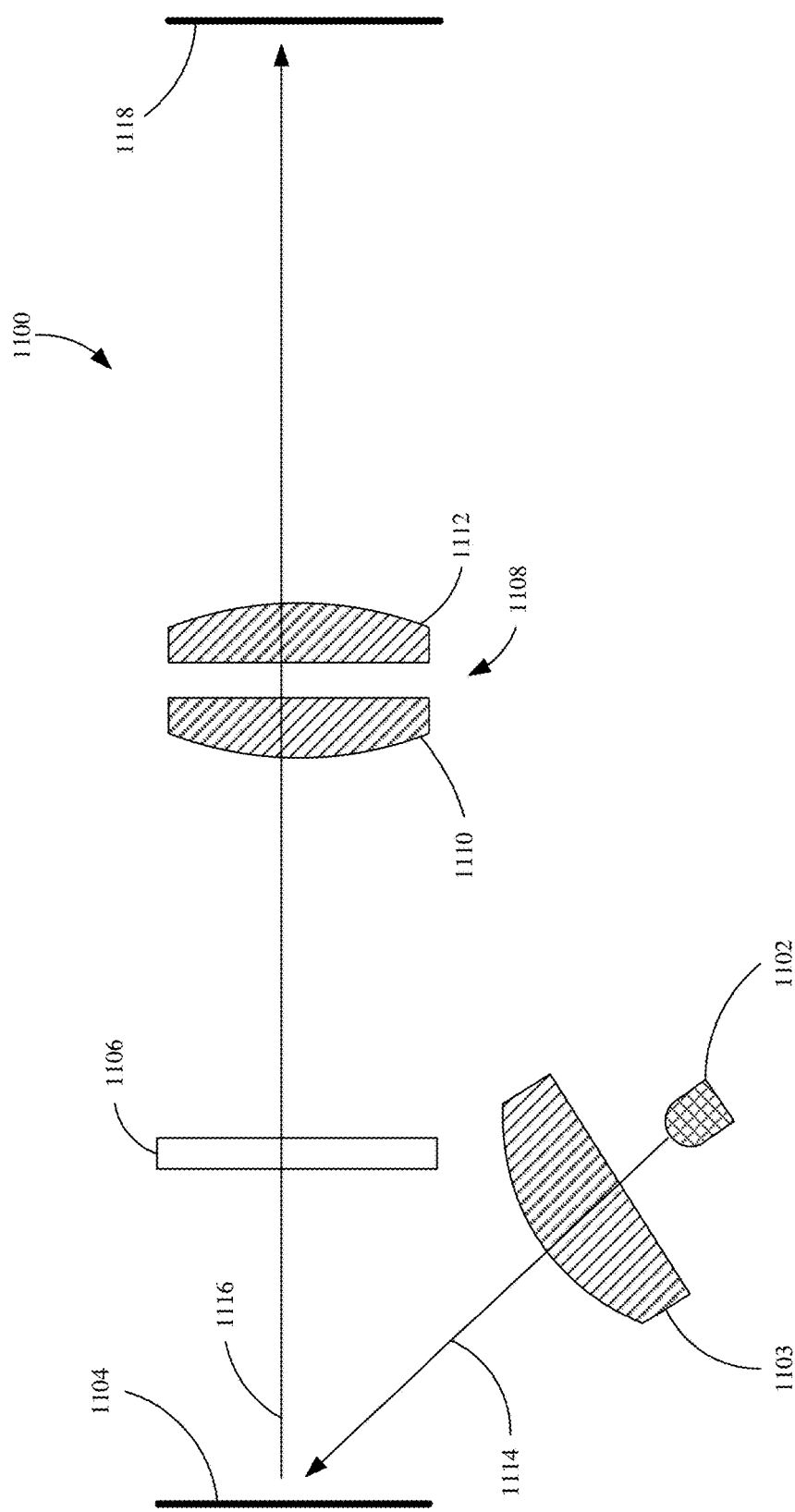
FIG. 22A is a diagrammatic view showing one example of a digital light processing projector system.

FIG. 22A is a diagrammatic view showing one example of a DLP projector system. System 1100 includes light source 1102, digital micromirror device 1104, optical low-pass filter (OLPF) 1106, digital projection lens assembly 1108, which further includes lenses 1110 and 1112. System 1100 further includes source ray bundle 1114, projection 1116 and target surface 1118. Generally, the operation of system 1100 is as follows. Source ray bundle 1114 emanates from light source 1102 (e.g. an LED) and passes through condenser lens 1102 which converges source ray bundle 1114 in order to effectively illuminate digital micromirror device 1104. Source ray bundle 1114, after passing through condenser lens 1102, falls on digital micromirror device and is projected therefrom as digital projection 1116. Digital projection 1116 passes through OLPF 1106 which, as will be discussed in further detail below (FIG. 22B), is configured to reduce and/or eliminate the problems with typical DLP systems, as described above. Projection 1116 continues onto projector lens assembly 1108 which includes lenses 110 and 112 which are arranged to focus projection 1116 to desired levels onto target surface 1118. Projection 1116 then passes onto surface target 1118 from which it will be reflected and subsequently captured by an imaging system (e.g. a camera) which will produce a dimensional profile of target surface 1118 using a sensor (e.g. image sensor). While a particular arrangement of components is shown for illustrative purposes in FIG. 22, system 1100 can include any number of additional components and/or devices, including, but not limited to, additional digital micromirror devices, additional lenses (e.g. shaping lens), including additional lenses in projector lens assembly 1108 arranged in a variety of way, color filter(s), additional light sources, and other components and/or devices necessary or desirable for such a system.

Figure 22B:
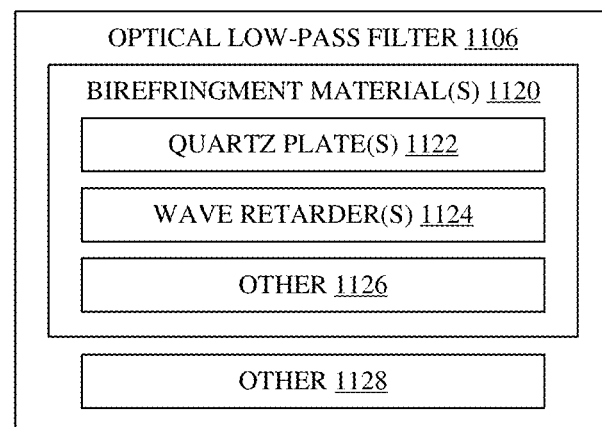
FIG. 22B is a block diagram showing one example of an optical low-pass filter.

FIG. 22B is a simplified block diagram showing one example of an OLPF. OLPF 1106 includes birefringent material(s) 1120 and other 1128. Birefringent material(s) 1120 include quartz plate(s) 1122, wave retarder(s) 1124 and other 1126. In one example, OLPF 1106 consists of layers of birefringent material. In one example, quartz plate(s) 1122 comprises a first quartz plate which splits a point from the digital micromirror device into a pair of points and a second quartz plate which splits the two points into four points. In one example, the four points are arranged in a square pattern. In one example, wave retarder(s) 1124 comprise a first quarter wave retarder that converts the polarized light for each copy of the image (projected by the digital micromirror device) into circularly polarized light and a second quarter wave retarder that converts the polarized light for each copy of the image into circularly polarized light. In one example, the second quarter wave retarder ensures that the light (e.g. projection 1116) output by OLPF 1106 is circularly polarized. In one example, OLPF 1106 comprises four layers of birefringent material, wherein the first layer comprises a first quartz plate, the second layer comprises a first quarter wave retarder, the third layer comprises a second quartz plate and the fourth layer comprises a second quarter wave retarder.

Birefringent material(s) 1120 can also include any other number of birefringent materials, including, but not limited to any other number of crystal structures. OLPF 1106 can also include any other number of materials and/or components necessary or desirable for optical low-pass filtering and/or reconstruction filtering in imaging systems.

As an optical phase profilometry system's vertical resolution is limited by the highest frequency projected. For DLP phase profilometry systems, the frequency is typically about 4 digital micromirror device pixels per period. A frequency of ¼ cycle per pixel is effectively a square wave. By applying OLPF 1106 to a DLP phase profilometry system the square wave can be turned into a sine wave. A benefit of starting with a square wave is that it is a binary image (e.g. only two levels). Using a binary pattern improves the speed of system 1100 as compared to other, typical DLP phase profilometry systems. For example, eight-bit DLP images need tens of milliseconds per image whereas a single bit image, as in the case of system 1100, can be projected in well under 1 millisecond, thus improving the speed of image acquisition and dimensional profile output.

In cases where lower frequency sine waves are needed additional bit levels can be added to the sine wave, for example, a 6 pixel per cycle sine wave can be sufficiently projected with only three gray levels (e.g. 0, 0.5 and 1.0). In one example, for a sine wave which repeats every n pixels, n/2 gray levels are provided. System 1100 is configured to maximize signal level for the desired projected frequencies and to minimize unwanted artifacts (e.g. harmonics of the projected frequencies or "screen-door effects').

Figure 23:
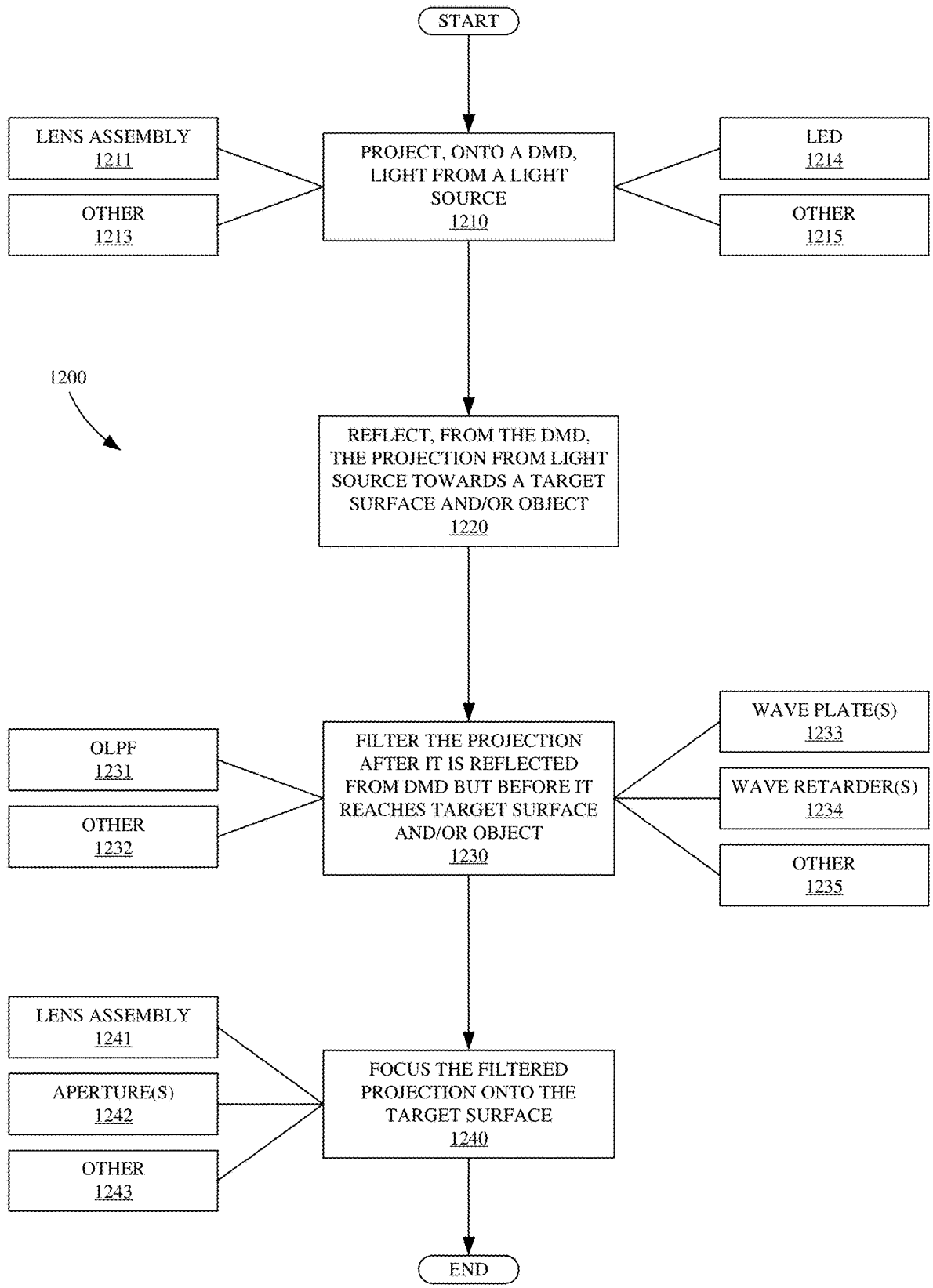
FIG. 23 is a flowchart showing one example of projecting light onto a target surface.

FIG. 23 is a flowchart showing one example of projecting light onto a target surface. Method 1200 begins at block 1210 where light is projected onto a digital micromirror device (DMD) using a light source. Before the light reaches the DMD surface, it may first pass through a lens assembly 1211, which can, in one example, include a condenser lens. The light may also pass through any other devices and/or components on its way to the DMD. The light source may comprise an LED 1214. The light source may comprise any other type of light source 1215 suitable for projection of light onto a DMD.

Method 1200 continues at block 1220 where the projected light (projection) is reflected form the DMD towards a target surface and/or object. Method 1200 continues at block 1230 where the projected light, after it is reflected from DMD, but before it reaches the target surface and/or object, is filtered. This filtering can be done using an OLPF 1231. This filtering can be done using other types of filters 1232. The filter can include any number of wave plate(s) 1233, for example, quartz wave plates. The filter can include any number of wave retarder(s) 1234, for example, quarter wave retarders. The filter can include any other number of materials, components, and/or devices including, but not limited to, birefringent materials, crystal structures, and any other materials, components, and/or devices necessary and/or desirable for filtering and/or reconstruction. In one example, the filter is an OLPF consisting of multiple layers, wherein the first layer comprises a first quartz wave plate, the second layer comprises a first quarter wave retarder, the third layer comprises a second quartz wave plate, and the fourth layer comprises a second quarter wave plate. In one example, the filter at block 1230 can comprise OLPF 1106.

Method 1200 continues at block 1240 where the filtered projection is focused onto the target surface and/or object. The filtered projection can first pass through a lens assembly 1241. In one example, the lens assembly at block 1241 is projector lens assembly 1108. The filtered projection can first pass through aperture(s) 1242. The filter projection can pass through any number of other devices and/or components on its way to the target surface and/or object.

In one example, method 1200 comprises projecting, with an LED, a projection onto a DMD configured to reflect light at a frequency of ¼ cycle per pixel (e.g. reflect the projection as a square wave). The light from the DMD is then filtered by an OLPF which is configured to "reconstruct" the square wave into a sine wave. The OLPF comprising a first quartz wave plate configured to split a point from the DMD into a pair of points, a first quarter wave retarder configured to convert the polarized light for each copy of the image into circularly polarized light, a second quartz wave plate configured to split the two points into four points, wherein the four points are arranged in a square pattern, and a second quarter wave retarder configured to convert the output light (e.g. the light passing through and out of the OLPF and towards the target surface and/or object) into circularly polarized light. The filtered light then passes through a projector lens assembly configured to focus the filtered light onto the target surface and/or object, wherein the lens assembly comprises a first lens having a first convex surface and second lens having a second convex surface wherein the first and second convex surfaces are facing opposite directions.

Another challenge associated with typical phase profilometry systems relates to target tilt, particularly with specular target surfaces. In typical systems, the illumination source has a numerical aperture that defines the boundary of the ray bundle emerging from each point on the target surface. Normally, the system would be aligned such that, for a non-tilted target, the center of the illumination source pupil would intersect the center of the imaging system pupil. However, any tilt of the target surface disturbs this alignment, for example, as the target surface tilts the ray bundle from the source (reflected from target as a reflection) transits the aperture of the receiver. For example, deflectometer error occurs as the target surface tilts from the ideal plane and changes the triangulation angle. This error is compounded when the reflection overlaps at the edges, also known as vignetting. In some cases, such as when a target is at an extreme tilt, the reflection no longer overlaps but is rather not visible to the imaging system and thus no dimensional information of the target surface can be generated. The errors due to target surface tilt are further explained in U.S.-2019-0226835-A1.

As an example of deflectometer error, as a specular target at non-zero height (e.g. ideal plane) is tilted the height measured by the imaging system varies. For example, in a phase profilometry system with a 60° included angle, a target 1 millimeter from the camera's best focus tilted 1° will have a height error of approximately 40 micrometers.

Figure 24:
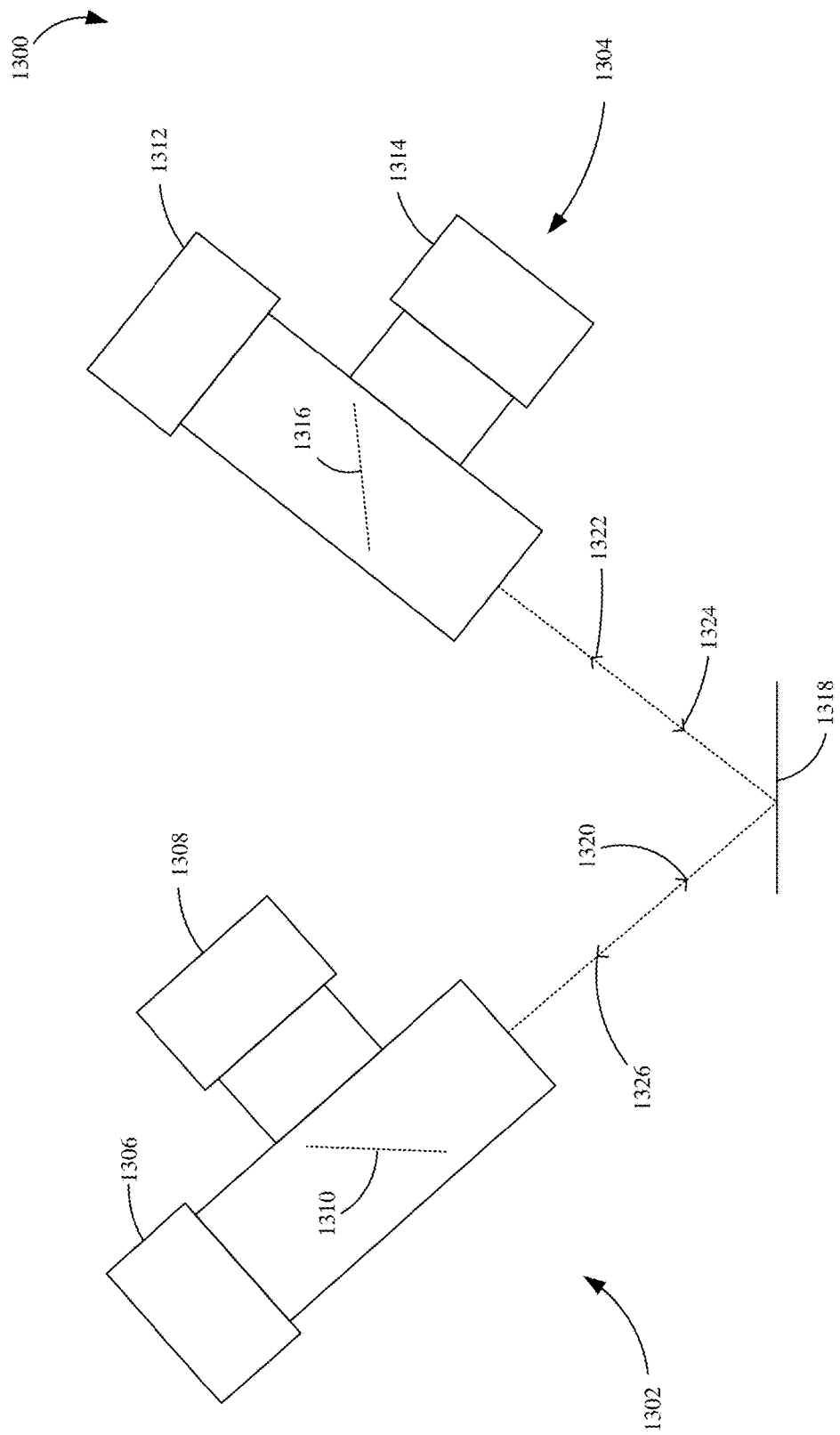
FIGS. 24-25 are diagrammatic views showing example optical phase profilometry systems.

FIG. 24 is a diagrammatic view showing one example of an optical phase profilometry system. System 1300 includes first operative coaxial imaging system/illumination source pair 1302 which includes imaging system 1106, illumination source 1108 and beam splitter 1308. System 1300 further includes second operative coaxial imaging system/illumination source pair 1304 which includes imaging system 1312, illumination source 1314 and beam splitter 1316. Operative pairs 1302 and 1304 are configured such that their respective imaging systems (1306 and 1312) share an optical path with their respective illumination sources (1308 and 1314). Operative pairs 1302 and 1304 utilize respective beam splitters 1310 and 1316, which, in one example, are configured at a 45° degree angle relative to their respective imaging systems (1306 and 1312) and respective illumination sources (1308 and 1314). In one example, imaging systems 1306 and/or 1312 can comprise a camera. In one example, imaging systems 1306 and/or 1312 can comprise image sensor(s). In one example, illumination sources 1308 and/or 1314 can comprise a projector. In one example, illumination sources 1308 and/or 1314 can comprise a DLP projector, which can include a digital micromirror device (DMD) and an OLPF. System 1300 further includes target surface 1318, illuminations 1320 and 1324 and reflections 1322 and 1326.

System 1300 is arranged such that operative pairs 1302 and 1304 comprise oblique pairs (e.g. are placed at an oblique angle relative to target surface 1318 and normal [e.g. perpendicular]). System 1300 is further arranged such that operative pairs 1302 and 1304 are symmetrical relative to each other. In other words, their oblique angles relative to target surface 1318 and normal are equal but in the opposite direction (e.g. on opposite sides of normal). In this way operative pairs 1302 and 1304 form counterposed channels. In one example, they form a first and second specular channel, The first channel comprises illumination 1320, projected from illumination source 1308, and reflection 1322 reflected from target surface 1318. In one example, reflection 1322 comprises a specular reflection. The second channel comprises illumination 1324, projected from illumination source 1314, and reflection 1326 reflected from target surface 1318. In one example, reflection 1326 comprises a specular reflection.

System 1300's alignment geometry has the advantage that height reconstruction errors due to the tip or tilt of a specular target surface is compensated. The errors caused by target tilt will be, for system 1300, equal and opposite for each the operative pairs 1302 and 1304. Thus, when the point clouds generated by operative pairs 1302 and 1304 are combined, the specular error caused by target tilt is corrected. Further, in one example, the optical apertures (not shown) of the illumination sources and the imaging systems are equal (e.g. the numerical apertures of each respective channel are equivalent), the specular error is minimized and the resulting representation of the target surface is more accurate.

Figure 25:
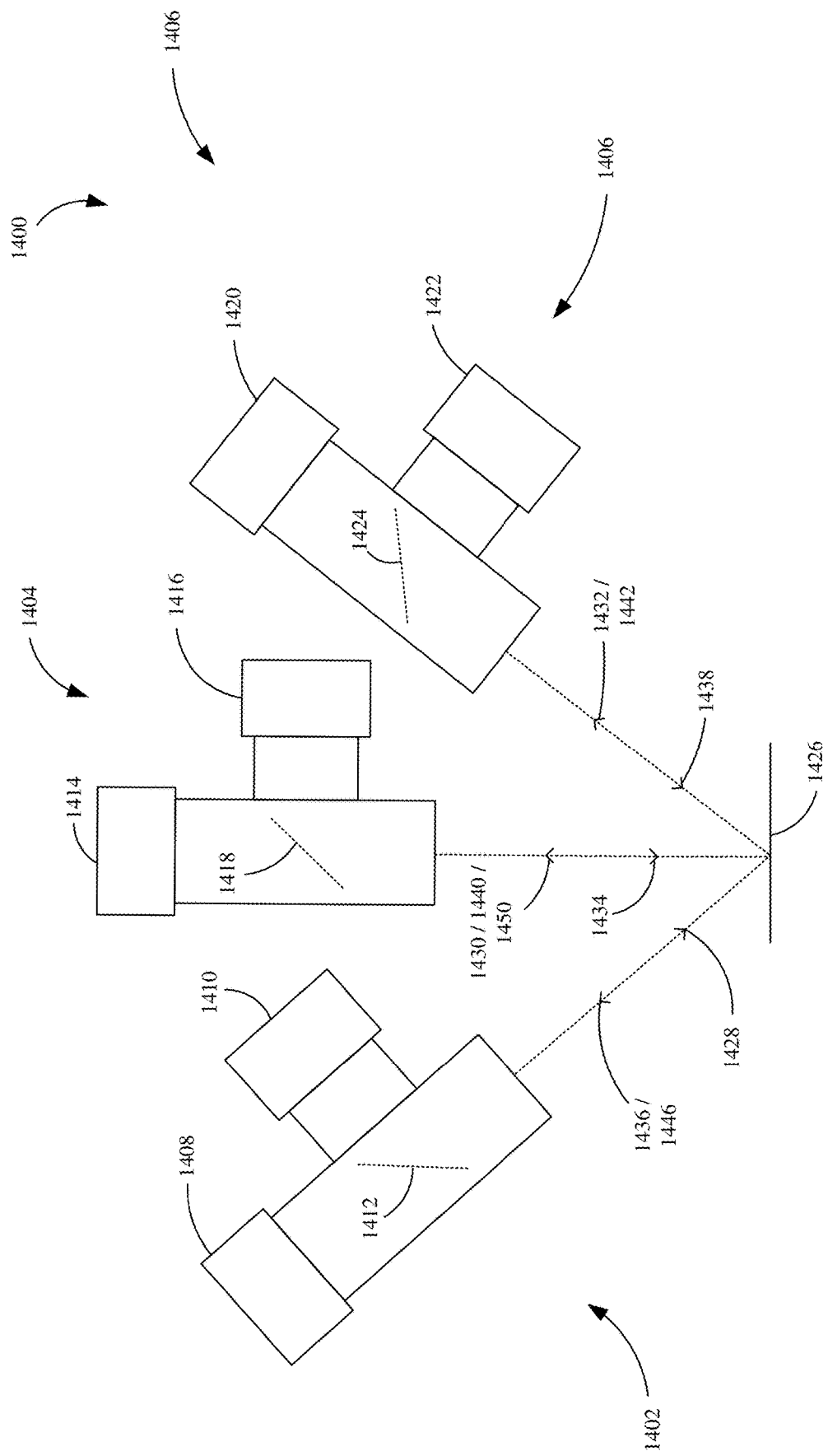

FIG. 25 is a diagrammatic view showing one example of an optical phase profilometry system. System 1400 includes first operative coaxial imaging system/illumination source pair 1402 which includes imaging system 1408, illumination source 1410 and beam splitter 1412. System 1400 further includes second operative coaxial imaging system/illumination source pair 1404 which includes imaging system 1414, illumination source 1416 and beam splitter 1418. System 1400 further includes third operative coaxial imaging system/illumination source pair 1406 which includes imaging system 1420, illumination source 1422 and beam splitter 1424. Operative pairs 1402, 1404 and 1406 are configured such that their respective imaging systems (1408, 1414 and 1420) share an optical path with their respective illumination sources (1410, 1416 and 1422). Operative pairs 1402, 1404 and 1406 utilize respective beam splitters 1412, 1418 and 1424, which, in one example, are configured at a 45° angle relative to their respective imaging systems (1408, 1414 and 1420) and respective illumination sources (1410, 1416 and 1422). In one example, imaging systems 1408, 1414 and/or 1420 can comprise a camera. In one example, imaging systems 1408, 1414 and/or 1420 can comprise image sensor(s). In one example, illumination sources 1410, 1416 and/or 1422 can comprise a projector. In one example, illumination sources 1410, 1416 and/or 1422 can comprises a DLP projector, which can include a digital micromirror device (DMD) and an OLPF. System 1400 further includes target surface 1426, illuminations 1428, 1434 and 1438 and reflections 1430/1440/1450, 1432/1442 and 1436/1446.

System 1400 is arranged such that it forms six counterposed channels. In one example, four diffuse channels and two specular channels. In one example, four counterposed channels are configured to capture nominally diffuse reflections and the two counterposed specular channels are configured to capture specular reflections. System 1400 is arranged such that operative pairs 1402 and 1406 comprise oblique pairs (e.g. are placed/aligned at an oblique angle relative to target surface 1426 and "normal" [e.g. perpendicular and/or, in one example, operative pair 1404]). System 1400 is arranged such that operative pairs 1402 and 1406 are symmetrical relative to each other. In other words, their oblique angles relative to target 1426 and normal are equal but in the opposite direction (e.g. on opposite sides of normal). In this way operative pairs 1402 and 1406 form a first and second counterposed specular channel. The first channel comprises illumination 1428, projected from illumination source 1410, and reflection 1432 reflected from target surface 1426. In one example, reflection 1426 comprises a specular reflection. The second channel comprises illumination 1438, projected from illumination source 1422, and reflection 1436 reflected from target surface 1426. In one example, reflection 1436 comprises a specular reflection.

System 1400 is further arranged such that four more counterposed channels are formed, two counterposed channels between each oblique pair (1402 and 1406) and operative pair 1404. Operative pair 1404 is placed/aligned at approximately normal (e.g. perpendicular) relative to target 1426. The third counterposed channel comprises illumination 1428, projected by illumination source 1410, and reflection 1440 reflected from target surface 1426. In one example, reflection 1440 is a diffuse reflection. The fourth counterposed channel comprises illumination 1434, projected from illumination source 1416, and reflection 1446 reflected from target surface 1426. In one example, reflection 1446 is a diffuse reflection. The fifth counterposed channel comprises illumination 1438, projected from illumination source 1422, and reflection 1450 reflected from target surface 1426. In one example, reflection 1450 is a diffuse reflection. The sixth counterposed channel comprises illumination 1434, projected from illumination source 1416, and reflection 1442. In one example, reflection 1442 is a diffuse reflection.

In one example, to minimize the time required to acquire all six channels of system 1400, the timing of the individual imaging system-illumination source pairs can be interlaced. Typically, imaging system 1408, 1414 and 1420 are configured with CMOS area array detectors. These types of imagers have the ability to control the exposure time such that the exposure time for that imager is a small fraction of the imager's frame time (e.g. time to acquire and readout and image). For example, if the imaging system (e.g. 1408, 1414 and 1420) is capable of acquiring images at 50 frames per second, the time between acquisitions is $\frac{1}{50}$ seconds or 20 milliseconds. To acquire at least one images from each of the six channels in serial mode which acquires at least two images from one imaging system, the time to acquire a full set of images is 120 milliseconds (6 [images]×20 milliseconds). However, if there is sufficient intensity in the reflections (e.g. 1436, 1446, 1430, 1440, 1450, 1432 and 1442) the exposure time can be considerably shorter than 20 milliseconds and the sequence of image acquisition can be interlaced between the three imaging systems. By interlacing the acquisition sequence of the three imaging systems, the exposure of one imaging system can be timed to be at the same time as the readout time required by another imaging system to complete its frame time resulting in an overall acquisition time of 120/3 or 40 milliseconds, for this particular example.

The following is an example of an interlaced triggering sequence for acquiring images from six channels which can take advantage of system 1400's alignment geometry (e.g. configuration) to minimize acquisition time:
Trigger Time 1: Illumination Source 1410 exposes Imaging System 1414;
Trigger Time 2: Illumination Source 1416 exposes Imaging System 1420;
Trigger Time 3: Illumination Source 1422 exposes Imaging System 1408
Trigger Time 4: Illumination Source 1422 exposes Imaging system 1414;
Trigger Time 5: Illumination Source 1410 exposes Imaging System 1420;
Trigger Time 6: Illumination Source 1416 exposes Imaging System 1408

In the example, the time between trigger events is 20/3=6.6 milliseconds. The time between triggering any single one imaging system is 20 milliseconds yet the overall acquisition time for all six images is 6.6 milliseconds×6=40 milliseconds. It is to be understood that this is just one example of an interlacing sequence and that other interlacing sequences can be used without departing from the spirit and scope of the present invention.

Figure 26:
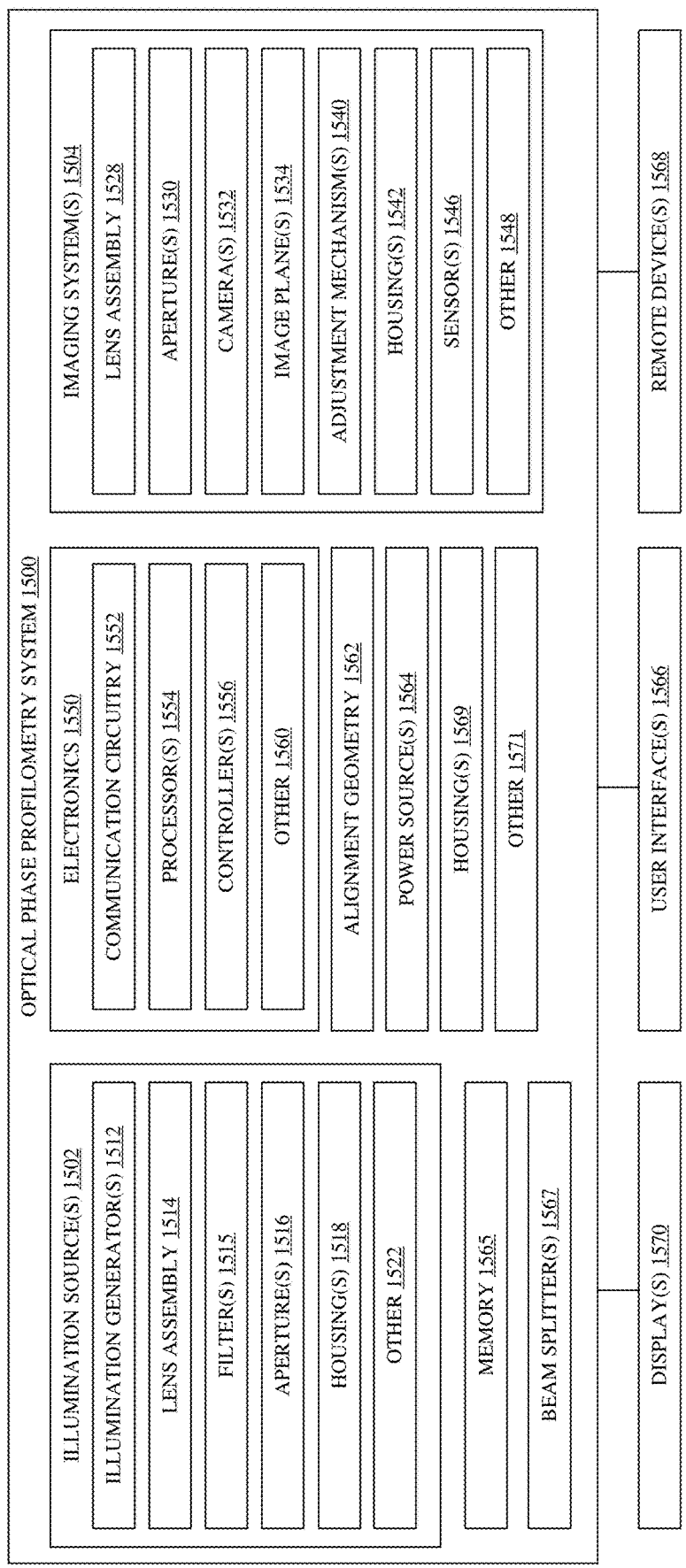
FIG. 26 is a block diagram showing one example of an optical phase profilometry system.

FIG. 26 is a simplified block diagram showing one example of an optical phase profilometry system. System 1500 includes illumination source(s) 1502, imaging system(s) 1504, electronics 1550, alignment geometry 1562, power source(s) 1564, memory 1565, user interface(s) 1566, beam splitter(s) 1567, remote device(s) 1568, housing(s), display(s) 1570 and other 1571. System 1500 can comprise any of the embodiments and incorporate any of the methods described herein.

Illumination source(s) 1502 include illumination generator(s) 1512, lens assembly 1514, filter(s) 1515, aperture(s) 1516, housing(s) 1518 and other 1522. Illumination source(s) 1502 could comprise any of the embodiments described herein. Illumination generator(s) 1512 are configured to generate an illumination (e.g. a structured or patterned illumination) to be projected on to a target. Illumination generator(s) 1512 could comprise a spatial light modulator, a structured light generator, a DLP projector, transmissive liquid crystal, liquid crystal on silicon (LCOS) or any other suitable techniques for projecting a structured light pattern, a digital micromirror device (DMD), or any other number of suitable illumination generator(s).

Lens assembly 1514 is generally configured to direct illumination from illumination source(s) 1402 towards a target and could comprise a telecentric lens assembly, an entrance lens and an exit lens, an entrance or exit pupil at infinity, two or more lenses, and lenses made from various materials including, but not limited to, polycarbonates, plastics, polymers, glass, liquid lens material, and any other suitable materials. Lens assembly 1514 can comprise condenser lenses, a projector lens assembly, wherein the projector lens assembly comprises a first lens having a first convex surface and a second lens having a second convex surface wherein the first and second convex surface face in opposite directions.

Filter(s) 1515 are generally configured to filter and/or reconstruct illumination. Filter(s) 1515 can include an OLPF, wherein the OLPF comprises any number of birefringent materials. The OLPF can comprise four layers, wherein the first layer comprises a wave plate (e.g. quartz wave plate), the second layer comprises a quarter wave retarder, the third layer comprises a second wave plate (e.g. quartz wave plate), and the fourth layer comprises a second quarter wave retarder. Filter(s) 1515 can include any other number of materials, components and/or devices including, but not limited to, crystal structures, plates, etc.

Aperture(s) 1516 are configured to direct illumination from illumination source 1502 towards a target surface. Aperture(s) 1516 could comprise any variation in size across an optical phase profilometry system, such as the systems and embodiments described herein. In one example, the numerical apertures of each operative coaxial imaging system-illumination source pair is equivalent. In one example, the numerical apertures are of different size. In one example, for a channel (e.g. counterposed, specular, diffuse, etc), the receiver (e.g. imaging system) numerical aperture is smaller than the source (e.g. illumination source) numerical aperture. In one example, for a channel (e.g. counterposed, specular, diffuse, etc.), the receiver (e.g. imaging system) numerical aperture is larger than the source (e.g. illumination source) numerical aperture. In one example, for a channel (e.g. counterposed, specular, diffuse, etc.), the receiver (e.g. imaging system) numerical aperture and the source (e.g. illumination source) numerical aperture are equivalent.

Housing(s) 1518 are configured to define a body of illumination source(s) 1502 and house components of illumination source(s) 1502. Housing(s) 1518 could comprise any number of materials including, but not limited to, plastics, polymers, metals or any other suitable materials. Housing(s) 1518 could comprise any of the embodiments herein described. Other 1522 could comprise any other components suitable to be used by an illumination source to project a structed illumination on a target.

Imaging system(s) 1504 include lens assembly 1528, aperture(s) 1530, camera(s) 1532, image plane(s) 1534, adjust mechanism(s) 1540, housing(s) 1542, sensor(s) 1546 and other 1548. Imaging source(s) 1504 are configured to receive an illumination projected from illumination source(s) 1402 which reflects from a target. Lens assembly 1528 is configured to direct illumination reflected from a target towards interior components (e.g. camera(s) 1532, image plane(s) 1534, sensor(s) 1546) of imaging system(s) 1504 and could comprise a telecentric lens assembly, an entrance and exit lens, an entrance or exit pupil at infinity, two or more lenses, adjustable lenses, and lenses made from various materials including, but not limited to, polycarbonates, plastics, polymers, glass, liquid lens material, and any other suitable materials. Lens assembly 1528 could include a prism assembly (e.g. 760) which can include any number of prisms (e.g. 761, 762 and/or 763).

Aperture(s) 1530 are configured to direct illumination reflected from target towards interior component(s) of imaging system(s) 1504. Aperture(s) 1530 could comprise any variation in size across an optical phase profilometry system, such as the systems and embodiments described herein. In one example, the numerical apertures of each operative coaxial imaging system-illumination source pair is equivalent. In one example, the numerical apertures are of different size. In one example, for a channel (e.g. counterposed, specular, diffuse, etc), the receiver (e.g. imaging system) numerical aperture is smaller than the source (e.g. illumination source) numerical aperture. In one example, for a channel (e.g. counterposed, specular, diffuse, etc.), the receiver (e.g. imaging system) numerical aperture is larger than the source (e.g. illumination source) numerical aperture. In one example, for a channel (e.g. counterposed, specular, diffuse, etc.), the receiver (e.g. imaging system) numerical aperture and the source (e.g. illumination source) numerical aperture are equivalent.

In one example, the numerical apertures of aperture(s) 1516 and aperture(s) 1530 are equivalent and thus configured to reduce, compensate, and/or eliminate measurement errors due to target tilt (e.g. deflectometer errors, vignetting, etc.).

Camera(s) 1532 are configured to receive illumination projected by illumination source(s) 1502 and reflected from a target towards imaging system(s) 1504. Camera(s) 1532 could include sensor(s) 1546 (e.g. image sensors) configured to generate sensor signals based on the received illumination indicative of an image of a target. Image plane(s) 1534 are part of camera(s) 1532 and define a surface of the camera onto which the reflected illumination is focused after it passes through the interior components of imaging system(s) 1504 (e.g. lens assembly 1528, aperture(s) 1530, etc.).

Adjustment mechanism(s) 1540 are devices configured to change a position or a characteristic of lens assembly 1528 or another component of imaging system(s) 1504. Adjustment mechanism(s) 1540 could comprise a mechanical device configured to change a position of a lens such that the focus point of the lens is changed. Adjustment mechanism(s) 1540 could comprise an electro-optical lens that changes its shape between image captures such that its focus position is changed. In such a system, the curvature of the lens is adjusted by applying an electrical current. Adjustment mechanism(s) 1540 could comprise a variable power lens, for instance, a liquid lens assembly. Adjustment mechanism(s) could comprise a device configured to change a position of image plane(s) 1534. Adjust mechanism(s) 1540 could comprise a device configured to change a position of camera(s) 1532. Adjustment mechanism(s) 1540 could comprise any other suitable devices, components and/or techniques such that the focus position of the imaging system could change.

Housing(s) 1542 are configured to define a body of imaging system(s) 1504 and house components of imaging system(s) 1504. Housing(s) 1542 could comprise any number of materials including, but not limited to, plastics, polymers, metals or any other suitable materials. Housing(s) 1542 could comprise any of the embodiments herein described. Sensor(s) 1546 could comprise any number of sensors configured to generate a signal indicative of a characteristic of received illumination, target dimensional information, a captured image, etc. Other 1548 could include any other suitable components configured to allow imaging system(s) 1504 to receive illumination or obtain dimensional information relative to a target.

Electronics 1550 include communication circuitry 1552, processor(s) 1554, controller(s) 1556 and other 1560. Communication circuitry 1552 is configured to communicate with other components of system 1500 (e.g. illumination source(s) 1502 and imaging system(s) 1504), external components (e.g. user interface(s) 1566, remote device(s) 1568, and display(s) 1570), as well as other components of electronics 1550. Communication circuitry 1552 could comprise wired (e.g. wired loop) and/or wireless (WiFi, Bluetooth, etc.) circuitry. Processor(s) 1554 are configured to receive signals (e.g. sensor signals from sensor(s) 1546) and other input relative to a target and, based on those signals and input, determine, calculate, and/or generate characteristics and/or dimensional information relative to the target (e.g. height, slope, x position, y position, z position, etc.). Processor(s) 1554, in one example, are configured to generate point clouds having a plurality of surface points captured by a respective channel (e.g. optical path) of the system relative to a target, wherein the channel comprises at least one illumination source and at least one imaging system. Processor(s) 1554 can be adapted, via hardware, software, or a combination thereof, for receiving acquired images from imaging system(s) 1504 and performing a number of calculations, methods and/or techniques, including those described herein. For example, processor(s) 1554 can perform point cloud merging, iterative joint point cloud refinement, signed distance function, weighted averages, dynamic compensation, combinations, comparisons and any other number of calculations, methods and/or techniques or any combinations of those described herein.

Controller(s) 1556 are configured to receive signals from processor(s) 1554, and other components (e.g. user interface(s) 1566) and generate control signals to components of system 1500. In one example, controller(s) 1556 can comprise any number of processor(s) or microprocessor(s) including processor(s) 1554. For example, controller(s) 1556 could receive an output from processor(s) 1554 indicative of a need to initiate a calibration process (e.g. where relative error determinations have exceeded limit and field or factory calibration is needed). Controller(s) 1556 could then generate a control signal to have an external component (e.g. user interface(s) 1566, remote device(s) 1568 and/or display(s) 1570) surface a display, an alert, an alarm or any other indication of a status of system 1500 (e.g. that calibration is needed). In other example, controller(s) 1556 could generate a control signal to have processor(s) 1554 determine a new relative error and a control signal to have communication circuitry 1552 store the new relative error in memory 1565. Controller(s) 1556 can generate any number of control signals, including control signals for any of the methods and/or techniques described herein.

In another example, controller(s) 1556 are configured to operate system 1500's timing (e.g. projection and acquisition timing, exposure timing, etc.). In one example, the timing of system 1500 is interlaced (e.g. an interlaced triggering sequence). In one example, the exposure of one imaging system can be timed to be the same as the readout time required by another imaging system to complete its frame time. In one example, the interlaced triggering sequence can result in an overall acquisition time of 40 milliseconds for system 1500. In one example, the time between trigger events is 6.6 milliseconds.

Alignment geometry 1562 is the positional and alignment structure of system 1500. Alignment geometry 1562 can comprise the vertical or horizontal position of illumination source(s) 1502 and/or imaging system(s) 1504. Alignment geometry 1562 could comprise the azimuth, or the optical axis of illumination source(s) 1502 and/or imaging system(s) 1504. Alignment geometry 1562 can comprise any of the systems, methods, techniques, or embodiments described herein, for example, but not limited to, the alignment geometry described in FIGS. 3A-3B, 4A-4B, 12, 13A-13C, 17, 24 and 25.

Power source(s) 1564 are configured to provide power to components of system 1500. Power source(s) 1564 could comprise a batter, a wired connection to an electric circuit or any other suitable techniques such that the components of system 1500 will be powered. Additionally, each of the individual subsystems of system 1500 (e.g. illumination source(s) 1502, imaging system(s) 1504, and electronics 1550) could include their own power source(s) (e.g. a battery or an individual connection to an electronic circuit) such that they are powered independently from one another. Power source(s) 1564 could also comprise any combination of these.

Memory 1565 is configured to store data (e.g. dimensional information relative to a target, calculations, determinations, instructions, etc.), calibration information, system status information, etc. Memory 1565 could comprise RAM, ROM, Cache, Dynamic RAM, Static RAM, Flash Memory, Virtual Memory, Video Memory, BIOS, or any other suitable form of memory. Memory 1565 is preferably electrically coupled to system 1500.

Beam splitter(s) 1567 are configured to "split" illumination from illumination source(s) 1502 as well as reflections reflected from a target such that illumination source(s) 1502 and imaging system(s) 1504 can, in one example, comprise an operative coaxial pair as described herein. Housing(s) 1569 can be configured to house both illumination source(s) 1502 and imaging system(s) 1504 in a singular housing, particularly where a operative coaxial illumination source/imaging system pair is utilized as with certain embodiments described herein. Housing(s) 1569 are configured to define a body of illumination source(s) 1502 and imaging system(s) 1504 and house internal components of each, as well as, in one example, beam splitter(s) 1567. Housing(s) 1569 can comprise any number of materials including, but not limited to, plastics, polymers, metals or any other suitable materials. System 1500 can include any other number of suitable components and/or devices as indicated by 1571.

User interface(s) 1566 are configured to receive a user or operator input. User interface(s) could comprise a touchscreen display, switches, levers, an electronic control board, buttons, or any other suitable techniques for receiving a user or operator input. Remote device(s) 1568 could comprise devices electronically coupled to, but remote from, system 1500 such as a computer in a control room on a wired loop. Remote device(s) 1568 could also comprise devices wirelessly coupled to system 1500 such as handheld devices, laptops, tablets, computers off-site, etc. Remote device(s) 1568 can be configured to display, receive, and send information relative to system 1500 (e.g. dimensional information relative to a target, performance analytics, alerts, alarms, notifications, system status, etc.). Display(s) 1570 are configured to display information relative to system 1500. Display(s) 1500 could comprise visible displays such as screen displays, or lights configured to display a status of system 1500 (e.g. warning lights). Display(s) 1570 could comprise audible displays configured to generate a noise to convey information relative to system 1500 (e.g. an audible alarm).

Any and all of the components and/or devices of system 1500 can comprise any of the components, devices, techniques, methods, and/or embodiments described herein or any combination thereof.

The particular embodiments described herein are also, in one example, configured to reduce, eliminate, compensate and/or correct errors (e.g. measurement errors) such as those described herein. Such errors include, but are not limited to, errors due to reflectance gradient of a target surface, glints, tilt of a target, etc.

While a particular order of steps has been shown for illustrative purposes in methods described herein, it is to be understood that some or all of these steps can be performed in any number of orders including, but not limited to, simultaneously, concurrently, sequentially, non-concurrently, non-sequentially and any combinations thereof. No particular order of steps for the method described herein is to be implied by and/or construed from the illustrations.

Although the present invention has been described with reference to preferred embodiments, workers skilled in the art will recognize that changes may be made in form and detail without departing from the spirit and scope of the invention. It should be noted that the different examples described herein can be combined in different ways. That is, parts of one or more examples can be combined with parts of one or more other examples. All of this contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of determining dimensional information of a target surface, comprising:
    generating a first point cloud corresponding to a first plurality of reconstructed surface points of the target surface generated by a first imaging system-illumination source pair of a phase profilometry system;
    generating a second point cloud corresponding to a second plurality of reconstructed surface points of the target surface generated by a second imaging system-illumination source pair of the phase profilometry system;
    generating an initial estimate of the target surface based on the first and second point clouds; and
    refining the initial surface estimate using positions of the first and second point clouds and geometry of the first and second imaging system-illumination source pairs to generate a final point cloud.

2. The method of claim 1 wherein said refining of the initial surface estimate reduces measurement errors caused by specular glints.

3. The method of claim 1 wherein said refining of the initial surface estimate reduces measurement errors caused by reflection gradients of the target surface.

4. The method of claim 1 wherein said refining of the initial surface estimate reduces measurement errors caused by a tilt of the target surface.

5. The method of claim 1 wherein generating the initial surface estimate comprises:
    dividing a volume, corresponding to the target surface, into a set of voxels;
    adding, for each reconstructed surface point in the first and second point clouds, the surface point's signed distance function (SDF) and corresponding weights to the set of voxels along an imaging system ray of each reconstructed surface point in the first and second point clouds; and
    identifying a level set of the SDFs for the first and second point clouds.

6. The method of claim 5 wherein the first imaging system-illumination source pair comprises a first counterposed channel and the second imaging system-illumination source pair comprises a second counterposed channel.

7. The method of claim 6 wherein the first imaging system-illumination source pair comprises a first camera from a first operative coaxial camera-projector pair and a first projector from a second operative coaxial camera-projector pair and the second imaging system-illumination source pair comprises a second camera from the second operative coaxial camera-projector pair and a second projector from the first operative coaxial camera-projector pair.

8. The method of claim 7 wherein at least one of the first or second operative coaxial camera-projector pairs is aligned at an oblique angle relative to the target surface and target surface normal.

9. The method of claim 8 wherein at least one of the first or second operative coaxial camera-projector pairs is aligned substantially perpendicularly relative to the target surface.

10. A method of merging point clouds, comprising:
    generating reconstructed surface points in a first counterposed channel's point cloud;
    generating reconstructed surface points in a second counterposed channel's point cloud;
    identifying, for a selected reconstructed surface point in the first counterposed channel's point cloud, reconstructed surface points in the second counterposed channel's point cloud that are near an imaging system ray for the selected reconstructed surface point in the first counterposed channel's point cloud;
    calculating a projection of each of the identified near points in the second counterposed channel's point cloud onto the imaging system ray for the selected reconstructed surface point in the first counterposed channel's point cloud;
    calculating an average projection of each of the identified near points in the second counterposed channel's point cloud onto the imaging system ray of the selected reconstructed surface point in the second counterposed channel's point cloud; and
    moving the selected reconstructed surface point in the first counterposed channel's point cloud along its imaging system ray a portion of the distance towards the calculated average projection of each of the identified near point in the second counterposed channel's point cloud.

11. The method of claim 10 said moving of the reconstructed surface point in the first counterposed channel is configured to reduce at least one of the following measurement errors:
    specular glint measurement error;
    reflectance gradient measurement error; or
    target surface tilt measurement error.

12. The method of claim 10 and further comprising:
    identifying, for a selected reconstructed surface point in the second counterposed channel's point cloud, reconstructed surface points in the first counterposed channel's point cloud that are near an imaging system ray for the selected reconstructed surface point in the second counterposed channel's point cloud;
    calculating a projection of each of the identified near points in the first counterposed channel's point cloud onto the imaging system ray for the selected reconstructed surface point in the second counterposed channel's point cloud;

calculating an average projection of each of the identified near points in the first counterposed channel's point cloud onto the imaging system ray of the selected reconstructed surface point in the second counterposed channel's point cloud; and moving the selected reconstructed surface point in the second counterposed channel's point cloud along its imaging system ray a portion of a distance towards the calculated average projection of each of the identified near points in the first counterposed channel's point cloud.

13. The method of claim 12 wherein said moving of the selected reconstructed surface points in the first and second counterposed channels' point clouds is configured to reduce measurement errors caused by specular glints.

14. The method of claim 12 wherein said moving of the selected reconstructed surface points in the first and second counterposed channels' point clouds is configured to reduce measurement errors caused by reflectance gradients of a target surface.

15. The method of claim 12 wherein said moving of the selected reconstructed surface points in the first and second counterposed channels' point clouds is configured to reduce measurement errors caused by a tilt of a target surface.

16. The method of claim 12 wherein the first counterposed channel comprises a first projector of a first operative coaxial imaging system-illumination source pair and a first camera of a second operative coaxial imaging system-illumination source pair and the second counterposed channel comprises a second projector of the second operative coaxial imaging system-illumination source pair and a second camera of the first operative coaxial imaging system-illumination source pair.

17. The method of claim 16, wherein at least one of the first or second operative coaxial imaging system-illumination source pairs are aligned at an oblique angle relative to the target surface and target surface normal.

18. The method of claim 17, wherein at least one of the first or second operative coaxial imaging system-illumination source pairs are aligned substantially perpendicularly relative to the target surface.

19. A method of merging point clouds, comprising generating, with a first counterposed channel, a first point cloud having a first plurality of surface points corresponding to a target surface;

generating, with a second counterposed channel, a second point cloud having a second plurality of surface points corresponding to the target surface;

determining first and second non-empty portions corresponding to each the first and second point clouds;

identifying a transformation for each the first and second point clouds;

determining the relative error for each the first and second point clouds based on the identified transformation;

subtracting the relative error from each the first and second point clouds;

aligning the first and second point clouds in the first and second non-empty portions; and generating a dimensional profile of the target surface based on the alignment.

20. The method of claim 19 wherein determining the relative error for each the first and second point cloud comprises:

determining if the time since the most recent relative error was calculated is beyond a threshold, and where the time exceeds the threshold calculating a relative error average based on the most recent relative error and a newly determined relative error.

* * * * *